(12) United States Patent
Omura et al.

(10) Patent No.: US 8,360,271 B2
(45) Date of Patent: Jan. 29, 2013

(54) PHARMACEUTICAL PRODUCT CASSETTE, PHARMACEUTICAL PRODUCT DISPENSING APPARATUS AND PHARMACEUTICAL PRODUCT DISPENSING SYSTEM

(75) Inventors: Shiro Omura, Tokyo (JP); Yoshihito Omura, Tokyo (JP); Hideaki Hirobe, Tokyo (JP); Shunji Ogaya, Tokyo (JP)

(73) Assignee: Tosho Inc., Tokyo (JP)

( * ) Notice: Subject to any disclaimer, the term of this patent is extended or adjusted under 35 U.S.C. 154(b) by 157 days.

(21) Appl. No.: 11/910,569

(22) PCT Filed: Nov. 28, 2005

(86) PCT No.: PCT/JP2005/021771
§ 371 (c)(1),
(2), (4) Date: Oct. 3, 2007

(87) PCT Pub. No.: WO2006/112075
PCT Pub. Date: Oct. 26, 2006

(65) Prior Publication Data
US 2009/0014461 A1    Jan. 15, 2009

(30) Foreign Application Priority Data

Apr. 8, 2005 (JP) .................. 2005-111731
Jun. 29, 2005 (JP) .................. 2005-190737
Jul. 19, 2005 (JP) .................. 2005-207939

(51) Int. Cl.
*A61J 3/00* (2006.01)
*B65G 1/08* (2006.01)
*B65G 59/06* (2006.01)

(52) U.S. Cl. ............... 221/77; 221/4; 221/69; 221/78; 221/92

(58) Field of Classification Search ............ 221/1, 2, 221/4, 5, 9, 21, 25, 68, 69, 75–81, 87–92, 221/119, 121, 123, 133, 186, 187, 208, 251, 221/253, 256–259, 61, 263, 265, 268, 270, 221/272–275, 277, 289, 292

See application file for complete search history.

(56) References Cited

U.S. PATENT DOCUMENTS 2,274,263 A * 2/1942 Bescherer .................. 312/323
2,412,368 A * 12/1946 Tascher ...................... 211/59.2
(Continued)

FOREIGN PATENT DOCUMENTS

JP    S49-103181    9/1974
JP    9124105 A    5/1977
(Continued)

OTHER PUBLICATIONS

International Search Report of International application No. PCT/JP2005/021771.

(Continued)

*Primary Examiner* — Gene Crawford
*Assistant Examiner* — Kelvin L Randall, Jr.
(74) *Attorney, Agent, or Firm* — Matthew B. Dernier, Esq.; Gibson & Dernier LLP

(57) ABSTRACT

A sliding surface having a gentle slope for carrying pharmaceutical products such as infusion bottles (20) is formed by a row of rollers (15) extending in the direction of slope. An ejecting member (14) for sequentially ejecting the products (20) is formed as a series of a flat plate (14a) and a curved plate (14c). The flat plate (14a) is pivotably supported such that the pivot center is on an extension of the sliding surface. The curved plate (14c) is provided below the flat plate (14a), maintaining a constant distance from the pivot center. An actuator such as an electric motor (12) for pivotally moving the ejecting member (14) is provided beneath the sliding surface. Since the pharmaceutical product at the head of a queue assists the pivotal movement, it is ensured that a small actuator serves the purpose.

9 Claims, 32 Drawing Sheets

U.S. PATENT DOCUMENTS

| | | | | |
|---|---|---|---|---|
| 2,644,734 A * | 7/1953 | Gabrielsen | | 221/10 |
| 3,028,045 A * | 4/1962 | Smith | | 221/10 |
| 4,559,730 A * | 12/1985 | Burrell | | 40/324 |
| 4,954,697 A * | 9/1990 | Kokubun et al. | | 235/381 |
| 5,048,719 A * | 9/1991 | Empl et al. | | 221/119 |
| 5,096,090 A * | 3/1992 | Schwartz et al. | | 221/125 |
| 5,671,592 A * | 9/1997 | Yuyama et al. | | 53/493 |
| 5,905,653 A * | 5/1999 | Higham et al. | | 700/244 |
| 5,940,306 A * | 8/1999 | Gardner et al. | | 700/244 |
| 6,152,323 A * | 11/2000 | Immel | | 221/129 |
| 6,189,727 B1 * | 2/2001 | Shoenfeld | | 221/2 |
| 6,471,088 B1 * | 10/2002 | Uema et al. | | 221/4 |
| 6,478,186 B1 * | 11/2002 | Willach et al. | | 221/13 |
| 6,604,652 B1 * | 8/2003 | Trautwein | | 221/124 |
| 6,684,126 B2 * | 1/2004 | Omura et al. | | 700/231 |
| 6,966,452 B2 * | 11/2005 | Kim | | 221/133 |
| 7,055,716 B2 * | 6/2006 | Holdway et al. | | 221/131 |
| 7,228,988 B2 * | 6/2007 | Inamura | | 221/65 |
| 2003/0066841 A1 * | 4/2003 | Hebron et al. | | 221/92 |
| 2003/0074868 A1 * | 4/2003 | Yasuoka et al. | | 53/493 |
| 2003/0146235 A1 * | 8/2003 | Peeler, Jr. | | 221/123 |
| 2004/0113786 A1 * | 6/2004 | Maloney | | 340/568.1 |
| 2004/0137140 A1 * | 7/2004 | Childers | | 427/2.1 |

FOREIGN PATENT DOCUMENTS

| | | | |
|---|---|---|---|
| JP | S52-21576 Y2 | | 5/1977 |
| JP | 09124105 A | * | 5/1997 |
| JP | 10201825 A | | 8/1998 |
| JP | 2000-24087 A | | 1/2000 |
| JP | 2001-198194 A | | 7/2001 |
| JP | 2002-011072 A | | 1/2002 |
| JP | 2003-54713 A | | 2/2003 |
| JP | 2004-131212 A | | 4/2004 |
| JP | 2004-148036 A | | 5/2004 |
| JP | 2004-187958 A | | 7/2004 |
| JP | 2004-275550 A | | 10/2004 |
| JP | 2004-344420 A | | 12/2004 |

OTHER PUBLICATIONS

International Preliminary Report on Patentability of International application No. PCT/JP2005/021771.

* cited by examiner

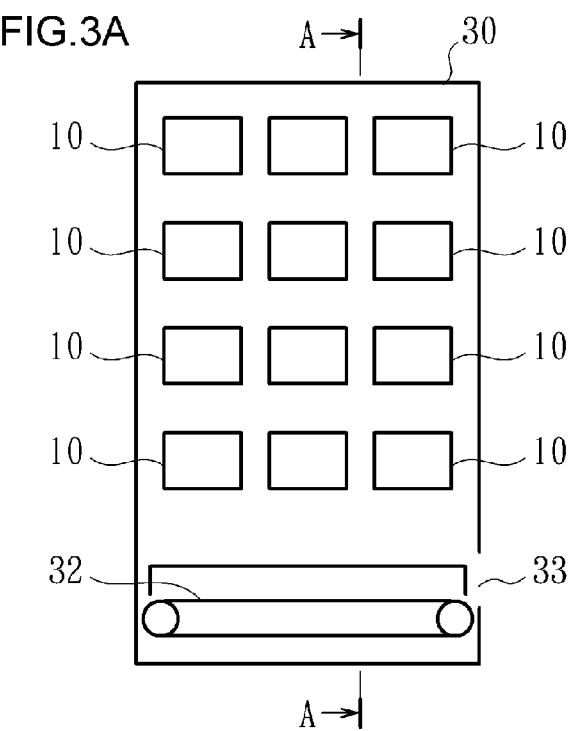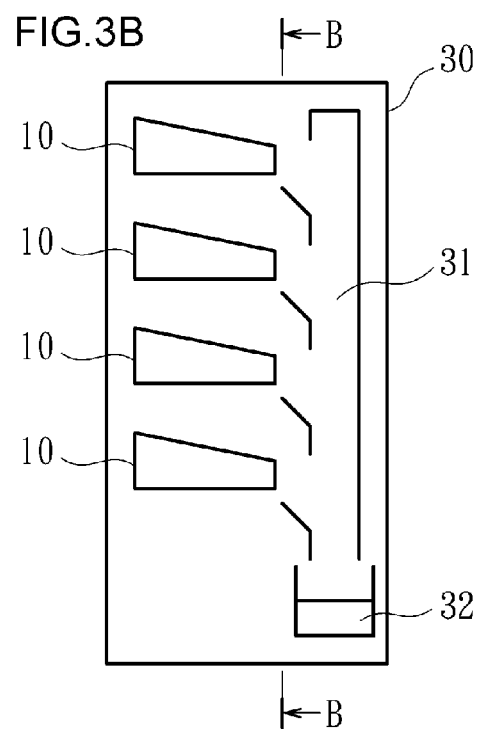

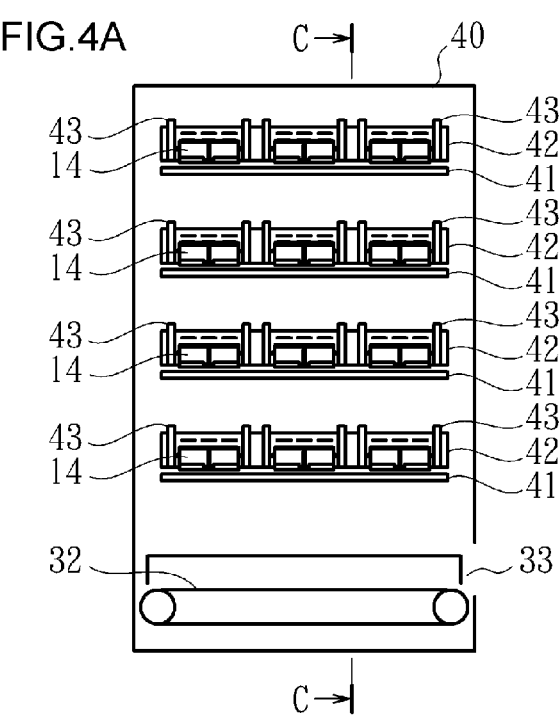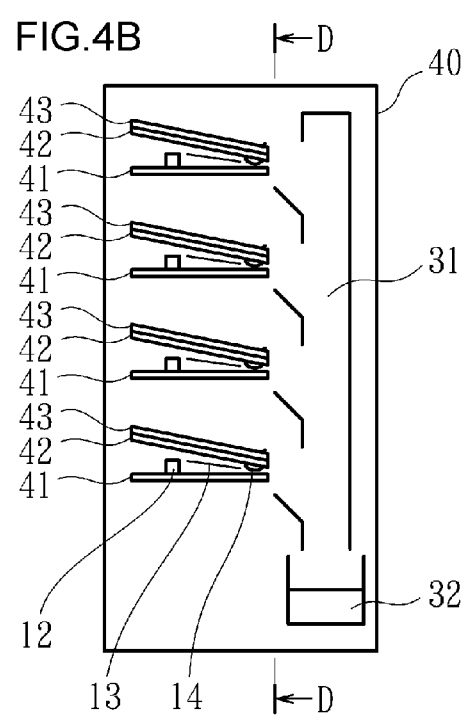

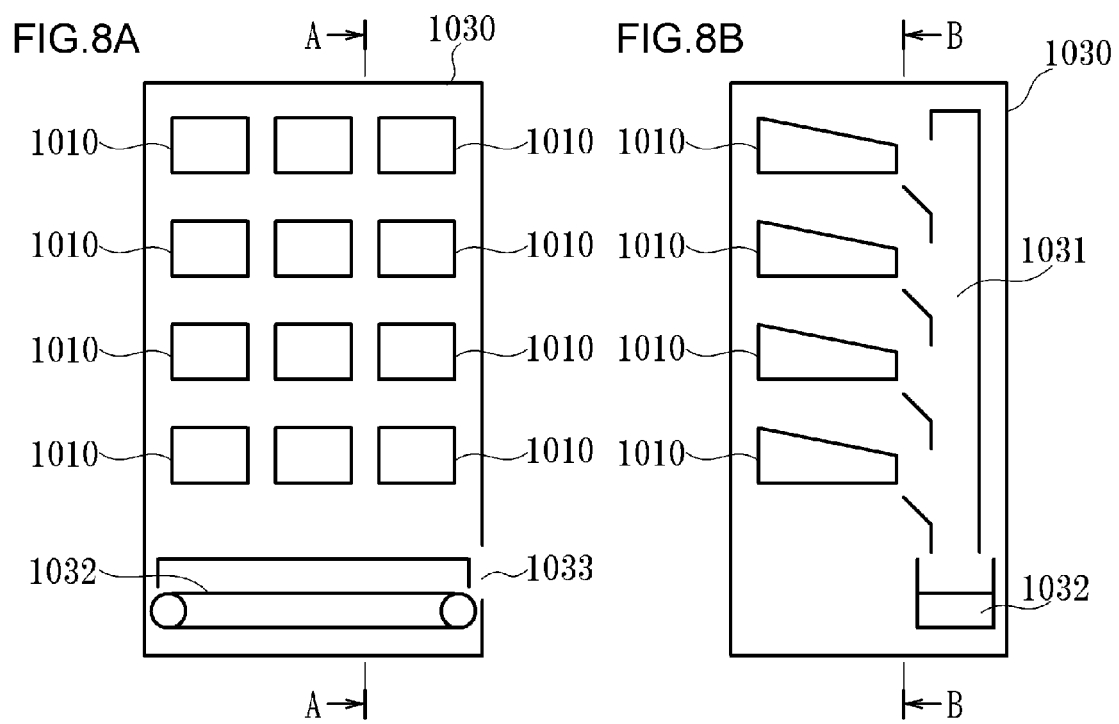

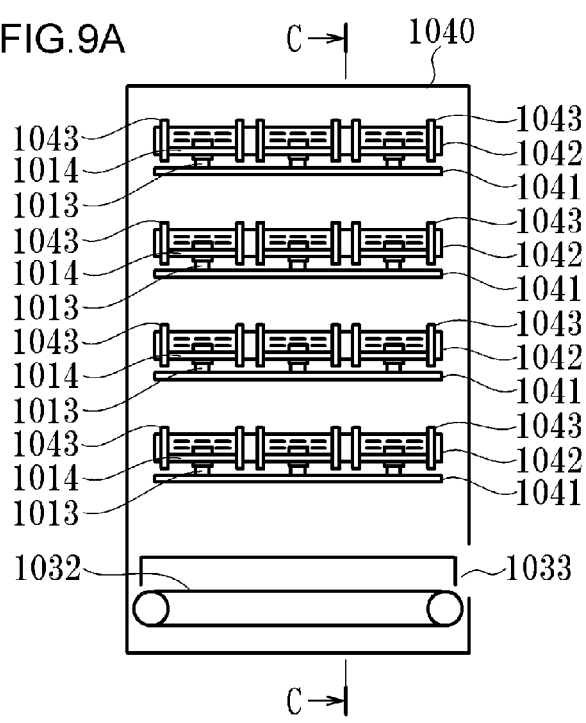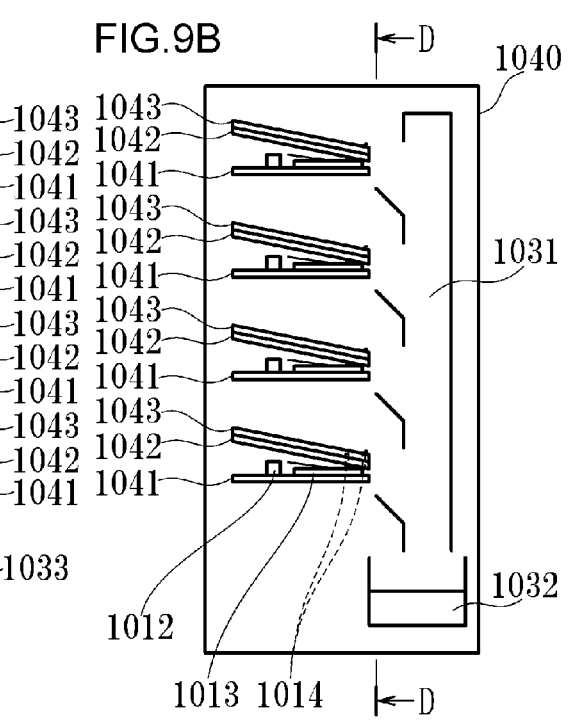

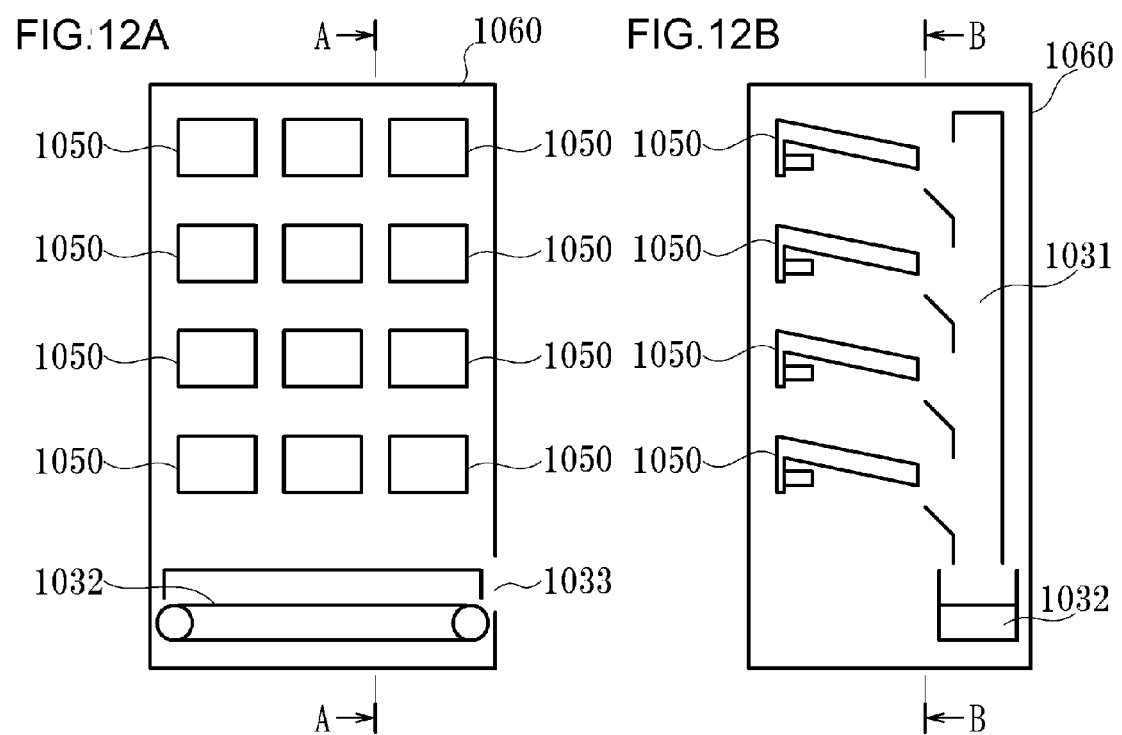

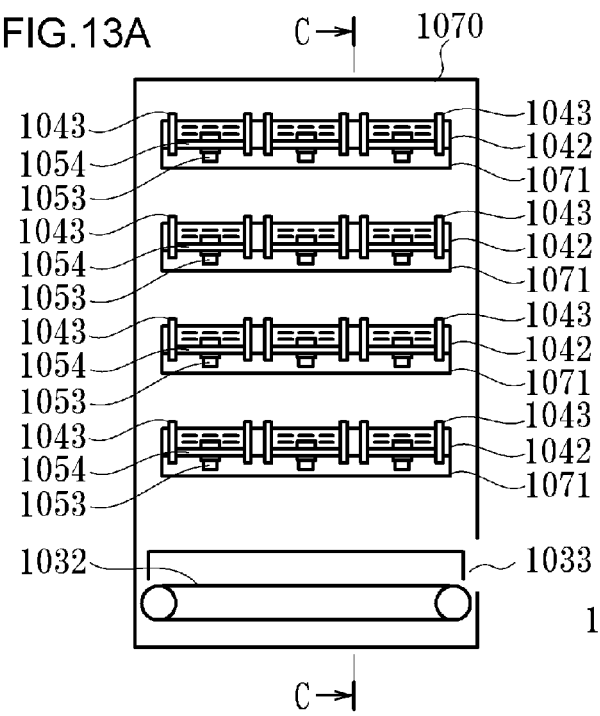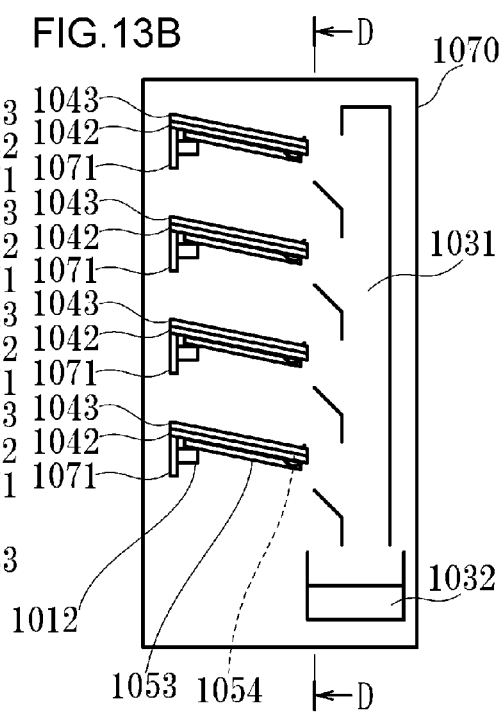

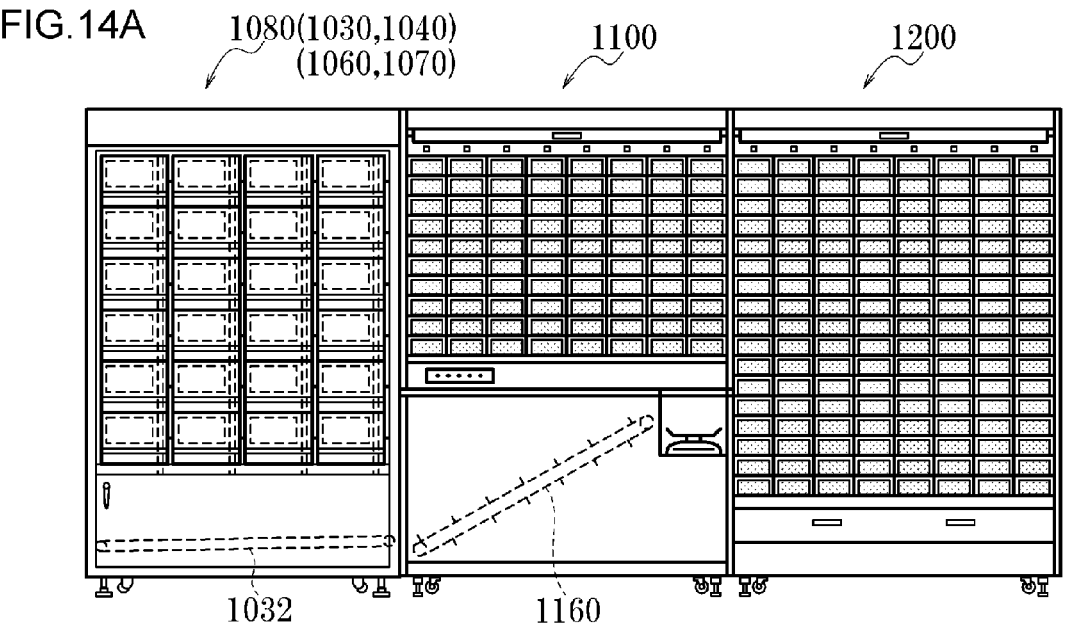
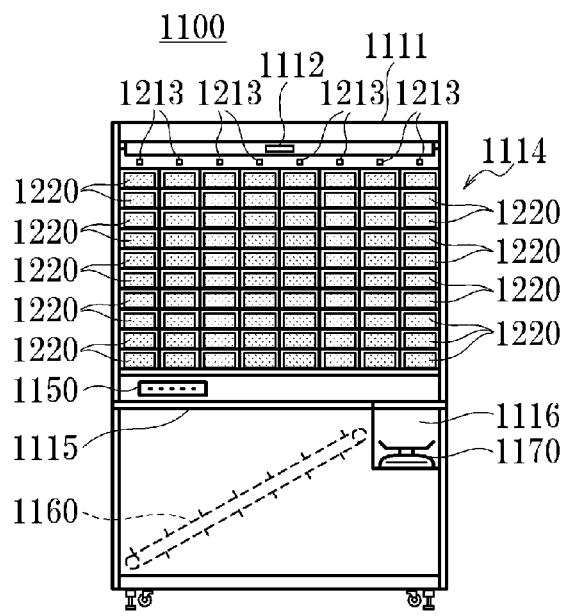
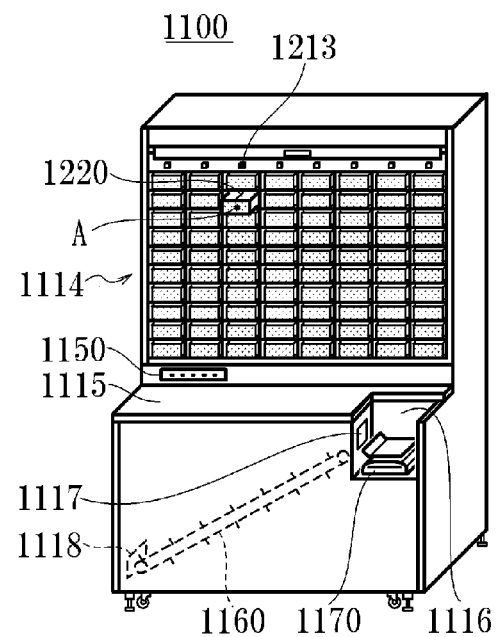

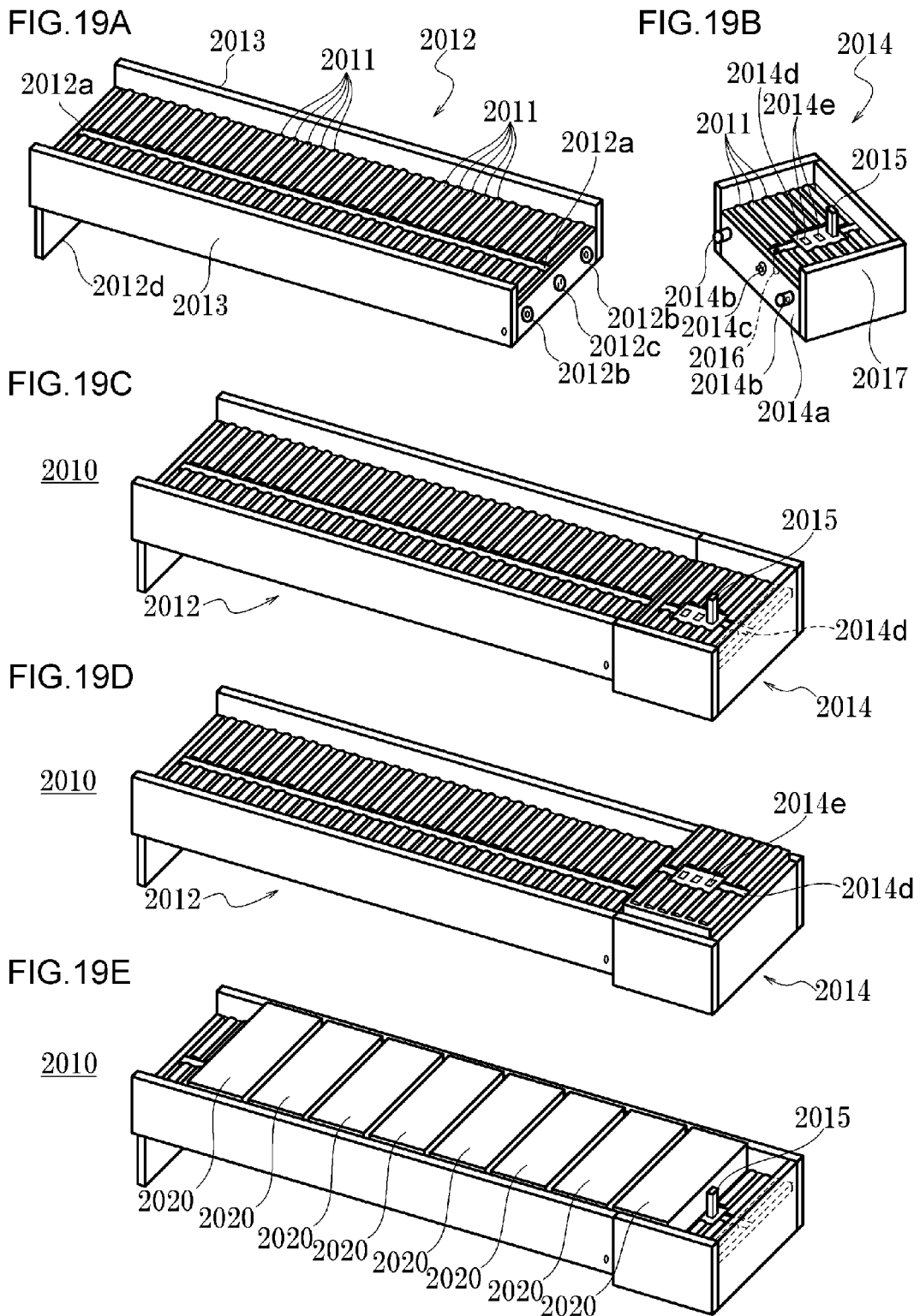

2019

2015

2019  2015

2019

2015

2015

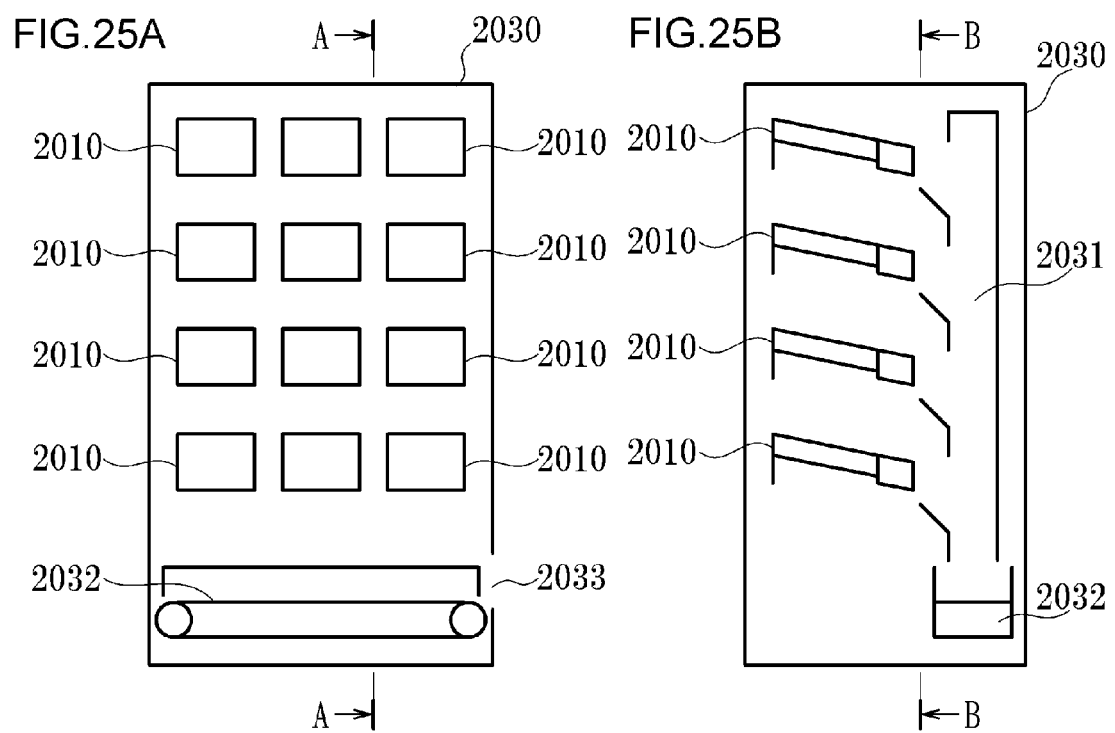

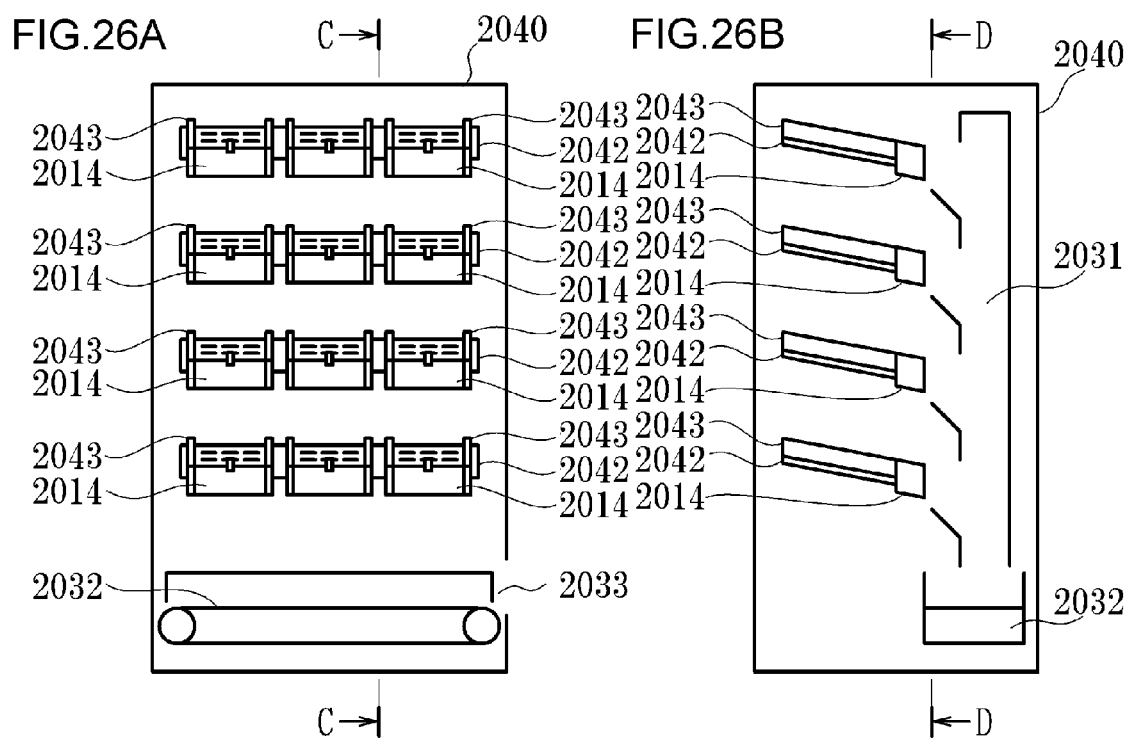

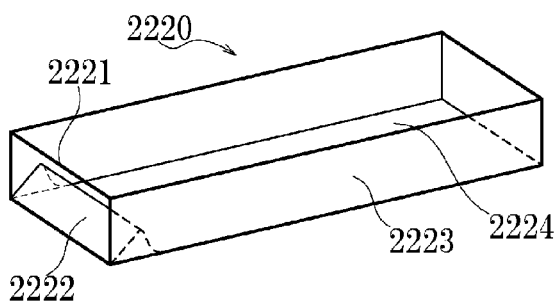
FIG.29A
FIG.29B
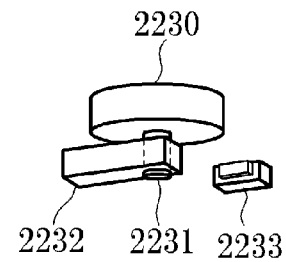
FIG.29C
FIG.29D
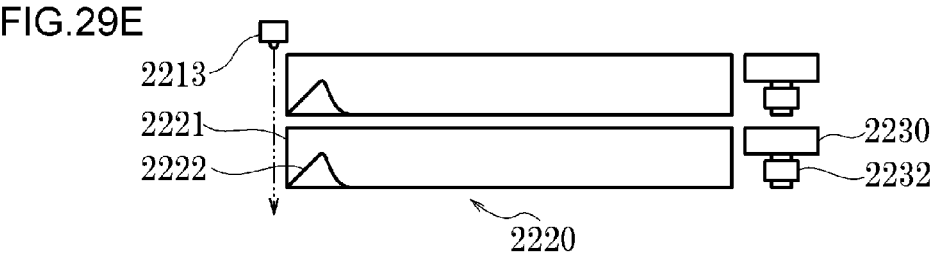
FIG.29E
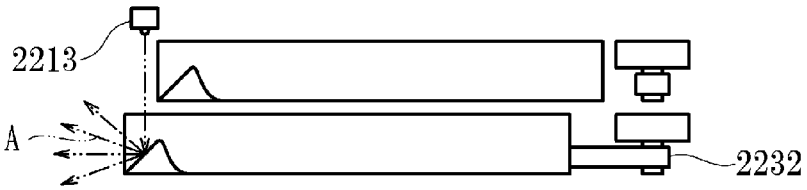
FIG.29F FIG.31A
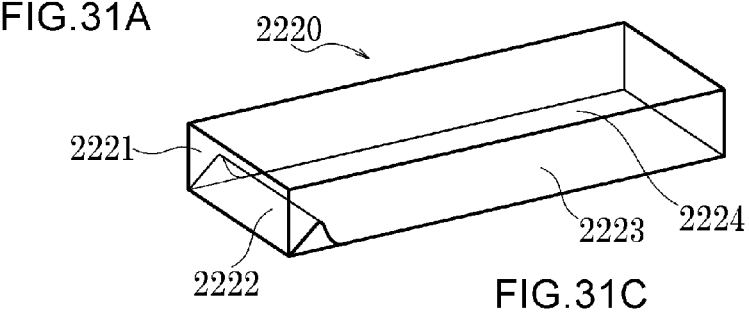
FIG.31B
FIG.31C
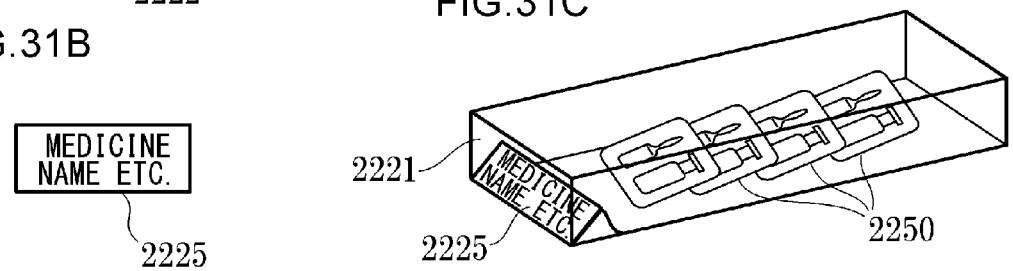

PHARMACEUTICAL PRODUCT CASSETTE, PHARMACEUTICAL PRODUCT DISPENSING APPARATUS AND PHARMACEUTICAL PRODUCT DISPENSING SYSTEM

TECHNICAL FIELD

The present invention relates to a pharmaceutical product cassette for supporting pharmacy operations in hospitals and dispensaries, etc., a pharmaceutical product dispensing apparatus storing a large number of cassettes, and a pharmaceutical product dispensing system in which a pharmaceutical product storage apparatus is provided in addition to the dispensing apparatus.

BACKGROUND ART

Cassettes which align pharmaceutical products for storage, and a medicine storage apparatus in which a large number of such cassettes are arranged in an inclined position are provided (for example, see patent document No. 1). The cassettes and the apparatus are designed to manually retrieve pharmaceutical products, etc.

A medicine dispensing apparatus, capable of ejecting pharmaceutical products automatically by providing a semicylindrical movable lid at the front end of a cassette and by axially rotating the lid, is also available (see, for example, patent document No. 2). A dispensing and transporting mechanism, which retrieves a pharmaceutical product stored in the apparatus from a pharmaceutical product outlet of a cassette and conveys the product to a predetermined position, is built in the apparatus.

There is also developed a medicine dispensing apparatus provided with a medicine transporting apparatus which horizontally moves the medicine ejected from a cassette, a descent guidance member which causes the medicine to fall and collects the medicine, and a carrier transporting apparatus which transports a carrier to a position for introducing the collected medicine into the carrier (see, for example patent document No. 3).

[Patent Document No. 1]
JP 2002-011072 (page 1)
[Patent Document No. 2]
JP 2004-275550 (page 1)
[Patent Document No. 3]
JP 2004-344420 (page 1)
[Patent Document No. 4]
JP 2001-198194 (FIG. 5, FIG. 11)
[Patent Document No. 5]
JP 2004-148036 (page 1, FIG. 4)
[Patent Document No. 6]
JP 2004-187958 (page 1, FIG. 3)

DISCLOSURE OF THE INVENTION

Problem to be Solved by the Invention

Such a cassette and dispensing apparatus allow alignment and storage of various kinds of medicines and pharmaceutical products, and automatic ejection and collection of desired ones for dispensing.

In the case of pharmaceutical products in a container, like infusion bottles, which have a flat shape and which do not easily roll, however, alignment and storage of the products is possible, but, in order to slide the products on a gentle slope under their own weight in a stable manner, frictional force must be reduced by, for example, arranging rollers on the sliding surface.

If a large number of comparatively heavy pharmaceutical products like infusion bottles are aligned on the sliding surface of a row of rollers, however, the driving force which will be applied to a pharmaceutical product at the head of a queue is considerable.

To accept the driving force with a conventional semi-cylindrical movable lid and to place the lid into axial rotation at the time of ejection, a large driving force would be needed. To fit a lid between the head pharmaceutical product and the following pharmaceutical product, an especially large driving force would be needed. For this reason, not only an ejecting member such as a movable lid should be reinforced but also a larger actuator, such as an electric motor, must be used for increase of power.

However, such an increase in size is contradictory to the requirement for cost reduction or compact implementation.

Accordingly, a technical challenge is to modify and improve the shape, etc. of an ejecting member so that the actuator is efficiently accommodated beneath the sliding surface, even when the sliding surface is formed by rollers.

Means to Solve the Problem

An embodiment of the present invention relates to a pharmaceutical product cassette. The pharmaceutical product cassette aligns pharmaceutical products on a sliding surface having a gentle slope for storage and sequential ejection. The sliding surface is formed by a row of rollers in the direction of slope, an ejecting member is formed as a series of a flat plate and a curved plate and is provided in the neighborhood of the descent end of the sliding surface, the flat plate is pivotably supported such that the pivot center is located on an extension of the sliding surface, the curved plate extends from the end of the flat plate toward the sliding surface to a space below the flat plate, maintaining a constant distance from the pivot center, and an actuator for pivotally moving the ejecting member is provided underneath the sliding surface.

Another embodiment of the present invention relates to a pharmaceutical product dispensing apparatus. The apparatus may comprise: a cassette storage unit mentioned above which stores a plurality of pharmaceutical product cassettes, and a collecting and dispensing mechanism which collects and dispenses a pharmaceutical product ejected from the cassette.

Another embodiment of the present invention also relates to a pharmaceutical product dispensing apparatus. The apparatus may comprise: racks having a gentle slope on which sliding surfaces, each formed by a row of rollers in the direction of slope, are arranged in a level direction; partitions which are fitted to the racks and partition the arrangement of sliding surfaces; ejecting members each provided with: a flat plate pivotably supported such that the pivot center is located on an extension of the sliding surface; and a curved plate which extends from an end of the flat plate toward the sliding surface to a space below the flat plate, maintaining a constant distance from the pivot center, each of the ejecting members being provided in the neighborhood of the descent end of the sliding surface. The apparatus may further comprise an actuator provided underneath the sliding surface and pivotally moving the ejecting member; and a collecting and dispensing mechanism which collects and dispenses a pharmaceutical product ejected by the ejecting member.

Another embodiment of a present invention is a pharmaceutical product cassette. The cassette aligns pharmaceutical products on a sliding surface having a gentle slope for storage and sequential ejection. The sliding surface may be formed by rows of rollers in the direction of slope, a cam mechanism or a link mechanism may be provided, in which are provided a first follower, a second follower and a driver for actuating the followers, a tilting plate forming an ejecting mechanism together with the first follower and the second follower may be provided in the neighborhood of the descent end of the sliding surface, the tilting plate may be contiguous with the sliding surface, the first follower may be provided toward the sliding surface, and may be projected above tilting plate when actuated, and, in an ordinary state, may be flush with the tilting plate or lowered below the plate, the second follower may be further away from the sliding surface, and may be flush with or lowered below the tilting plate when actuated, and, in an ordinary state, may be projected above the tilting plate, and the driver and the actuator actuating the driver may be provided beneath the sliding surface.

Pharmaceutical product dispensing apparatus may be provided with the cassette storage unit which stored many abovementioned pharmaceutical product cassettes, and the collecting and dispensing mechanism which collects and dispenses the pharmaceutical product ejected from them.

Another embodiment of the present invention relates to a pharmaceutical product dispensing apparatus. The apparatus may comprise: racks having a gentle slope on which sliding surfaces, each formed by a row of rollers in the direction of slope, are arranged in a level direction; partitions which are fitted to the racks and partition the arrangement of sliding surfaces; an ejecting mechanism provided in the neighborhood of the descent end of the sliding surface and provided with: a tilting plate contiguous with the sliding surface; a first follower which is provided toward the sliding surface, projected above tilting plate when actuated, and, in an ordinary state, flush with the tilting plate or lowered below the plate; and a second follower which is further away from the sliding surface, flush with or lowered below the tilting plate when actuated, and, in an ordinary state, projected above the tilting plate. The apparatus may further comprise a driver and an actuator actuating the driver, which are provided beneath the sliding surface and form a cam mechanism or a link mechanism for actuating the first follower and the second follower; and a collecting and dispensing mechanism which collects and dispenses a pharmaceutical product ejected by the ejecting member.

Another embodiment of the present invention relates to a pharmaceutical product dispensing system. The system may comprise: a pharmaceutical product dispensing apparatus which aligns rows of pharmaceutical products for storage so that the products are sequentially ejectable, and which automatically discharges the products from the rows and guides the products downward for collection; and a pharmaceutical product storage apparatus which holds a two-dimensional array of a large number of containers accommodating pharmaceutical products so that the containers can be drawn forward, and which is configured to advance the containers by using container opening mechanisms provided behind the containers, the dispensing apparatus and the storage apparatus being provided side by side, wherein a work table may be attached to the pharmaceutical storage apparatus, a chute may be formed by cutting a portion of the work table, and a weighing scale may be provided in the chute. The system may further be provided with a transporting mechanism for feeding a product ejected by the pharmaceutical product dispensing apparatus to the chute. The pharmaceutical product dispensing apparatus may be configured to maintain the products in alignment on the sliding surface formed by a row of rollers, and to advance the products on the sliding surface while maintaining alignment thereof. The pharmaceutical product dispensing apparatus may further be configured to sequentially eject the products, according to alternate up-and-down movement of first and second followers of a cam mechanism or a link mechanism. The pharmaceutical product storage apparatus may be provided with a light projecting member for projecting light passing through a space in front of at least some of the containers in a pushed-back state. A visualizer configured to direct the projected light forward may be formed in or attached to the front end of each of the containers.

Another embodiment of the present invention also relates to a pharmaceutical product dispensing system. The system may comprise: a pharmaceutical product dispensing apparatus which aligns rows of pharmaceutical products for storage so that the products are sequentially ejectable, and which automatically discharges the products from the rows and guides the products downward for collection; and a pharmaceutical product storage apparatus which holds a two-dimensional array of a large number of containers accommodating pharmaceutical products so that the containers can be drawn forward, and which is configured to advance the containers by using container opening mechanisms provided behind the containers, the dispensing apparatus and the storage apparatus being provided side by side. The pharmaceutical product dispensing apparatus may be configured to maintain the products in alignment on a sliding surface formed by a row of rollers, and to advance the products on the sliding surface while maintaining alignment thereof. The pharmaceutical product dispensing apparatus may further be configured to sequentially eject the products, according to alternate up-and-down movement of first and second followers of a cam mechanism or a link mechanism. The pharmaceutical product storage apparatus may be provided with a light projecting member for projecting light passing through a space in front of at least some of the containers in a pushed-back state. A visualizer configured to direct the projected light forward may be formed in or attached to the front end of each of the containers.

Another embodiment of the present invention also relates to a pharmaceutical product dispensing system. The system may comprise: a pharmaceutical product dispensing apparatus which aligns rows of pharmaceutical products for storage so that the products are sequentially ejectable, and which automatically discharges the products from the rows and guides the products downward for collection; and a pharmaceutical product storage apparatus which holds a two-dimensional array of a large number of containers accommodating pharmaceutical products so that the containers can be drawn forward, and which is configured to advance the containers by using container opening mechanisms provided behind the containers, the dispensing apparatus and the storage apparatus being provided side by side. A work table may be attached to the pharmaceutical storage apparatus, a chute may be formed by cutting a portion of the work table, and a weighing scale may be provided in the chute. The system may further be provided with a transporting mechanism for feeding a product ejected by the pharmaceutical product dispensing apparatus to the chute.

Another embodiment of the present invention relates to a pharmaceutical product cassette. The cassette aligns pharmaceutical products on a sliding surface having a gentle slope for storage and sequential ejection, and which sequentially ejects the products by using ejecting mechanisms provided in the neighborhood of the descent end of the sliding surface. The sliding surface may be formed by arranging rollers in first rows of rollers in the direction of slope, and each of the ejecting mechanisms may comprise: a fitting part removably fitted to the front end of the first rows of rollers; a second row of rollers in which fewer rollers than those forming the sliding surface are arranged in rows; a stopper which is planted in the fitting part and which is projected above an extension of the sliding surface; and an elevating mechanism which is fitted to the fitting part, and which, in an ordinary state, locates the second row of rollers on the extension of the sliding surface and, in an actuated state, elevates the second row of rollers above the stopper.

Pharmaceutical product dispensing apparatus may be provided with the cassette storage unit which stored many above-mentioned pharmaceutical product cassettes, and the collecting and dispensing mechanism which collects and dispenses the pharmaceutical product ejected from them.

Another embodiment of the present invention relates to a pharmaceutical product dispensing apparatus. The apparatus may comprise: racks having a gentle slope on which a sliding surface is formed by arranging a row of rollers in the direction of slope, in each of first rows of rollers arranged in a level direction; partitions which are fitted to the racks and partition the arrangement of sliding surfaces; ejecting mechanisms each provided with: a fitting part removably fitted to the front end of a rack or a partition, or fitted to the front end of both a rack and a partition; a second row of rollers in which fewer rollers than those forming the sliding surface are arranged in rows; a stopper which is planted in the fitting part and which is projected above an extension of the sliding surface; and an elevating mechanism which is fitted to the fitting part, and which, in an ordinary state, locates the second row of rollers on an extension of the sliding surface and, in an actuated state, elevates the second rows of roller above the stopper. The apparatus may further comprise a collecting and dispensing mechanism which collects and dispenses a pharmaceutical product ejected by the ejecting member.

Another embodiment of the present invention relates to a pharmaceutical product dispensing system. The system may comprise: a pharmaceutical product dispensing apparatus and a pharmaceutical product storage apparatus arranged side by side, the pharmaceutical product dispensing apparatus aligning rows of pharmaceutical products for storage so that the products are sequentially ejectable, and automatically discharging the products from the rows and guiding the products downward for collection, the pharmaceutical product storage apparatus holding a two-dimensional array of a large number of containers accommodating pharmaceutical products so that the containers can be drawn forward, and the pharmaceutical product storage apparatus being configured to advance the containers by using container opening mechanisms provided behind the containers. A work table may be attached to the pharmaceutical storage apparatus, a chute may be formed by cutting a portion of the work table, a weighing scale may be provided in the chute. The system may further be provided with a transporting mechanism for feeding a product ejected by the pharmaceutical product dispensing apparatus to the chute. The pharmaceutical product dispensing apparatus may be configured to maintain the products in alignment on a sliding surface formed by a large number of rollers, and to advance the products on the sliding surface while maintaining alignment thereof. The pharmaceutical product dispensing apparatus may further be configured to sequentially eject the products, according to alternate up-and-down movement of rows of fewer rollers with respect to a planted and secured stopper. The pharmaceutical product storage apparatus may be provided with a light projecting member for projecting light passing through a space in front of at least some of the containers in a pushed-back state. A visualizer configured to direct the projected light forward may be formed in or attached to the front end of each of the containers.

Another embodiment of the present invention also relates to a pharmaceutical product dispensing system. The system may comprise: a pharmaceutical product dispensing apparatus and a pharmaceutical product storage apparatus arranged side by side, the pharmaceutical product dispensing apparatus aligning rows of pharmaceutical products for storage so that the products are sequentially ejectable, and automatically discharging the products from the rows and guiding the products downward for collection, the pharmaceutical product storage apparatus holding a two-dimensional array of a large number of containers accommodating pharmaceutical products so that the containers can be drawn forward, and the pharmaceutical product storage apparatus being configured to advance the containers by using container opening mechanisms provided behind the containers, wherein the pharmaceutical product dispensing apparatus may be configured to maintain the products in alignment on a sliding surface formed by a large number of rollers, and to advance the products on the sliding surface while maintaining alignment thereof. The pharmaceutical product dispensing apparatus may further be configured to sequentially eject the products, according to alternate up-and-down movement of rows of fewer rollers with respect to a planted and secured stopper. The pharmaceutical product storage apparatus may be provided with a light projecting member for projecting light passing through a space in front of at least some of the containers in a pushed-back state. A visualizer configured to direct the projected light forward may be formed in or attached to the front end of each of the containers.

Advantage of the Present Invention

According to the present invention, an inexpensive and small-sized pharmaceutical product cassette and dispensing apparatus can be implemented.

BRIEF DESCRIPTION OF THE DRAWINGS

FIG. 1A is a perspective view showing the appearance of the cassette; FIG. 1B is a sectional side view of the cassette; FIG. 1C is a side view of an ejecting member; FIG. 1D is a front view of the ejecting member; FIG. 1E is a perspective view of the ejecting member; and FIG. 1F is a perspective view showing infusion bottles aligned for storage in the cassette.

FIGS. 2A-2E are all sectional side views of the cassette.

FIGS. 3A-3B show the structure of a pharmaceutical product dispensing apparatus of a type provided with a row of cassettes, according to an illustrative embodiment 1-2 of the first embodiment.

FIG. 3A is a front view (BB section); and FIG. 3B is a side view (AA section).

FIGS. 4A-4B show the structure of a pharmaceutical product dispensing apparatus of a type partitioned by racks, according to an illustrative embodiment 1-3 of the first embodiment.

FIG. 4A is a front view (DD section); and FIG. 4B is a side view (CC section).

FIG. 5A is a top view of an upper rack; FIG. 5B is a front view of the upper rack; FIG. 5C is a top view of a lower rack; and FIG. 5D is a front view of the lower rack.

FIG. 6A is a perspective view showing the appearance of a cassette; FIG. 6B and FIG. 6C are sectional side views of the cassette; and FIG. 6D is a perspective view showing box-shaped pharmaceutical products aligned for storage in the cassette.

FIGS. 7A-7E are sectional side views of the cassette.

FIGS. 8A-8B show the structure of an automatic pharmaceutical product dispensing apparatus of a type provided with a row of cassettes, according to an illustrative embodiment 2-2 of the second embodiment.

FIG. 8A is a front view (BB section); and FIG. 8B is a side view (AA section).

FIGS. 9A-9B show the structure of an automatic pharmaceutical product dispensing apparatus of a type partitioned by racks, according to an illustrative embodiment 2-3 of the second embodiment.

FIG. 9A is a front view (DD section); and FIG. 9B is a side view (CC section).

FIG. 10A is a top view of an upper rack; FIG. 10B is a front view of the upper rack; FIG. 10C is a top view of a lower rack; and FIG. 10D is a front view of the lower rack.

FIG. 11A is a top view of the cassette; FIG. 11B is a sectional side view of the cassette; and FIGS. 11C and 11D are sectional side views of an ejecting mechanism.

FIGS. 12A-12B show the structure of an automatic pharmaceutical product dispensing apparatus of a type provided with a row of cassettes, according to an illustrative embodiment 2-5 of the second embodiment.

FIG. 12A is a front view (BB section); and FIG. 12B is a side view (AA section).

FIGS. 13A-13B show the structure of an automatic pharmaceutical product dispensing apparatus of a type partitioned by racks, according to an illustrative embodiment 2-6 of the second embodiment.

FIG. 13A is a front view (DD section); and FIG. 13B is a side view (CC section).

FIGS. 14A-14C show the structure of a pharmaceutical product dispensing system according to an illustrative embodiment 2-7 of the second embodiment.

FIG. 14A is a front view of the whole system; FIG. 14B is a front view of a semi-automatic pharmaceutical product storage apparatus; and FIG. 14C is a perspective view of the apparatus.

FIG. 15A is a front view; FIG. 15B is a perspective view; FIG. 15C is a perspective view of a container; FIG. 15D is a perspective view of a container opening mechanism; and FIGS. 15E and 15F are right side view of an essential part.

FIG. 17A is a perspective view of a container; FIG. 17B is a front view of a name plate; and FIG. 17C is a perspective view of the container.

FIGS. 18A-18C are right side views of an essential part.

FIGS. 19A-19E show the structure of a pharmaceutical product cassette according to an illustrative embodiment 3-1 of a third embodiment.

FIG. 19A is a perspective view showing the appearance of a cassette main part (first rows of rollers); FIG. 19B is a perspective view showing the appearance of an ejecting mechanism (second rows of rollers); FIGS. 19C and 19D are perspective views showing the appearance of the entire cassette; and FIG. 19E is a perspective view showing box-like pharmaceutical products aligned for storage in the cassette.

FIGS. 20A-20C are perspective views of an ejecting mechanism.

FIG. 21A is a sectional front view of the ejecting mechanism; and FIGS. 21B and 21C are side view of the elevating mechanism.

FIGS. 22A-22D are all perspective views of the cassette.

FIG. 23A is a perspective view of a planting hole; FIG. 23B is a perspective view of a stopper; FIG. 23C is a perspective view showing how a stopper is planted; FIG. 23D is a perspective view of a planting hole; and FIGS. 23E and 23F are perspective views of a stopper.

FIGS. 25A-25B show the structure of an automatic pharmaceutical product dispensing apparatus of a type provided with a row of cassettes, according to an illustrative embodiment 3-4 of the third embodiment.

FIG. 25A is a front view (BB section); and FIG. 25B is a side view (AA section).

FIGS. 26A-26B show the structure of an automatic pharmaceutical product dispensing apparatus of a type partitioned by racks, according to an illustrative embodiment 3-5 of the third embodiment.

FIG. 26A is a front view (DD section); and FIG. 26B is a side view (CC section).

FIG. 27A is a top view of a tilting rack; FIG. 27B is a front view of the tilting rack; and FIG. 27C is front view showing how an ejecting mechanism (second rows of rollers) is fitted to the tilting rack (first rows of rollers).

FIG. 28A is a front view of the entire system; FIG. 28B is a front view of a semi-automatic pharmaceutical product storage apparatus; and FIG. 28C is a perspective view of the apparatus.

FIGS. 29A-29F show the mechanical structure of a semi-automatic pharmaceutical product storage apparatus.

FIG. 29A is a front view; FIG. 29B is a perspective view; FIG. 29C is a perspective view of a container; FIG. 29D is a perspective view of a container opening mechanism; and FIGS. 29E and 29F are right side views of an essential part.

FIGS. 31A-31C show the structure of a semi-automatic pharmaceutical product storage apparatus according to an illustrative embodiment 3-7 of the second embodiment.

FIG. 31A is a perspective view of a container; FIG. 31B is a front view of a name plate; and FIG. 31C is a perspective view of the container.

FIGS. 32A-32C are right side views of an essential part.

Figure 1A:
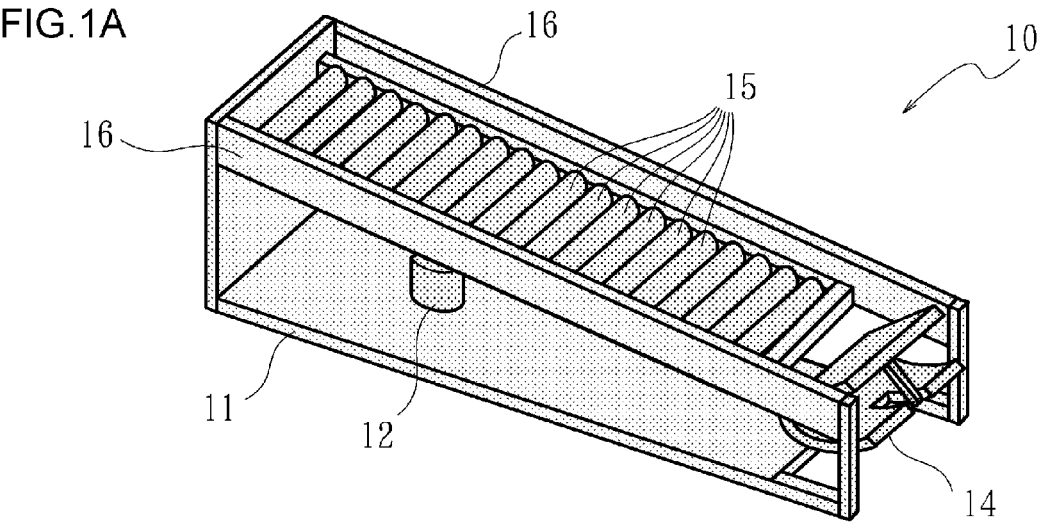
FIGS. 1A-1F show the structure of a pharmaceutical product cassette according to an illustrative embodiment 1-1 of a first embodiment of the present invention.

DESCRIPTION OF THE REFERENCE NUMERALS 10 pharmaceutical cassette, 11 bottom plate, 12 electric motor, 13 link, 14 ejecting member, 14a flat plate, 14b shaft, 14c curved plate, 14d notch, 14e small hole, 14f arm, 15 roller (sliding surface), 16 side plate, 20 infusion bottle, 30 pharmaceutical product dispensing apparatus, 31 descent guidance channel, 32 horizontal transportation channel, 33 dispensing outlet, 40 pharmaceutical product dispensing apparatus, 41 lower rack, 42 upper rack, 43 partition, 1010 pharmaceutical product cassette, 1011 bottom plate, 1012 motor, 1013 cam driver, 1014 ejecting mechanism, 1014a tilting plate, 1014b first cam follower, 1014c second cam follower, 1015 roller (sliding surface), 1016 side plate, 1020 pharmaceutical product, 1030 pharmaceutical product dispensing apparatus, 1031 descent guidance channel, 1032 transporting mechanism, 1033 dispensing outlet, 1040 pharmaceutical product dispensing apparatus, 1041 lower rack, 1042 upper rack, 1043 partition, 1050 pharmaceutical product cassette, 1051 base plate, 1052 rear pod plate, 1053 link driver, 1054 ejecting mechanism, 1054a tilting plate, 1054b first link follower, 1054c second link follower, 1060 pharmaceutical product dispensing apparatus, 1070 pharmaceutical product dispensing apparatus, 1071 rear pod frame, 1080 pharmaceutical product dispensing apparatus, 1100 pharmaceutical product storage apparatus, 1111 housing, 1112 shutter, 1114 storing unit, 1115 work table, 1116 chute, 1117 discharge opening, 1118 incoming port, 1150 indicator, 1160 transporting mechanism, 1170 weighing scale, 1200 pharmaceutical product storage apparatus, 1211 housing, 1212 shutter, 1213 light projecting member, 1214 storing unit, 1215 drawer, 1216 electric equipment, 1220 container, 1221 front plate, 1222 slope, 1223 side plate, 1224 bottom plate, 1225 name plate, 1230 motor, 1231 rotation shaft, 1232 eccentric cam, 1233 origin sensor, 1250 pharmaceutical product, 1260 light receiving member, 1300 main controller, 1310 subcontroller, 1311 subcontroller, 1312 subcontroller 2010 pharmaceutical product cassette, 2011 roller (sliding surface), 2012 cassette main part, 2012a first rows of rollers, 2012b engaging part, 2012c connector, 2012d rear pod, 2013 side plate, 2014 ejecting mechanism, 2014a fitting part, 2014b engaging part, 2014c connector, 2014d second rows of rollers, 2014e loose insertion hole, 2014f cam (elevating mechanism), 2014g link (elevating mechanism), 2015 stopper, 2016 sensor, 2017 side plate, 2018 motor, 2019 planting hole, 2020 pharmaceutical product, 2030 pharmaceutical product dispensing apparatus, 2031 descent guidance channel, 2032 transporting mechanism, 2033 dispensing outlet, 2040 pharmaceutical product dispensing apparatus, 2042 tilting rack, 2042a first rows of rollers, 2043 partition, 2080 pharmaceutical product dispensing apparatus, 2100 pharmaceutical product storage apparatus, 2111 housing, 2112 shutter, 2114 storing unit, 2115 work table, 2116 chute, 2117 discharge opening, 2118 incoming port, 2150 indicator, 2160 transporting mechanism, 2170 weighing scale, 2200 pharmaceutical product storage apparatus, 2211 housing, 2212 shutter, 2213 light projecting member, 2214 storing unit, 2215 drawer, 2216 electric equipment, 2220 container, 2221 front plate, 2222 slope, 2223 side plate, 2224 bottom plate, 2225 name plate, 2230 motor, 2231 rotation shaft, 2232 eccentric cam, 2233 origin sensor, 2250 pharmaceutical product, 2260 light receiving member, 2300 main controller, 2310 subcontroller, 2311 subcontroller, 2312 subcontroller

BEST MODE FOR CARRYING OUT THE INVENTION

A description of the best mode of carrying out the present invention will be given by highlighting first through third embodiments.

First Embodiment

A first embodiment of the present invention relates to a pharmaceutical product cassette and a dispensing apparatus for supporting pharmacy operations in hospitals and dispensaries, etc., and, more particularly, to a pharmaceutical product cassette and dispensing apparatus which align pharmaceutical products for storage and sequentially eject the products, starting from the one at the end.

The first embodiment is suitable for automatic ejection and automatic dispensing of pharmaceutical products like infusion bottles which do not roll easily. However, the embodiment is not only applicable to pharmaceutical products which do not roll easily but also to products which roll easily. For example, pharmaceutical products referred to in the specification encompass packaged injection medicines such as ampoules, vials and contrast medium; medicines such as tablets, powder, paste and eye lotion which are accommodated in boxes and bottles; and other auxiliary medicines so long as they can be aligned for storage.

The pharmaceutical cassette and the dispensing apparatus according to the first embodiment comprises a sliding surface having a gentle slope on which pharmaceutical products are placed and aligned for storage and sequential ejection, an ejecting member for ejecting pharmaceutical products one by one from the end thereof, and an actuator for actuating the ejecting member when ejecting a pharmaceutical product. More specifically, the sliding surface is formed by a row of rollers in the direction of slope. The ejecting member is formed as a series of a flat plate and a curved plate and is provided in the neighborhood of the descent end of the sliding surface. The flat plate is pivotable such that the pivot center is located on the extension of the sliding surface. The curved plate extends from the end of the flat plate toward the sliding surface to a space below the flat plate, maintaining a constant distance from the pivot center. The actuator is provided underneath the sliding surface so as to pivotally moves the ejecting member.

Together, these components make up a pharmaceutical product cassette. By arranging a large number of such cassettes, and combining the cassettes with a collecting and dispensing mechanism, a pharmaceutical product dispensing apparatus is constituted. Alternatively, assemblies may not be turned into cassettes and may be arranged on a rack with partitions. A combination of the arrangement and a collecting and dispensing mechanism also constitutes a pharmaceutical product dispensing apparatus.

In the pharmaceutical product cassette and the dispensing apparatus according to the first embodiment, the ejecting member for ejecting pharmaceutical products one by one in the neighborhood of the descent end of the sliding surface is formed by a series of a flat plate and a curved plate. The flat plate is pivotable such that the pivot center is located on the extension of the sliding surface. The curved plate of the ejecting member is located beneath the flat plate and toward the sliding surface, maintaining a constant distance from the pivot center. By aligning pharmaceutical products for storage on the sliding surface while the end of the flat plate of the ejecting member toward the sliding surface is tilted downward, the pharmaceutical product at the head of a queue comes in contact with the flat plate of the ejecting member and is prevented from advancing. The actuator pivotally moves the ejecting member when ejecting a pharmaceutical product. As the end of the flat plate toward the sliding surface is elevated accordingly, the pharmaceutical product at the head of the queue rests upon the flat plate substantially at the center thereof. The product then reaches beyond the flat plate and leans against the end thereof toward the ejecting side.

This allows the weight of the pharmaceutical product at the head of the queue to assist the pivotal movement of the ejecting member, with the result that the end of the flat plate toward the sliding surface and the curved plate of the ejecting member are interposed between the product at the head and the next product, preventing the next product from advancing. As the pharmaceutical product at the head falls from the flat plate and the ejecting member moves pivotally in a reverse direction returns to the original state, the next pharmaceutical product is brought to the head position and is prevented from advancing by coming into contact with the flat plate of the ejecting member.

By allowing the pharmaceutical product at the head to assist the pivotal movement as the ejecting member is interposed between the product at the head and the next product, it is ensured that a small and inexpensive actuator serves the purpose, even if the advancing force of the pharmaceutical products is increased as a result of forming the sliding surface by a row of rollers. Providing such an actuator underneath the sliding surface results in compact overall size of the apparatus. Thus, according to the first embodiment, the pharmaceutical product cassette and the dispensing apparatus which are inexpensive and small-sized are implemented.

Specific embodiments of the pharmaceutical product cassette and the dispensing apparatus according to the first embodiment will be described using illustrative embodiments 1-1 through 1-7.

The illustrative embodiment 1-1 shown in FIGS. 1A-2E is an embodiment of the pharmaceutical product cassette mentioned above. The illustrative embodiment 2-2 shown in FIGS. 3A-3B is an embodiment of the pharmaceutical product dispensing apparatus mentioned above of a type provided with a row of cassettes. The illustrative embodiment 1-3 shown in FIGS. 4A-5D is an embodiment of the pharmaceutical product dispensing apparatus mentioned above of a type partitioned by racks.

In the illustration, fasteners such as bolts, connectors such as hinges, electric circuits such as motor drivers and electronic circuits such as controllers are omitted for brevity, highlighting those elements necessary to explain the invention and related elements. In the figures, portions indicated by shading indicate cross sections, and dotted portions indicate the surface of a member instead of a section.

Illustrative Embodiment 1-1

Figure 1B:
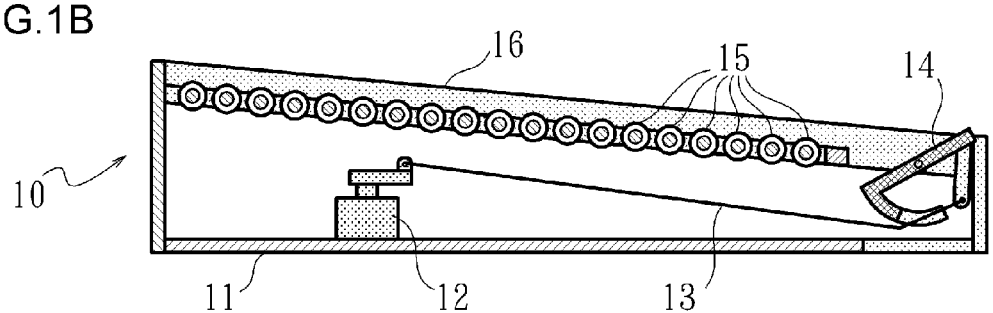
Figure 1C:
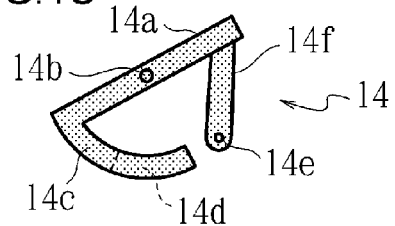
Figure 1D:
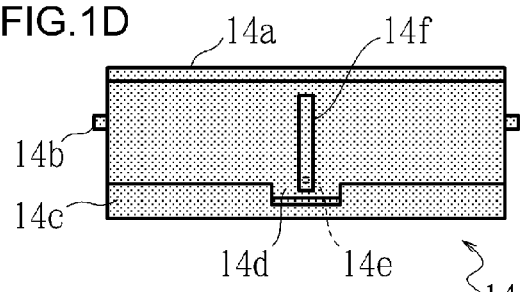
Figure 1E:
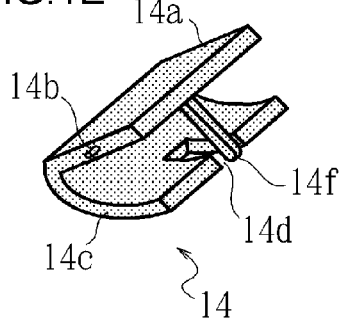
Figure 1F:
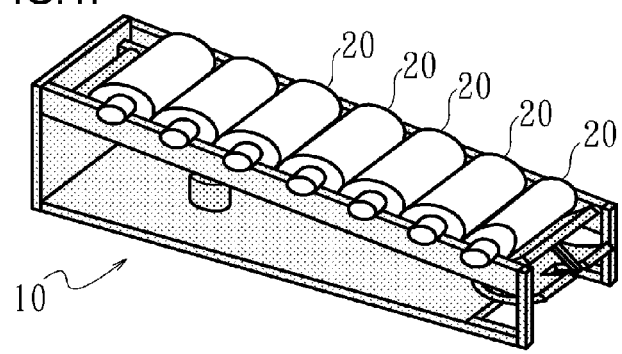
Figure 2A:
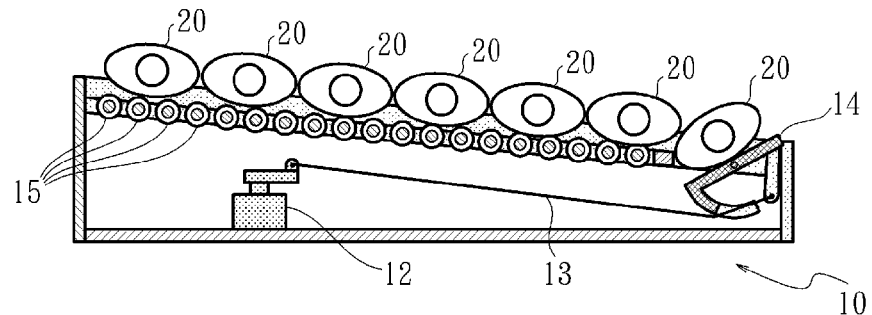
FIGS. 2A-2E show the time sequence of operation of ejection from the pharmaceutical product cassette according to the illustrative embodiment 1-1.
Figure 2B:
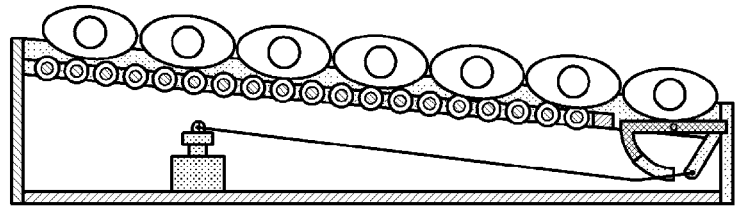
Figure 2C:
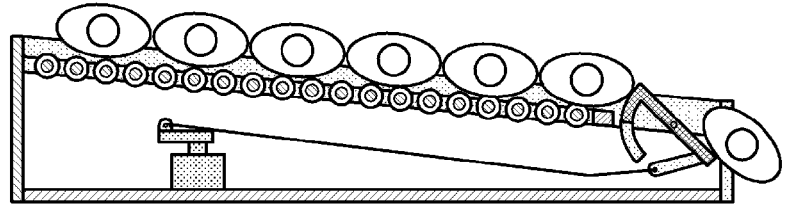
Figure 2D:
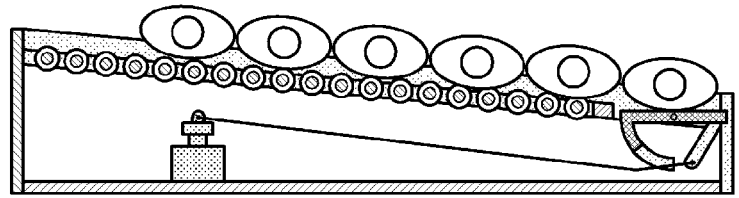
Figure 2E:
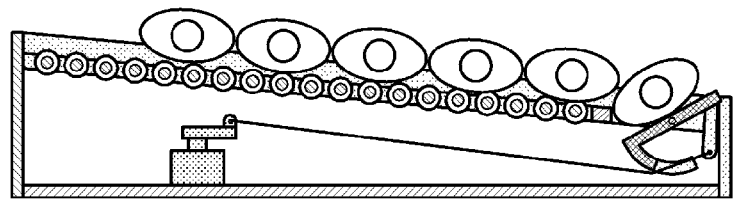

The specific structure of the pharmaceutical product cassette according to the illustrative embodiment 1-1 of the first embodiment will be described with reference to the associated drawings. FIG. 1A is a perspective view showing the appearance of a cassette 10; FIG. 1B is a sectional left side view of the cassette 10; FIG. 1C is a left side view of an ejecting member 14; FIG. 1D is a front view of the ejecting member 14; FIG. 1E is a perspective view of the ejecting member 14; and FIG. 1F is a perspective view showing infusion bottles 20 aligned for storage in the cassette 10.

The pharmaceutical product 10 (see FIGS. 1A and 1B) comprises a bottom plate 11 as a base; an electric motor 12 as an actuator; a link 13 as a means for power transmission and for converting rotation into linear motion, an ejecting member 14 responsible for sequential ejection, a group of rollers 15 forming a sliding surface having a gentle slope, and side plates 16 responsible for aligning pharmaceutical products accommodated.

In the illustrated example, the bottom plate 11 is flat plate of a rectangular shape. The bottom plate may remain fixed on a flat surface such as a desktop or a rack or is removably placed thereon. Articles of other shapes, such as a framework structure, may also serve the purpose so long as it is capable of supporting the electric motor 12 fixed thereon.

The rollers 15 are arranged in a row above bottom plate 11 in the longitudinal direction (in the illustration, sideways). The row of rollers is slightly inclined in the longitudinal direction. For example, the surface has a gentle slope of about several degrees. The upper envelope of the group of rollers provided in the direction of slope forms a sliding surface. In the illustrated example, only one row of rollers is provided. Alternatively, a plurality of rows may constitute a sliding surface.

The sliding surface 15 is flanked by the side plates 16 on both sides so as to define a space for alignment and storage of pharmaceutical products such as the infusion bottles 20 (see FIG. 1F). The lower end of the sliding surface 15, sandwiched by the side plates 16, in the longitudinal direction (the direction of slope) (in FIGS. 1A and 1B, toward the right) represents a descent end at which the accommodated pharmaceutical products fall.

The ejecting member 14 is provided in the neighborhood of the descent end and is configured to prevent the infusion bottle 20 from slipping and to perform sequential ejection, in accordance with the state of pivotal movement. More specifically (see, FIGS. 1C-1E), the ejecting member 14 comprises a flat plate 14$a$ of a rectangular shape having a size capable of carrying a single infusion bottle 20, a pair of pivot shafts 14$b$ planted on two of the four side sides facing the side plates 16 substantially at the center of the sides, a curved plate 14$c$ connected to the end of the flat plate 14$a$ toward the sliding surface 15 and extending to a space below the ejecting member 14, and an arm 14$f$ fixed to the bottom of the flat plate 14$a$ at the upper base end and is formed with a small through hole 14$e$ at the lower distal. A notch 14$d$ for escaping the link 13 is formed in the curved plate 14$c$ near the distal end of the arm 14$f$.

The curved plate 14$c$ is of a form forming a part of a hypothetical cylinder formed around a line connecting the pair of pivot shafts 14$b$ as an axial center. A regular distance (radius of the cylinder) is maintained between the plate and the line. Thus, as the pair of pivot shafts 14$b$ are inserted into a bearing or the like (not shown) inwardly provided at the distal end of the parallel side plates 16, it is ensured that the ejecting member 14 (see FIGS. 1A and 1B) is pivotable and rotatable around a line connecting the pair of pivot shafts 14b. Along with this, the flat plate 14a is pivotably supported such that the pivot center is located on the extension of the sliding surface 15. The curved plate 14c maintains a constant distance from the pivot center.

In response to an instruction for ejection from a controller (not shown), the electric motor 12 causes its arm to make one full turn. The motor is provided on the bottom plate 11 located below the sliding surface 15. The electric motor 12 is provided toward the upper end, instead of the descent end, of the sliding surface 15 in the direction of slope and away from the ejecting member 14, in order not to interfere with the rollers 15 and to ensure that the bottom plate 11 and the sliding surface 15 are not excessively spaced apart. The arm end of the electric motor 12 is connected to the small hole 14e at the distal end the arm 14f of the ejecting member 14 via the link 13. As the electric motor 12 causes its arm to make a full turn, the ejecting member 14 moves pivotally accordingly. The pivotal movement is on the order of 10-100°. As mentioned later in connection with the operation, the ejecting member reciprocates between a first state, in which the end toward the sliding surface 15 is tilted downward for prevention of slip, and a second state, in which the end toward the sliding surface 15 is tilted upward for sequential ejection.

The mode of using the pharmaceutical product cassette 10 according to the illustrative embodiment 1-1 and its operation will be described with reference to the drawings. FIGS. 2A-2E are all sectional left side views of the cassette 10 and show the time sequence of operation of ejection from cassette 10.

The infusion bottles 20 (pharmaceutical products) are placed on the sliding surface one after another in a lying position. The infusion bottles 20 are then aligned on the sliding surface 15 in the direction of slope (see FIGS. 1F and 2A). Normally, the ejecting member 14 is positioned to prevent a slip. The infusion bottles 20 are aligned for storage in the cassette 10 such that the bottle 20 at the head of the queue rests upon the top surface of the flat plate 14a of the ejecting member 14 and remains at rest at the descent end of the sliding surface. The next and subsequent infusion bottles 20 move closer to the bottle 20 at the head of the queue on the sliding surface 15 to form a series.

In this state, an instruction for ejection is issued. As the electric motor 12 is operated accordingly and the arm thereof is rotated, the ejecting member 14 moves pivotally in association with the rotation of the arm. To be more specific, when the arm is rotated ¼ (see FIG. 2B), the flat plate 14a of the ejecting member 14 is placed in a level position, and the infusion bottle 20 at the head remains on the flat plate 14a. As the arm is further rotated, almost completing a ½ turn (see FIG. 2C), the ejecting member 14 is positioned for sequential ejection. The connection between the flat plate 14a and the curved plate 14c of the ejecting member 14 is elevated so that the curved plate 14c is interposed in front of the next infusion bottle 20. Thus, the next and subsequent infusion bottles 20 are prevented from advancing. Meanwhile, the infusion bottle 20 at the head slides on the flat plate 14a and moves toward the ejecting side, as a result of the pivotal movement lowering the ejecting side of the flat plate 14a (i.e., the end distal from the sliding surface). The seesaw motion allows the weight of the infusion bottle 20 at the head to assist the pivotal movement of the ejecting member 14, allowing the curved plate 14c to overcome the friction with the next infusion bottle 20 and is elevated smoothly.

Thereafter, when the infusion bottle 20 at the head falls and the arm is rotated ¾ (see FIG. 2D), the curved plate 14c of the ejecting member 14 is lowered, and the flat plate 14a is placed in a level position. The infusion bottle 20, which is now at the head of the queue, leaves the sliding surface 15 and rests on the flat plate 14a. The next and subsequent infusion bottles 20 slide on the sliding surface 15 and are displaced by one position each. The driving force from the bottles 20 is applied to the infusion bottle 20 brought to the position at the head of the queue. Meanwhile, as the arm is rotated further, completing one full turn (see FIG. 2E), the ejecting member is returned to a state in which end toward the sliding surface 15 is tilted downward for prevention of slip. Accordingly, the infusion bottles 20 remain aligned for storage.

In this way, the infusion bottles 20 are ejected one after another from the cassette 10.

Illustrative Embodiment 1-2

The specific structure of the pharmaceutical dispensing apparatus of a type provided with a row of cassettes according to the illustrative embodiment 1-2 of the first embodiment will be described with reference to the associated drawings. FIG. 3A is a front view (BB section) of the pharmaceutical product dispensing apparatus 30; and FIG. 3B is a side view (AA section) of the pharmaceutical product dispensing apparatus 30.

This pharmaceutical product dispensing apparatus 30 is configured such that a large number of cassettes 10 described above (in the figure, a total of 12 cassettes in a matrix of 4 rows and 3 columns) are stored in a cassette storage unit. The ejecting sides of the cassettes 10 face forward, and a descent guidance channel 31 is provided in front of the cassettes 10. A horizontal transporting channel 32 forming the collecting and dispensing mechanism in combination with the descent guidance channel 31 is provided below the channel 31. A dispensing outlet 33 is formed at the end of the transportation.

In this case, some of the cassettes 10 align the infusion bottles 20 mentioned above for storage, and other cassettes 10 align other pharmaceutical products for storage.

When the cassette 10 is directed by a controller (not shown) to eject a product in accordance with prescription data or medicine preparation instruction data derived therefrom, the cassette 10 receiving the direction sequentially ejects pharmaceutical products such as the infusion bottles 20 as described above. The pharmaceutical products thus ejected fall down the descent guidance channel 31 onto the horizontal transporting channel 32. The products are transported by the horizontal transporting channel 32 before being brought out the apparatus via the dispensing outlet 33.

In this way, desired pharmaceutical products are automatically dispensed.

Illustrative Embodiment 1-3

Figure 5A:
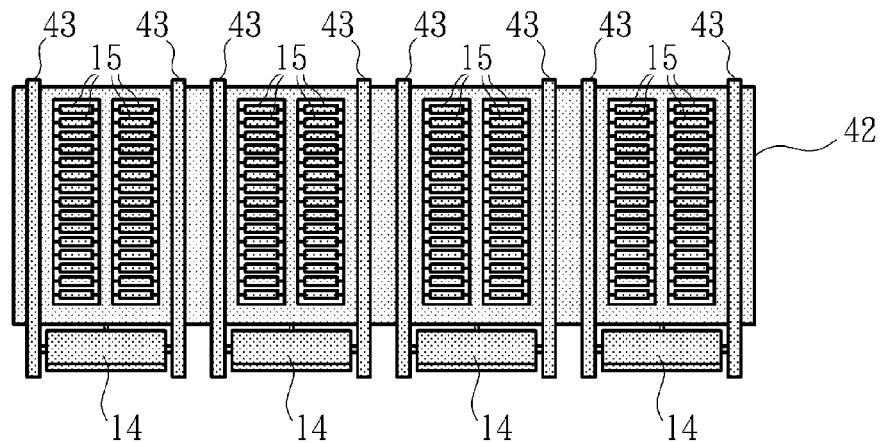
FIGS. 5A-5D show the structure of a rack according to an illustrative embodiment 1-3.
Figure 5B:
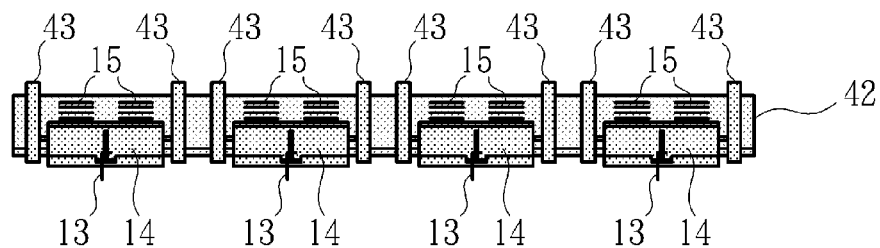
Figure 5C:
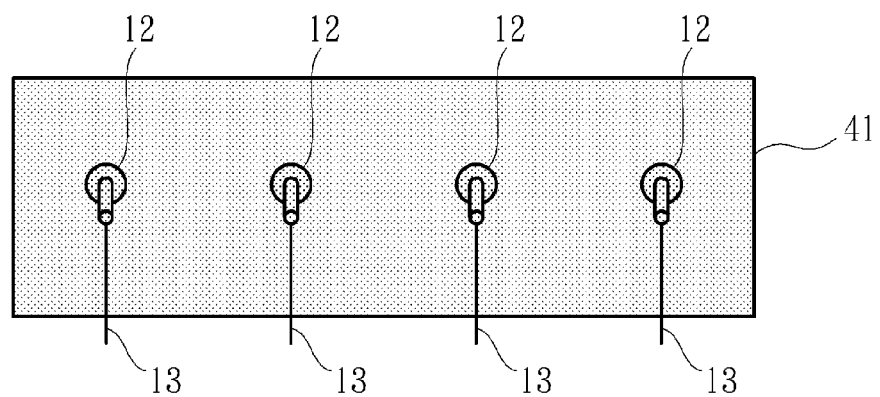
Figure 5D:
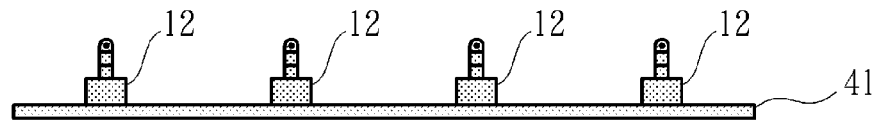

The specific structure of the pharmaceutical product dispensing apparatus of a type partitioned by racks according to the illustrative embodiment 1-3 of the first embodiment will be described with reference to the associated drawings. FIG. 4B is a front view (DD sectional view) of pharmaceutical product dispensing apparatus 40, and FIG. 4B is a side view (CC sectional view) of the pharmaceutical product dispensing apparatus 40. FIGS. 5A-5D show the structure of a rack. FIG. 5A is a top view of an upper rack 42; FIG. 5B is a front view of the upper rack 42; FIG. 5C is a top view of a lower rack 41; and FIG. 5D is a front view of the lower rack 41.

The pharmaceutical product dispensing apparatus 40 differs from the pharmaceutical product dispensing apparatus 30 described above in that equivalents of the plurality of cassettes 10 arranged side by side are built into a lower rack 41 in a level position and an upper rack 42 having a gentle descending slope.

More specifically, a row of rollers 15 forming the sliding surface are provided side by side in the upper rack 42. Partitions 43, which are a substitute for the side plates 16, are also fitted to the upper rack 42. The ejecting members 14 are supported at the end of the upper rack 42. The electric motors 12 are fitted to the lower rack 41.

A plurality of (in the figure, eight rows of) sliding surfaces, each formed by a row of the rollers 15 in the direction of slope of the upper rack 42, are arranged in the level direction, i.e., the longitudinal direction, of the upper rack 42. Removable partitions 43 are provided so as to form blocks each comprising an appropriate number of (in the figure, two rows of) siding surfaces. The ejecting member 14 is pivotably provided in each of the blocks (in the figure, the four blocks) partitioned by the partitions 43. Likewise, the electric motor 15 is provided in association with each of the blocks. The electric motor 15 is provided on the lower rack 41 and beneath the sliding surface 15. Each of the ejecting members 14 is provided at the end of the partition 43 on the upper rack 42. The motor 12 and the member 14 in the same block are connected by the link 13.

In this configuration, each of the blocks partitioned by the partitions 43 corresponds to the aforementioned cassette 10 described above. The usage mode and operation are the same as described above, except that each rack, instead of each cassette, is subject to repair or replacement.

In the illustrated example, two partitions 43 are provided between blocks. Alternatively, only one partition 43 may be provided between blocks if it is ensured that a portion of a pharmaceutical product, such as the top of the infusion bottle 20, is not projected above the partition 43.

The partition 43 and the electric motor 12 may be removable instead of permanently fixed. In this case, the partition and the motor may be selectively provided at intervals defined by the sliding surfaces.

[Other Points of Note]

In the above-mentioned illustrative examples 1-2 and 1-3, the collecting and dispensing mechanism is configured to cause the infusion bottle 20 ejected forward from the cassette 10 to fall, before horizontally transporting the bottle 20, but the mechanism is not limited to this configuration. For example, the infusion bottle 20 ejected from the cassette 10 may be fetched by a mechanism capable of X-Y translation so that the bottle 20 thus collected is transported to the position of dispensing (see, for example, patent document No. 2). Alternatively, the infusion bottle 20 ejected from the cassette 10 may be horizontally moved before causing it to fall for collection (see, for example, patent document No. 3).

Second Embodiment

The second embodiment relates to a pharmaceutical product cassette for supporting pharmacy operations in hospitals and dispensaries, etc., a pharmaceutical product dispensing apparatus storing a large number of cassettes, and a pharmaceutical product dispensing system in which heterogeneous apparatuses are provided side by side. More particularly, the second embodiment relates to a pharmaceutical product cassette which aligns pharmaceutical products for storage and ejects products sequentially, starting from the at the end, a pharmaceutical product dispensing apparatus which dispenses a pharmaceutical product automatically, and a pharmaceutical product dispensing system which dispenses a pharmaceutical product automatically from a pharmaceutical product dispensing apparatus or dispenses a product semi-automatically from a pharmaceutical product storage apparatus.

The second embodiment is suitable for automatic ejection and automatic dispensing of pharmaceutical products like box-packaged medicines which do not roll easily. However, the embodiment is not only applicable to pharmaceutical products which do not roll easily but also to products which roll easily. In addition to box-packaged medicines, pharmaceutical products referred to in the specification encompass, for example, packaged injection medicines such as ampoules, vials and contrast medium; medicines such as tablets, powder, paste and eye lotion which are accommodated in a bottle or the like; and other auxiliary medicines so long as they can be aligned for storage. Pharmaceutical products subject to storage and dispensing by the semi-automatic pharmaceutical product storage apparatus may include those not suitable for aligned storage or free fall ejection.

Base Technology Related to Second Embodiment

If the items stored are not limited to pharmaceutical products, a typical example of stock repository provided with categorized stock function will be a supply table at a facility or a general-purpose locker in which a storage area is partitioned into a large number of compartments each provided with a door.

In the case of storage of pharmaceutical products, there is known a medicine storage apparatus capable of aligning medicines such as ampouled medicines for storage so that the medicines can be stored or taken out in a single action (see, for example, patent document No. 4). The apparatus is designed to display guidance by LED's etc. to guide a user to the location of cassette for storage or retrieval. Pharmaceutical products are manually picked up and retrieved.

There is also known a medicine rack designed to display guidance to guide a user to the location of retrieval, by illuminating a bottle that stores powder medicine (see, for example, patent document No. 5).

There is also known a pharmaceutical product storage apparatus in which doors and drawers can be so wide open or completely drawn forward that no such location guidance display is necessary (see, for example, patent document No. 6). In this apparatus, the opening operation is automated in addition to the selection of a pharmaceutical product stocked according to the category. As such, the apparatus is favorably used in that the location of a desired pharmaceutical product is immediately known and the product is brought to a retrievable state concurrently.

A medicine dispensing apparatus, capable of ejecting pharmaceutical products automatically by providing a semicylindrical movable lid at the front end of a cassette and by axially rotating the lid, is also available (see, for example, patent document No. 2), addressing the need for automatic dispensing as well as storage. A dispensing and transporting mechanism, which retrieves a pharmaceutical product stored in the apparatus from a pharmaceutical product outlet of a cassette and conveys the product to a predetermined position, is built in the apparatus.

There is also developed a medicine dispensing apparatus provided with a medicine transporting apparatus which horizontally moves the medicine ejected from a cassette, a descent guidance member which causes the medicine to fall and collects the medicine, and a carrier transporting apparatus which transports a carrier to a position for introducing the collected medicine into the carrier (see, for example patent document No. 3).

Such a cassette and dispensing apparatus allow alignment and storage of various kinds of medicines and pharmaceutical products, and automatic ejection and collection of desired ones for dispensing.

Problem to be Solved by Second Embodiment

In the case of pharmaceutical products in a container, like box-packaged medicines, which have a flat shape and which do not easily roll, however, alignment and storage of the products is possible, but, in order to slide the products on a gentle slope under their own weight in a stable manner, frictional force must be reduced by, for example, arranging rollers on the sliding surface.

By employing a row of rollers, it is ensured that the slope of the sliding surface is gentle. A gentle slope results, however, in less space below the sliding surface. Consequently, it is difficult to accommodate, below the sliding surface, an actuator, such as an electric motor, for driving an ejecting mechanism at the descent end of the sliding surface and, more particularly, the active members of the mechanism.

However, securing a storage space elsewhere is contradictory to the requirement for cost reduction or compact implementation. For cost reduction and compact implementation, it is also called for to implement the ejecting mechanism capable of accurately ejecting box-packaged pharmaceutical products only when necessary, by using a simple structure.

Accordingly, a technical challenge in the pharmaceutical product cassette and automatic pharmaceutical product dispensing apparatus is to modify the ejecting mechanism, etc. so that the actuator, etc. is efficiently accommodated beneath the sliding surface, even when the sliding surface is formed by rollers.

With regard to a semi-automatic pharmaceutical product storage apparatus, the convenience—convenience provided by categorized stock of a large number of pharmaceutical products, and capabilities for automatic target selection and opening operation in spite of its manual retrieval arrangement—has been appreciated. Demands have arisen, therefore, for extension of applications of the apparatus. For example, there have arisen demands for handling a large number of pharmaceutical products including less frequently used products as well as frequently used products.

However, the pharmaceutical product storage apparatus currently in use uses a special mechanism comprising a combination of a permanent magnet and a magnet coil in order to open the drawer to the extent that the drawer thus opened is immediately known. Therefore, it is difficult to reduce the cost of the opening mechanism.

Increasing the number of containers by arranging a larger number of small drawers in a two-dimensional array would result in a commensurate increase in the number of opening mechanisms, leading to a high price of the apparatus.

Even if the unit price of the container is reduced as a result of size reduction, the cost of the mechanism is not reduced so much given that the distance in which the container is driven forward in the direction of drawing, i.e., the driving distance, remains unchanged.

This means that reducing the driving distance of the opening mechanism is a shortcut for reducing the cost. By reducing the distance, the opening mechanism can be built by, for example, an inexpensive, mass-produced electric motor, cam, etc.

A down side of reducing the driving distance of the opening mechanism is that the container would not be sufficiently noticeable as the target container is automatically opened, i.e., as the container accommodating the target pharmaceutical product is advanced automatically. This creates a desire for using guidance display to guide a user to the location of retrieval. Increase in cost due to provision for guidance display would then result in the advantage of reduced cost of the opening mechanism being lost.

Attempts to reduce the cost of guidance display for guiding a user to the location of retrieval may be possible by commonly using a light-emitting member in one location and in locations below, above, to the right or to the left thereof, so that the number of light-emitting members required is smaller than the number of containers (see, for example, FIG. 11 of patent document No. 4). Such an approach, however, does no ensure that each container is illuminated.

If the same number of light-emitting members as the containers are provided and arranged so as to be respectively associated with the containers (see, for example, FIG. 5 of patent document No. 4 or patent document No. 5), excellent visibility is ensured since each container is illuminated. However, the approach presents a problem with cost reduction.

Accordingly, a technical challenge is to modify the pharmaceutical product storage apparatus for the purpose of reducing the cost thereof. This can be achieved by ensuring that the driving distance of the opening mechanism is reduced, the light-emitting members are fewer than the containers, and the containers are independently illuminated despite the small number of light-emitting members, by exploiting the fact that automatic advancement of containers is maintained even if the driving distance is reduced.

In large hospitals and dispensaries, a medicine preparation system is built by, for example, providing various medicine preparation machines side by side, manually collecting desired medicines and connecting transporting mechanisms together.

Meanwhile, the variety of medicines is enormous. The cost that should be borne would be extraordinary if the whole variety of pharmaceutical products is accommodated in an automatic pharmaceutical product dispensing apparatus.

For this reason, numerous non-accommodated pharmaceutical products not accommodated in an automatic apparatus are usually stored in a manually-operated medicine rack, etc, while frequently-used pharmaceutical products are accommodated in the automatic apparatus as described in patent document No. 3. The same is true if frequently-used pharmaceutical products are accommodated in a semi-automatic pharmaceutical product storage apparatus as described in patent document No. 6.

In this background, a first technical challenge in a pharmaceutical product dispensing system is to allow an automatic pharmaceutical product dispensing apparatus and a semi-automatic pharmaceutical product storage apparatus to share the task of accommodation so that as many pharmaceutical products as possible can be accommodated in a medicine preparation machine within a limited budget. Another aspect of the challenge is to reduce the cost of the apparatuses.

A second technical challenge in a pharmaceutical product dispensing system is to coordinate the automatic pharmaceutical product dispensing apparatus and the semi-automatic pharmaceutical product storage apparatus sharing the task of accommodation and secure a convenient work place so that the job of discharging pharmaceutical products from the apparatuses and the job of monitoring can be performed conveniently.

A summary of the second embodiment will now be given.

The first pharmaceutical product cassette and the first pharmaceutical product dispensing apparatus according to the second embodiment comprises a sliding surface having a gentle slope on which pharmaceutical products are placed and aligned for storage and sequential ejection (successive ejection), an ejecting mechanism for ejecting pharmaceutical products one by one from the end thereof, and an actuator for actuating the ejecting mechanism when ejecting a pharmaceutical product.

Further, the sliding surface is formed by a row of rollers in the direction of slope. A cam mechanism or a link mechanism is provided, in which are provided a first follower, a second follower and a driver for actuating the followers. A tilting plate forming an ejecting mechanism together with the first follower and the second follower is provided in the neighborhood of the descent end of the sliding surface. The tilting plate is contiguous with the sliding surface. The first follower is provided toward the sliding surface and is projected above tilting plate when actuated. In an ordinary state, the first follower is flush with the tilting plate or lowered below the plate. The second follower is further away from the sliding surface and is flush with or lowered below the tilting plate when actuated. In an ordinary state, the second follower is projected above the tilting plate. The driver and the actuator actuating the driver are provided beneath the sliding surface.

Together, these components make up a pharmaceutical product cassette. By arranging a large number of such cassettes, and combining the cassettes with a collecting and dispensing mechanism, a pharmaceutical product dispensing apparatus is constituted. Alternatively, assemblies may not be turned into cassettes and may be arranged on a rack with partitions. A combination of such an arrangement and a collecting and dispensing mechanism also constitutes a pharmaceutical product dispensing apparatus.

A first pharmaceutical product dispensing system according to the second embodiment comprises a pharmaceutical product dispensing apparatus which aligns rows of pharmaceutical products for storage so that the products are sequentially (successively) ejectable, and which automatically discharges the products from the rows and guides the products downward for collection; and a pharmaceutical product storage apparatus which holds a two-dimensional array of a large number of containers accommodating pharmaceutical products so that the containers can be drawn forward, and which is configured to advance the containers by using container opening mechanisms provided behind the containers, the dispensing apparatus and the storage apparatus being provided side by side, wherein the pharmaceutical product dispensing apparatus is configured to maintain the products in alignment on a sliding surface, and to advance the products on the sliding surface while maintaining alignment thereof, the apparatus being further configured to sequentially eject the products, according to alternate up-and-down movement of first and second followers of a cam mechanism or a link mechanism, and the pharmaceutical product storage apparatus is provided with a light projecting member for projecting light passing through a space in front of at least some of the containers in a pushed-back state, and a visualizer for directing the projected light forward is formed in or attached to the front end of each of the containers.

A second pharmaceutical product dispensing system according to the second embodiment comprises a pharmaceutical product dispensing apparatus which aligns rows of pharmaceutical products for storage so that the products are sequentially (successively) ejectable, and which automatically discharges the products from the rows and guides the products downward for collection; and
a pharmaceutical product storage apparatus which holds a two-dimensional array of a large number of containers accommodating pharmaceutical products so that the containers can be drawn forward, and which is configured to advance the containers by using container opening mechanisms provided behind the containers, the dispensing apparatus and the storage apparatus being provided side by side, wherein a work table is attached to the pharmaceutical storage apparatus, a chute is formed by cutting a portion of the work table, and a weighing scale is provided in the chute, the system being further provided with a transporting mechanism for feeding a product ejected by the pharmaceutical product dispensing apparatus to the chute.

In the first pharmaceutical product cassette and the dispensing apparatus described above, the ejecting mechanism for ejecting pharmaceutical products one by one in the neighborhood of the descent end of the sliding surface is formed by the tilting plate, and the first and second followers of the cam mechanism or the link mechanism. The tilting plate is contiguous with the sliding surface. Accordingly, as the pharmaceutical products are aligned for storage on the sliding surface, the product at the head of a queue slides onto the tilting plate. In an ordinary state, i.e., when the ejecting mechanism is not actuated, the first follower toward the sliding surface is flush with the tilting plate or lowered below the plate, and the second follower away from the sliding surface is projected above the tilting plate. Therefore, when resting on the tilting plate, the pharmaceutical product at the head of a queue is prevented by the second follower from advancing and is maintained in that state.

When the ejecting mechanism is actuated, the cam driver is actuated by the actuator so that the first follower is projected and the second follower is lowered. Then, the pharmaceutical product at the head of a queue is no longer supported by the second follower and more heavily tilted than the tilting plate. Accordingly, the product slides down the tilting plate rapidly and is ejected. All this while, the next pharmaceutical product is prevented from advancing by the first follower which is projected, and remains on the sliding surface. When the first follower is lowered, and the second follower is projected, so that the normal state is resumed, the next pharmaceutical product is brought to the head position, leaves the sliding surface and rests on the tilting plate, where it remains.

By configuring the apparatus to maintain the pharmaceutical products in alignment on the sliding surface formed by a row of rollers, and to advance the products on the sliding surface while maintaining alignment thereof, and by ensuring that the products are sequentially and successively ejected according to alternate up-and-down movement of first and second followers of a cam mechanism or a link mechanism, the ejecting mechanism is simplified. Even if the mechanism is simple, pharmaceutical products can be accurately ejected only when necessary. The sliding surface is formed by a row of rollers and has a gentle slope, but, still, the members, including the mechanism and the actuator, can be efficiently accommodated in a space below the sliding surface, by, for example, providing the driver of the cam mechanism or the link mechanism in a narrow space and providing the actuator in a relatively wide space.

Thus, according to the first pharmaceutical product cassette and the first dispensing apparatus, the pharmaceutical product cassette and the pharmaceutical product dispensing apparatus which are inexpensive and small-sized are implemented.

In the first pharmaceutical product dispensing system described above, the automatic pharmaceutical product dispensing apparatus and the semi-automatic pharmaceutical product storage apparatus arranged side by side share the task of accommodating pharmaceutical products. By configuring the apparatus to maintain the pharmaceutical products in alignment on the sliding surface formed by a row of rollers, and to advance the products on the sliding surface while maintaining alignment thereof, and by ensuring that the products are sequentially and successively ejected according to alternate up-and-down movement of first and second followers of a cam mechanism or a link mechanism, there is no need to provide a weighing member or a biasing member on an individual basis, and, accordingly, the mechanism is simplified and the cost is eventually reduced. An advantage with the semi-automatic pharmaceutical product storage apparatus is that, cost reduction is bolstered while maintaining convenience, by exploiting the automatic advancement of the containers to illuminate the containers by the light projecting members, which are fewer in number than the containers.

Thus, the first pharmaceutical product dispensing system accomplishes the first technical challenge of the pharmaceutical product dispensing system mentioned above. Further, the first pharmaceutical product dispensing system accomplishes the technical challenge of the pharmaceutical product storage apparatus and the technical challenge of the pharmaceutical product dispensing apparatus.

In the second pharmaceutical product dispensing system, the automatic pharmaceutical product dispensing apparatus and the semi-automatic pharmaceutical product storage apparatus arranged side by side share the task of accommodating pharmaceutical products. Moreover, pharmaceutical products dispensed automatically from the pharmaceutical product dispensing apparatus are transferred by the transporting mechanism to the chute also in an automatic fashion before being placed on the weighing scale. Pharmaceutical products dispensed from the pharmaceutical product storage apparatus in a semi-automatic fashion are manually assembled on the worktable. After being inspected, the products are transferred to the chute by sliding on the work table, before being placed on the weighing scale.

Thus, inspection by weighing is performed easily and efficiently. If medicine preparation checkup by visual inspection is desired, the entire pharmaceutical products dispensed are returned to the work table for checkup.

Thus, according to the second pharmaceutical product dispensing system, the automatic pharmaceutical product dispensing apparatus and the semi-automatic pharmaceutical product storage apparatus sharing the task of accommodating pharmaceutical products are coordinated. A workplace for dispensing and inspecting pharmaceutical products is secured, and a weighing scale is provided exactly where the convenience of work is maximized. Accordingly, the second technical challenge mentioned above of the pharmaceutical product dispensing system is accomplished.

A first semi-automatic pharmaceutical product storage apparatus in the pharmaceutical product dispensing system according to the second embodiment may be of the following specific structure. The apparatus comprises a large number of containers which accommodate pharmaceutical products, a storing unit which holds the containers in a two-dimensional array so that the containers are drawable in a forward direction, and a large number of container opening mechanisms, each of the mechanisms being provided behind the associated container and advancing the associated container, wherein the mechanism is of a type with reduced driving distance, and a light projecting member (light-emitting member) for projecting light passing through a space in front of at least some of the containers in a pushed-back state is provided, and a visualizer for directing the projected light forward is formed in or attached to the front end of each of the containers.

The phrase "with reduced driving distance" means that the distance in which the opening mechanism advances the container is shorter than the depth (i.e., the longitudinal size) of the container. At the longest, the driving distance is less than half of the depth. Normally, the distance is as long as the longitudinal length of the part of the container identified as being the front end.

In the first pharmaceutical product storage apparatus, as the container selected for retrieval of a pharmaceutical product is automatically advanced by the container opening mechanism, the front end of the container is projected out of the storing unit. The light projected by the light projecting member impinges upon the front end so that the light is directed forward by the visualizer. Thus, the container selected for retrieval is illuminated.

The same is true of the other containers selected for retrieval. It is ensured that each one of the containers is illuminated. The containers placed to face the same line of projected light share one light projecting member and, so, a plurality of them cannot be illuminated at the same time. As long as applications requiring simultaneous illumination are avoided, no inconvenience is presented if the number of light projecting members is smaller than the number of containers.

The visualizer for improving visibility by changing the direction of light is implemented at a lower cost than the light projecting member, by introducing a known light guiding member (see patent document No. 5), an appropriate reflective member or a diffusing member, or by treating the surface to form a reflective surface or a diffusing surface.

Thus, according to the first pharmaceutical product storage apparatus, the cost of the semi-automatic pharmaceutical product storage apparatus is reduced while maintaining convenience, by reducing the driving distance by the container opening mechanism and ensuring at the same time that the containers are illuminated individually by the light projecting members fewer in number.

A second semi-automatic pharmaceutical product storage apparatus is a modification to the first pharmaceutical product storage apparatus mentioned above, wherein the container opening mechanism is provided with an eccentric cam fitted to a motor and the rotation shaft thereof.

Container opening mechanisms with reduced driving distance can be implemented by using mass-produced products available on the market for satisfactory reduction in the cost.

A third semi-automatic pharmaceutical product storage apparatus is a modification to the first or second pharmaceutical product storage apparatus mentioned above, wherein a front plate of the container is transparent, a slope is formed immediately behind the front plate, and the visualizer is a name plate placed on the slope.

In this case, the visualizer is implemented by placing the name plate on the slope inside the container. A plate body capable of reflecting and diffusing light at its surface is employed as the name plate, which also serves as the visualizer. Since ordinary white paper serves the purpose, the name plate can be implemented conveniently and inexpensively. If inexpensive, high-intensity light emitting devices are available, simultaneous illumination of multiple containers aligned to share the projected light will be realized by modifying the apparatus such that the reflectance of the visualizer is lowered, and that part of the light is transmitted therethrough and travels straight ahead.

A fourth semi-automatic pharmaceutical product storage apparatus is a modification to any one of the first through third pharmaceutical product storage apparatuses, wherein a bottom plate of the container is transparent, and a light receiving member is provided at the destination of projection of light from the light projecting member so that the pulled-out or pushed-back state of the container is determined by referring to light reception state.

In the fourth pharmaceutical product storage apparatus, the projected light is blocked if the container is projected from the storing unit but is not blocked if the container recedes into the storing unit. Since the light reception state varies depending on whether the container is projected or not, it is possible to automatically determine whether the container is automatically advanced or manually pushed back, by referring to the light reception state of the light receiving member. Like the light projecting members, the light receiving members are shared by multiple containers. Therefore, the number of light receiving members may be smaller than the containers.

Specific embodiments of the pharmaceutical product cassette and the dispensing apparatus according to the second embodiment will be described using illustrative embodiments 2-1 through 2-9.

The illustrative embodiment 2-1 shown in FIGS. 6A-7E is an embodiment of the first pharmaceutical product cassette mentioned above. The illustrative embodiment 2-2 shown in FIGS. 8A-8B is an embodiment of the pharmaceutical product dispensing apparatus mentioned above of a type provided with a row of cassettes. The illustrative embodiment 2-3 shown in FIGS. 9A-10D is an embodiment of the pharmaceutical product dispensing apparatus mentioned above of a type partitioned by racks. In the illustrative embodiments 2-1-2-3, the active members of the ejecting mechanism are embodied by the followers of a cam mechanism (followers).

The illustrative embodiment 2-4 shown in FIGS. 11A-11D is an embodiment of the first pharmaceutical product cassette mentioned above. The illustrative embodiment 2-5 shown in FIGS. 12A-12B is an embodiment of the pharmaceutical product dispensing apparatus mentioned above of a type provided with a row of cassettes. The illustrative embodiment 2-6 shown in FIGS. 13A-13B is an embodiment of the pharmaceutical product dispensing apparatus mentioned above of a type partitioned by racks. In the illustrative embodiments 2-4-2-6, the active members of the ejecting mechanism are embodied by the followers of a link mechanism (link device).

Figure 15A:
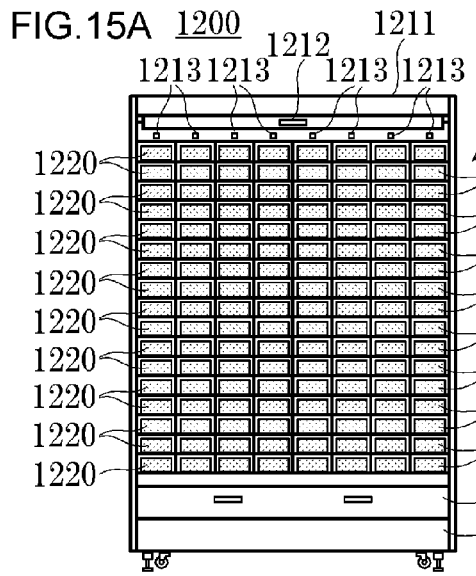
FIGS. 15A-15F show the mechanical structure of the semi-automatic pharmaceutical product storage apparatus.
Figure 15B:
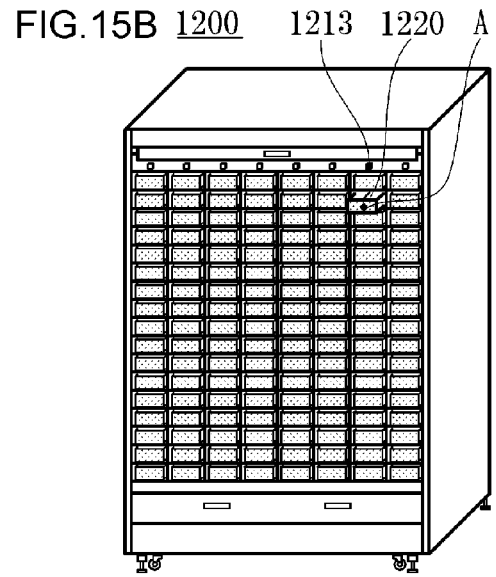
Figure 15C:
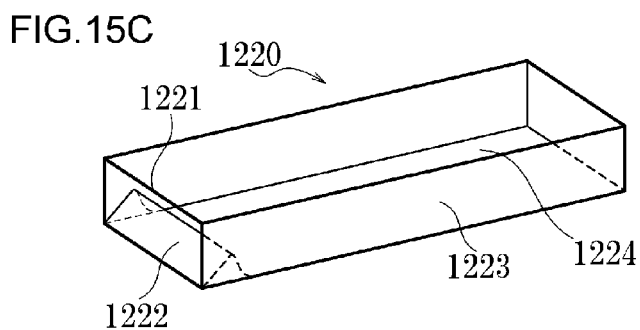
Figure 15D:
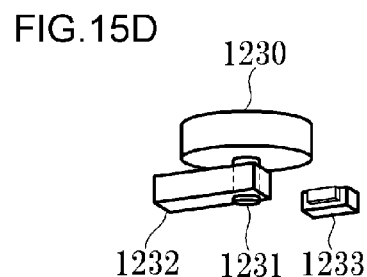
Figure 15E:
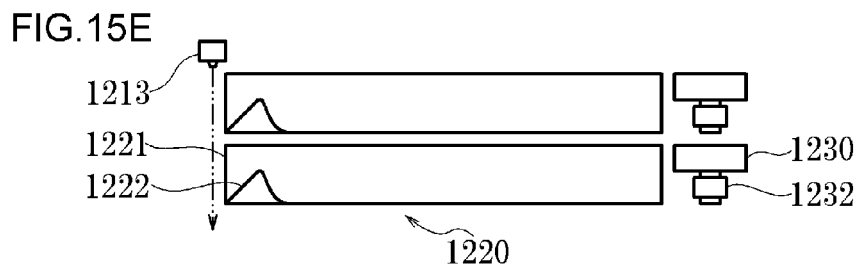
Figure 15F:
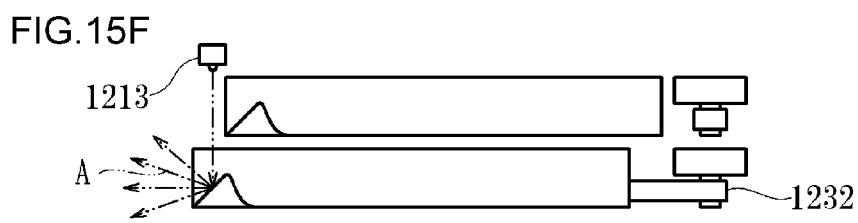
Figure 16:
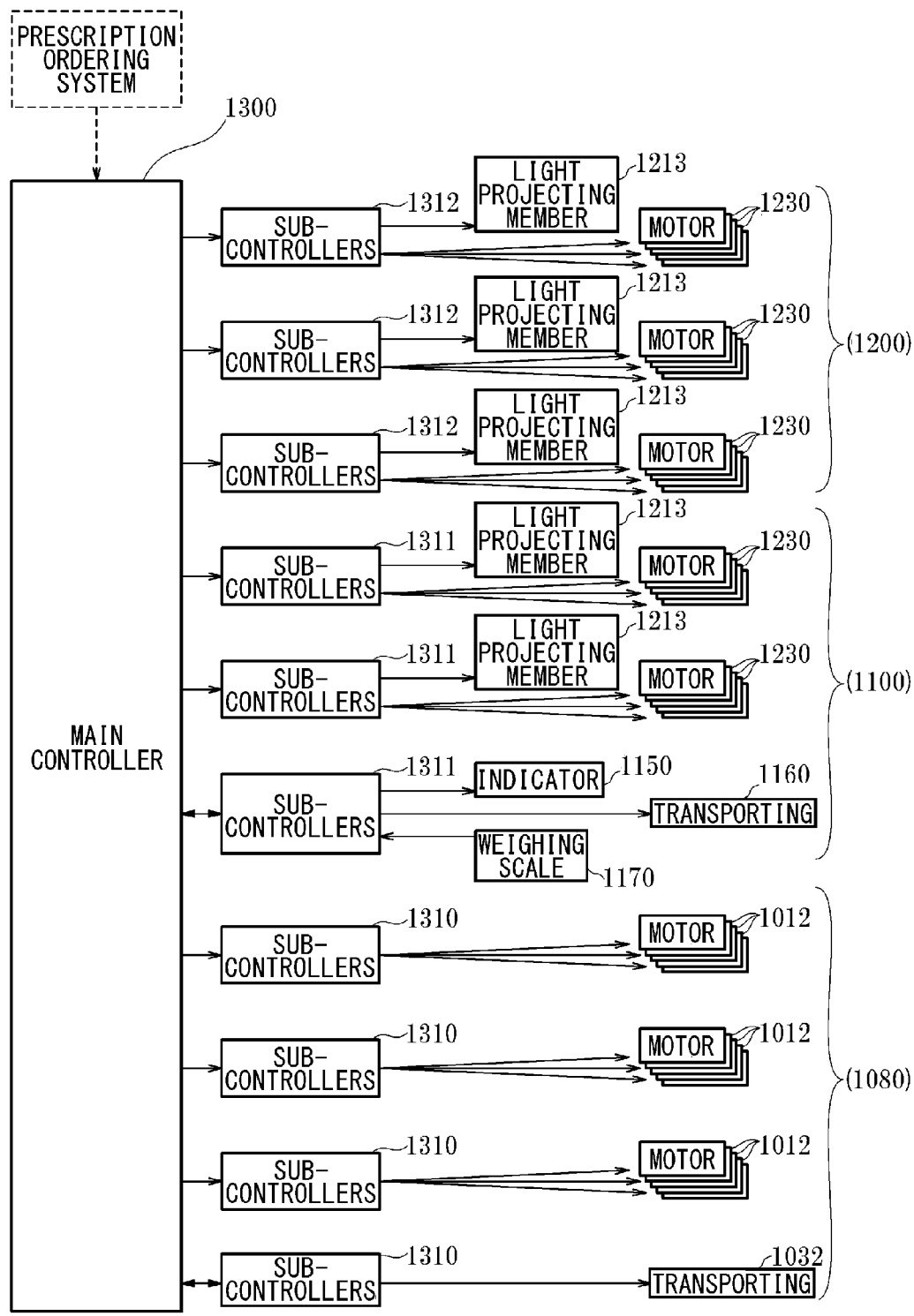
FIG. 16 is a schematic block diagram of a controller.
Figure 17A:
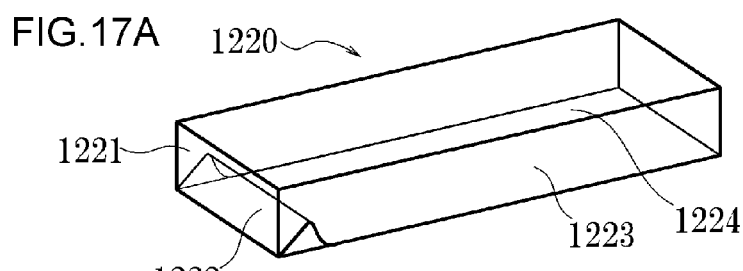
FIGS. 17A-17C show the structure of a semi-automatic pharmaceutical product storage apparatus according to an illustrative embodiment 2-8 of the second embodiment.
Figure 17B:
Figure 17C:
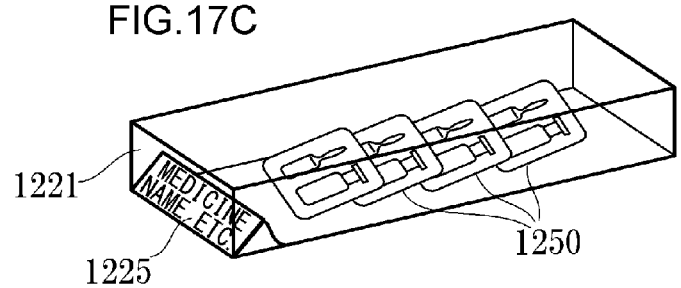
Figure 18A:
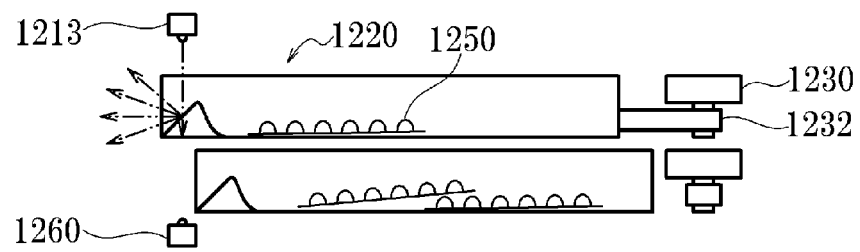
FIGS. 18A-18C show the structure of a semi-automatic pharmaceutical product storage apparatus according to an illustrative embodiment 2-9 of the second embodiment.
Figure 18B:
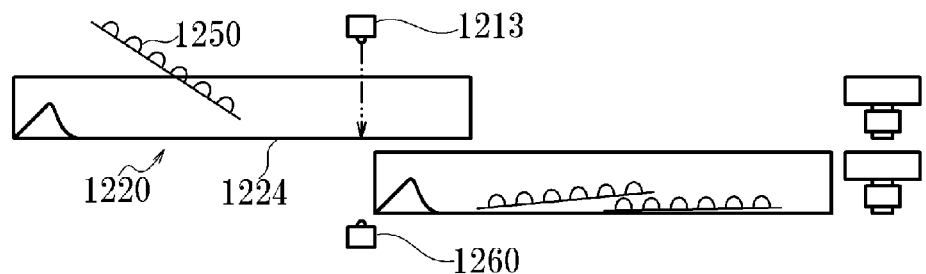
Figure 18C:
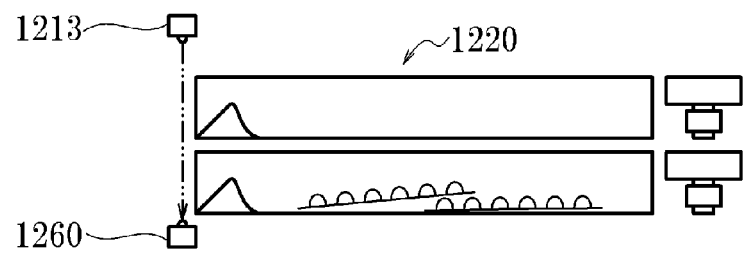

The illustrative embodiment 2-7 shown in FIGS. 14A-16 is an embodiment of the first and second pharmaceutical product dispensing systems and the first and second pharmaceutical product storage apparatuses mentioned above. The illustrative embodiment 2-8 shown in FIGS. 17A-17C is an embodiment of the third pharmaceutical product storage apparatus mentioned above. The illustrative embodiment 2-9 shown in FIGS. 18A-18C is an embodiment of the fourth pharmaceutical product storage apparatus mentioned above.

In the illustration, the details of support members such as frames, fasteners such as bolts, connectors such as hinges, detailed electric and electronic circuits such as motor drivers are omitted for brevity, highlighting those elements necessary to explain the invention and related elements. In the figures, portions indicated by shading indicate cross sections, and dotted portions indicate the surface of a member instead of a section.

Illustrative Embodiment 2-1

Figure 6A:
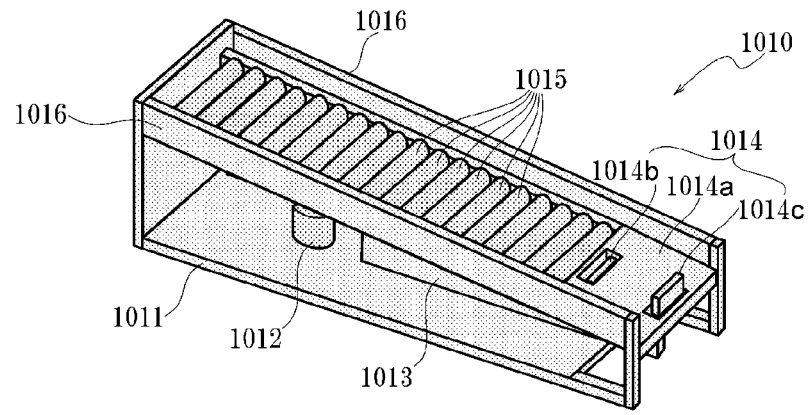
FIGS. 6A-6D show the structure of a pharmaceutical product cassette according to an illustrative embodiment 2-1 of a second embodiment.
Figure 6B:
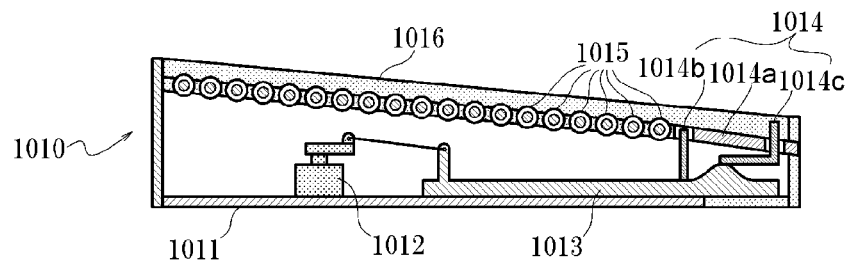
Figure 6C:
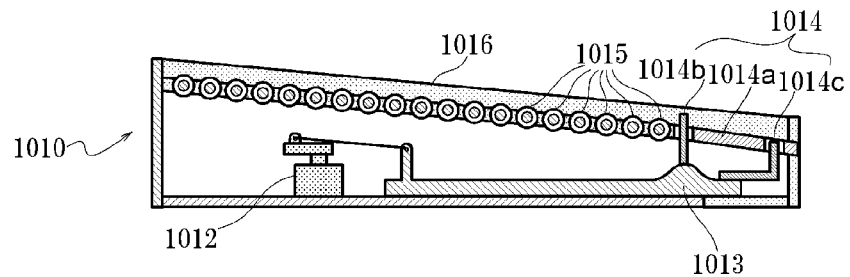
Figure 6D:
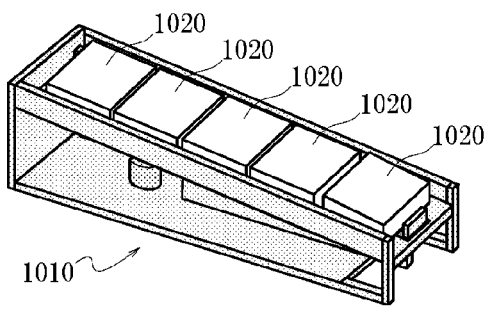

The specific structure of the pharmaceutical product cassette according to the illustrative embodiment 2-1 of the second embodiment will be described with reference to the associated drawings. FIG. 6A is a perspective view showing the appearance of a pharmaceutical product cassette 1010; FIG. 6B and FIG. 6C are sectional left side views of the cassette 1010; and FIG. 6D is a perspective view showing pharmaceutical products 1020 aligned for storage in the cassette 1010.

The pharmaceutical product 1010 (see FIGS. 6A and 6C) comprises a bottom plate 1011 as a base; an electric motor 1012 as an actuator; a cam driver 1013 (driver) of a translation cam mechanism connected to the motor 1012 via a link for converting, for transmission, the rotation of the motor into linear motion; an ejecting mechanism 1014 actuated by the cam driver 1013 and responsible for sequential and successive ejection of pharmaceutical products; a group of rollers 1015 forming a sliding surface having a gentle slope; and side plates 16 responsible for aligning pharmaceutical products accommodated.

In the illustrated example, the bottom plate 1011 is flat plate of a rectangular shape. The bottom plate may remain fixed on a flat surface such as a desktop or a rack or is removably placed thereon. Articles of other shapes, such as a framework structure, may also serve the purpose so long as it is capable of supporting the electric motor 1012 fixed thereon and supporting the cam driver 1013 so as to reciprocally movable.

The rollers 1015 are arranged in a row above bottom plate 1011 in the longitudinal direction (in the illustration, sideways). The row of rollers is slightly inclined in the longitudinal direction. For example, the surface has a gentle slope of about several degrees. The upper envelope of the group of rollers provided in the direction of slope forms a sliding surface. In the illustrated example, only one row of rollers is provided. Alternatively, a plurality of rows may constitute a sliding surface.

The sliding surface 1015 is flanked by side plates 1016 on both sides so as to define a space for alignment and storage of pharmaceutical products 1020 such as box-packaged medicines (see FIG. 6D). The lower end of the sliding surface 1015, sandwiched by the side plates 1016, in the longitudinal direction (the direction of slope) (in FIGS. 6A and 6B, toward the right) represents a descent end at which the accommodated pharmaceutical products fall.

The cam driver 1013 is provided on the bottom plate 1011 toward the descent end. The motor 1012 is provided away from the descent end and in a space where the bottom plate 1011 and the rollers 1015 are removed from each other.

The ejecting mechanism 1014 is provided in the neighborhood of the descent end of the sliding surface 1015 and is located above the cam driver 1013. Alternate up-and-down movement of first and second cam followers achieves prevention of slip of the pharmaceutical products 1020 and sequential ejection and successive ejection thereof. More specifically, the ejecting mechanism 1014 is provided with a tilting plate 1014a of a rectangular shape of a size capable of carrying a single pharmaceutical product, a first cam follower 1014b (first follower) which is inserted through a through hole formed in a portion of the tilting plate 1014a toward the sliding surface and is allowed to move up and down, and a second cam follower 1014c (second follower) which is inserted through a through hole formed in a portion of the tilting plate 1014a away from the sliding surface and is allowed to move up and down.

The cam followers 1014b and 1014c are slidably placed upon the cam driver 1013 and are allowed to move up and down in association with the advancing and receding (reciprocal) motion of the cam driver 1013. More specifically, in an ordinary state in which the cam driver 1013 advances (see FIGS. 6A and 6B), the top end of the cam follower 1014b toward the sliding surface is lowered below the tilting plate 1014a, and the top end of the cam follower 1014c away from the sliding surface is projected above the tilting plate 1014a. When the cam driver 1013 recedes (see FIG. 6C), the top end of the cam follower 1014b is projected above the tilting plate 1014a, and the top end of the cam follower 1014c is lowered below the tilting plate 1014a.

The surface of the cam driver 1013 which guides the cam followers 1014b and 1014c are curved to exhibit the cam function.

In response to an instruction for ejection from a controller (not shown in this example), the electric motor 1012 causes its arm to make one full turn. As mentioned above, the motor is provided on the bottom plate 1011 located below the sliding surface 1015. The electric motor 1012 is provided toward the upper end (in FIGS. 6A-6C, toward left), instead of the descent end, of the sliding surface 1015 in the direction of slope and away from the ejecting mechanism 1014, in order not to interfere with the rollers 1015 and to ensure that the bottom plate 1011 and the sliding surface 1015 are not excessively spaced apart. The arm end of the electric motor 1012 is connected to the rear end of the cam driver 1013 via a link for converting rotation into linear motion. As the electric motor 1012 causes its arm to make one full turn, the cam driver 1013 reciprocates once.

The mode of using the pharmaceutical product cassette 1010 according to the illustrative embodiment 2-1 and its operation will be described with reference to the drawings. FIG. 6D is a perspective view showing pharmaceutical products 1020 aligned for storage in the cassette 1010. FIGS. 7A-7E are all sectional left side views of the cassette 1010 and show the time sequence of operation of ejection from the cassette 1010.

Figure 7A:
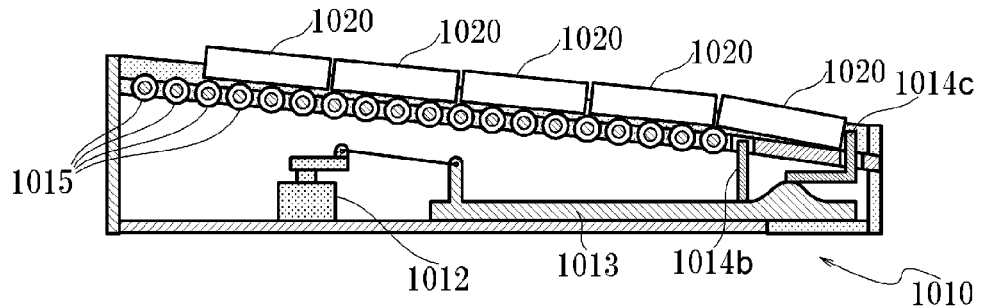
FIGS. 7A-7E show the time sequence of operation of ejection from the pharmaceutical product cassette.
Figure 7B:
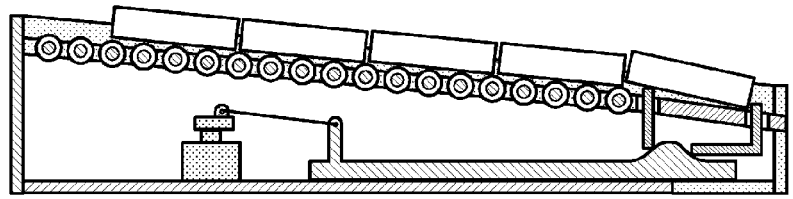
Figure 7C:
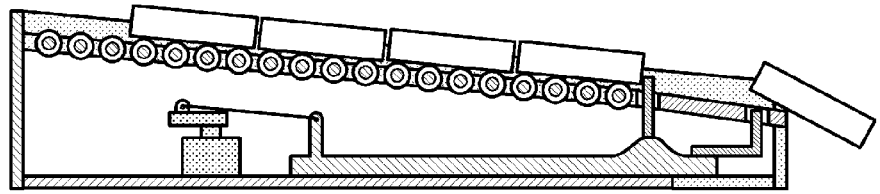
Figure 7D:
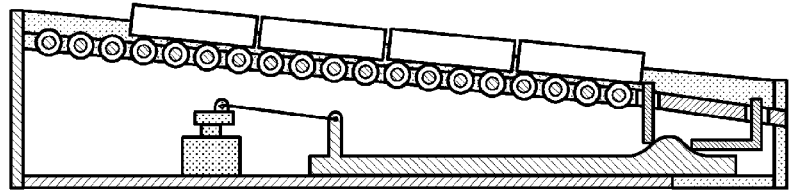
Figure 7E:
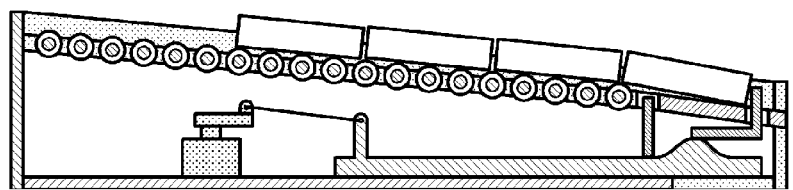

When the pharmaceutical products 1020, such as box-packaged medicines suitable for alignment for storage and free-fall for ejection, are placed on the sliding surface 1015 one after another in a lying position, the products 1020 are aligned on the sliding surface in the direction of slope (see FIGS. 6D and 7A). In an ordinary state, the cam follower 1014b toward the sliding surface 1014b is receded, and the cam follower 1014c away from the sliding surface is projected. Therefore, the pharmaceutical product 1020 at the head of a queue of products which slide down the sliding surface rests upon the tilting plate 1014a of the ejecting mechanism 1014 and remains there by coming into contact with the cam follower 1014c. The next and subsequent pharmaceutical products 1020 move closer to the product 1020 at the head of the queue on the sliding surface to form a series, with the result that all of the products are aligned for storage in the cassette 1010.

In this state, an instruction for ejection is issued. As the electric motor 1012 is operated accordingly and the arm fitted to the motor output shaft is rotated, the cam followers 1014b and 1014c of the ejecting mechanism 1014 alternately move up and down in association with the rotation of the arm. To be more specific, when the arm is rotated ¼ (see FIG. 7B), the cam follower 1014b is elevated and the cam follower 1014c is lowered. In this state, the pharmaceutical product 1020 at the head is only slightly more tilted than before and remains on the tilting plate 1014a. As the arm is further rotated, almost completing a ½ turn (see FIG. 7C), the cam follower 1014b is projected high above the tilting plate 1014a, and the cam follower 1014c is lowered below the tilting plate 1014a. Then, the pharmaceutical product 1020 at the head, which is no longer supported and is heavily tilted, falls from the tilting plate 1014a without delay. In association with this, the pharmaceutical products 1020 on the sliding surface 1015 are also positioned to slide, but the next and subsequent pharmaceutical products 1020 are prevented from advancing since the cam follower 1014b is projected above the tilting plate 1014a.

Thereafter, when the arm is rotated ¾ (see FIG. 7D), the pharmaceutical product 1020 at the head has completely fallen and is ejected outside the cassette.

In this way, the pharmaceutical products 1020 are sequentially and successively ejected from the cassette 1010. As the arm is rotated further, completing one full turn (see FIG. 7E), the mechanism returns to an ordinary state. By that time, the cam follower 1014b toward the sliding surface is lowered below the tilting plate 1014a, and the cam follower 1014c away from the sliding surface is projected above the tilting plate 1014a. The pharmaceutical product 1020, which is now at the head of the queue, leaves the sliding surface 1015 and rests on the tilting plate 1014a. The next and subsequent pharmaceutical products 1020 slide on the sliding surface and are displaced by one position each. The pharmaceutical products 1020 remain aligned for storage, although the number thereof is reduced by one. Thus, sequential and successive ejection of the pharmaceutical products 1020 can be repeated.

Illustrative Embodiment 2-2

The specific structure of the pharmaceutical product dispensing apparatus of a type provided with a row of cassettes according to the illustrative embodiment 2-2 of the second embodiment will be described with reference to the associated drawings. FIG. 8A is a front view (BB section) of a pharmaceutical product dispensing apparatus 1030; and FIG. 8B is a side view (AA section) of the pharmaceutical product dispensing apparatus 1030.

This pharmaceutical product dispensing apparatus 1030 is configured such that a large number of cassettes 1010 described above (in the figure, a total of 12 cassettes in a matrix of 4 rows and 3 columns) are stored in a cassette storage unit. The ejecting sides of the cassettes 1010 face forward, and a descent guidance channel 1031 is provided in front of the cassettes 1010. A transporting mechanism 1032 forming the collecting and dispensing mechanism in combination with the descent guidance channel 1031 is provided below the channel 1031. A dispensing outlet 1033 is formed at the end of the transportation.

In this case, some of the cassettes 1010 align the pharmaceutical products 1020 mentioned above for storage, and other cassettes 1010 align other pharmaceutical products for storage.

When the cassette 1010 is directed by a controller (not shown) to eject a product in accordance with prescription data or medicine preparation instruction data derived therefrom, the cassette 1010 receiving the direction sequentially and successively ejects pharmaceutical products such as the pharmaceutical products 1020 as described above. The pharmaceutical products thus ejected fall down the descent guidance channel 1031 onto the transporting mechanism 1032. The products are transported by the transporting mechanism 1032 before being brought out the apparatus via the dispensing outlet 1033.

In this way, desired pharmaceutical products are automatically dispensed.

Illustrative Embodiment 2-3

Figure 10A:
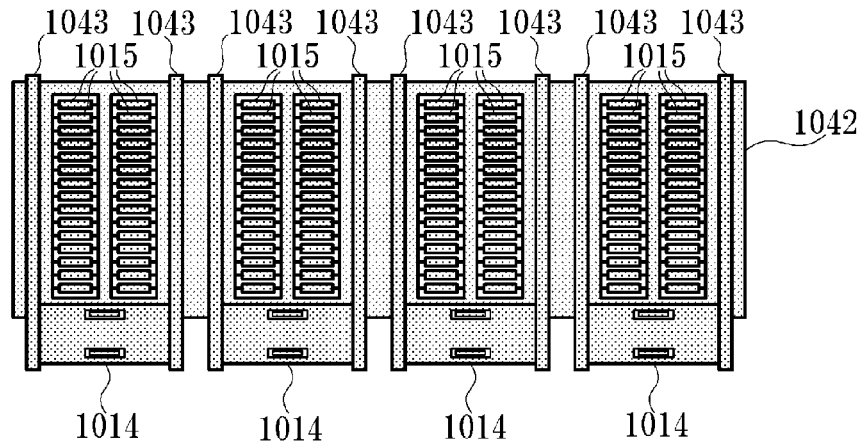
FIGS. 10A-10D show the structure of a rack.
Figure 10B:
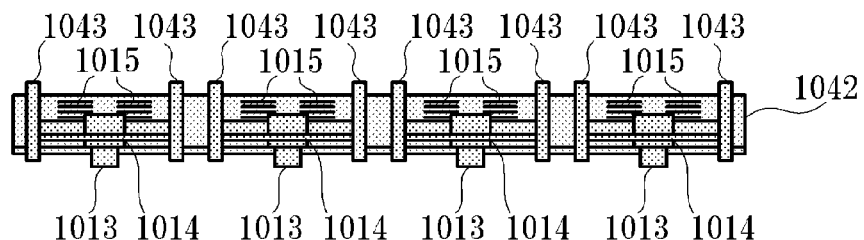
Figure 10C:
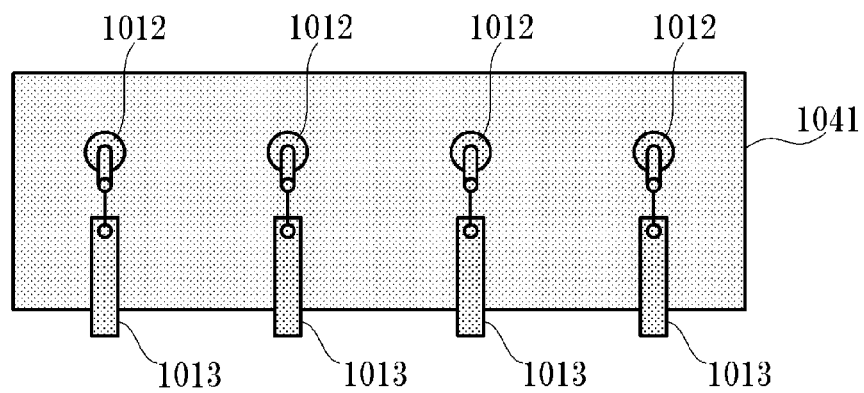
Figure 10D:
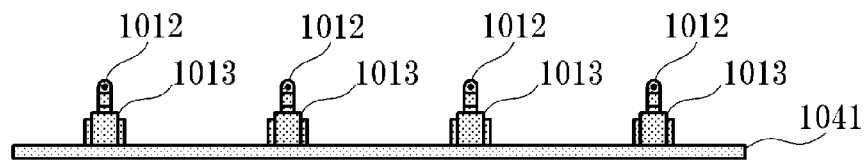

The specific structure of the pharmaceutical product dispensing apparatus of a type partitioned by racks according to the illustrative embodiment 2-3 of the second embodiment will be described with reference to the associated drawings. FIG. 9A is a front view (DD section) of a pharmaceutical product dispensing apparatus 1040; and FIG. 9B is a side view (CC section) of the pharmaceutical product dispensing apparatus 1040. FIGS. 10A-10D show the structure of a rack. FIG. 10A is a top view of an upper rack 1042; FIG. 10B is a front view of the upper rack 1042; FIG. 10C is a top view of a lower rack 1041; and FIG. 10D is a front view of the lower rack 1041.

The pharmaceutical product dispensing apparatus 1040 differs from the pharmaceutical product dispensing apparatus 1030 described above in that equivalents of the plurality of cassettes 1010 arranged side by side are built into a lower rack 1041 in a level position and an upper rack 1042 having a gentle descending slope.

More specifically, a row of rollers 1015 forming the sliding surface are provided side by side in the upper rack 1042. Partitions 43, which are a substitute for the side plates 16, are also fitted to the upper rack 42. The ejecting mechanisms 1014 are supported at the end of the upper rack 1042. The electric motors 1012 and the cam drivers 1013 are fitted to the lower rack 1041.

A plurality of (in FIGS. 10A-10C, eight rows of) sliding surfaces, each formed by a row of the rollers 1015 in the direction of slope of the upper rack 1042, are arranged in the level direction, i.e., the longitudinal direction, of the upper rack 1042. Removable partitions 1043 are provided so as to form blocks each comprising an appropriate number of (in FIGS. 10A-10C, two rows of) sliding surfaces. The ejecting mechanism 1014 is provided in each of the blocks (in FIGS. 10A-10C, the four blocks) partitioned by the partitions 1043. Likewise, the motor 1012 and the cam driver 1013 are provided in association with each of the blocks. The motor 1012 and the cam driver 1013 are provided on the lower rack 1041 and beneath the sliding surface 1015. Each of the ejecting mechanisms 1014 is provided at the end of the partition 1043 on the upper rack 1042. The motor 1012, the cam driver 1013 and the mechanism 1014 in the same block are connected to each other. In each block, the motor 1012 and the cam driver 1013 are connected to each other via a link for converting rotation into linear motion. The top surface of the cam driver 1013 is in contact with the lower end of the cam followers 1014*b* and 1014*c* so as to exhibit the cam function.

In this configuration, each of the blocks partitioned by the partitions 1043 corresponds to the aforementioned cassette 1010 described above. The usage mode and operation are the same as described above, except that each rack, instead of each cassette, is subject to repair or replacement.

In the illustrated example, two partitions 1043 are provided between blocks. Alternatively, only one partition 1043 may be provided between blocks if it is ensured that a portion of a pharmaceutical product, such as the pharmaceutical product 1020, is not projected above the partition 1043 into the adjacent block (such is the case with the box-packaged medicines mentioned above). The partition 1043 and the motor 1012 may be removable instead of permanently fixed. In this case, the partition and the motor may be selectively provided at intervals defined by the sliding surfaces.

Illustrative Embodiment 2-4

Figure 11A:
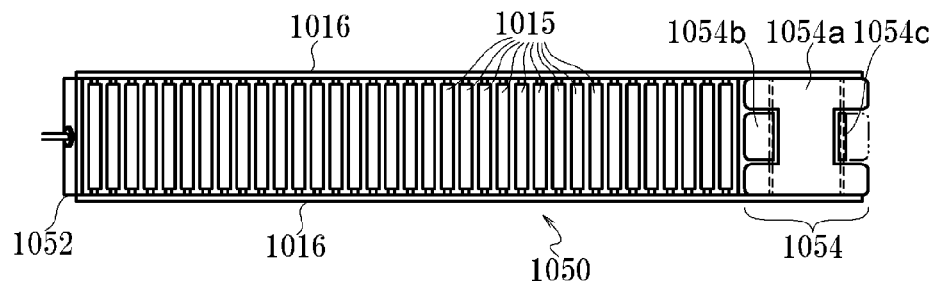
FIGS. 11A-11D show the structure of a pharmaceutical product cassette according to an illustrative embodiment 2-4 of the second embodiment.
Figure 11B:
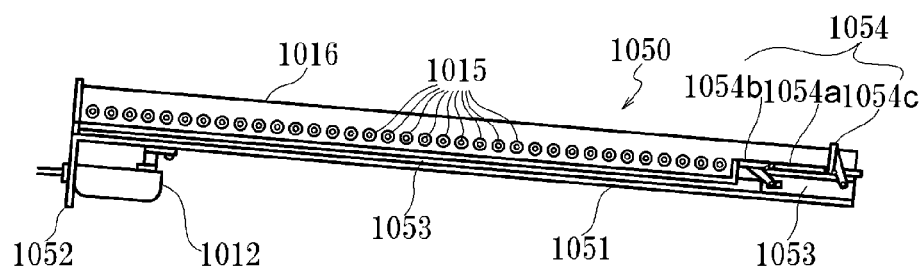
Figure 11C:
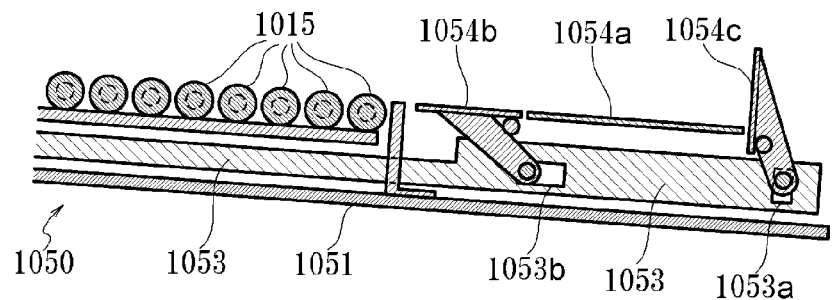
Figure 11D:
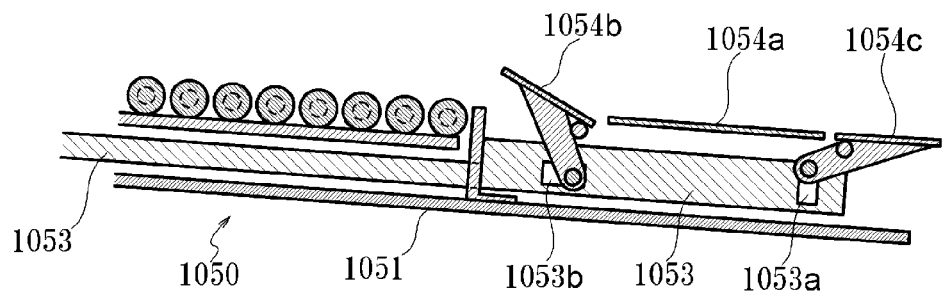

The specific structure of the pharmaceutical product cassette according to the illustrative embodiment 2-4 of the second embodiment will be described with reference to the associated drawings. FIGS. 11A-11D show the structure of a pharmaceutical product cassette 1050. FIG. 11A is a top view of the cassette; FIG. 11B is a sectional side view of the cassette; and FIGS. 11C and 11D are sectional side views of an ejecting mechanism 1054.

The cassette 1050 differs from the cassette 1010 described above in that an ejecting mechanism 1054 utilizing a link mechanism is introduced in place of the ejecting mechanism 1014 utilizing the cam mechanism. A tilting base plate 1051 is employed in place of the level bottom plate 1011 such that the rear end thereof is bent downward to form a rear pox plate 1052.

The base plate 1051 is a flat plate of, for example, a rectangular shape parallel with the sliding surface formed by a row of rollers 1015. The rear end of the plate 1051 is maintained at a high position by the rear pod plate 1052. The plate 1051 is tilted forward at an angle of, for example, 5°. The unit comprising the row of rollers 1015 may be directly fitted to the top surface of the base plate 1051. In the illustrated example, the unit is provided above the base plate 1051 via the side plates 1016. The motor 1012 may be fitted to the underside of the base plate 1051. In the illustrated example, the motor 1012 is fitted to the rear pod plate 1052 and is located beneath the sliding surface. A link driver (driver) 1053 of the link mechanism (1053, 1054*b* and 1054*c*) provided in place of the cam mechanism (1013, 1014*b* and 1014*c*) is provided above the base plate 1051 and extends from a space toward the descent end of the sliding surface 1015 to a space below the sliding surface. The driver 1053 is allowed to move reciprocally in the longitudinal direction (back and forth) (in the illustration, sideways).

Like the ejecting mechanism 1014, the ejecting mechanism 1054 is provided in the neighborhood of the descent end of the sliding surface. The mechanism 1054 is located above the front end of the link driver 1053 and is configured to prevent the pharmaceutical products 1020 from slipping and sequentially and successively eject the products 1020, according to the alternate up-and-down movement of the first and second link followers. More specifically, the ejecting mechanism 1054 comprises a tilting plate 1054*a* having a rectangular shape and a size capable of substantially carrying a single pharmaceutical product 1020, a first link follower 1054*b* (first follower) which is loosely fitted to a notch formed in a portion of the tilting plate 1054*a* toward the sliding surface and which is allowed to move up and down in association with the pivotal movement, and a second link follower 1054*c* (second follower) which is loosely fitted to a notch formed in a portion of the tilting plate 1054*a* away from the sliding surface and which is allowed to move up and down in association with the pivotal movement.

The link followers 1054*b* and 1054*c* are axially and pivotably supported above the front end of the link driver 1053. The followers 1054*b* and 1054*c* are actuated for pivotal and up-and-down movement as the ejecting mechanism 1054 advances and recedes (reciprocally moves). More specifically, in an ordinary state in which the link driver 1053 advances (see FIGS. 11A-11C), the first link follower 1054*b* toward the sliding surface, including its pivotable end, is flush with the tilting plate 1054*a* or lowered below the plate 1054*a*. The pivotable end of the second link follower 1054*c* is projected above the tilting plate 1054*a*. Meanwhile, as the link driver 1053 is receded (see FIG. 11D), the pivotable end of the first follower 1054*b* is projected above the tilting plate 1054*a*, and the second link follower 1054*c*, including its pivotable end, is flush with the tilting plate 1054*a* or lowered below the plate 1054*a*.

To achieve the pivotal movement of the link followers 1054*b* and 1054*c* by means of the reciprocal movement of a single link driver 1053, the connection between the link followers 1054*b* and 1054*c* and the link driver 1053 is implemented by using loose holes 1053*a* and 1053*c* formed at the front end of the link driver 1053, resulting in a cam sliding pair allowed to loosely move in a predefined range.

The rear end of the link driver 1053 is joined to the arm end of the electric motor 1012 via, for example, a link for converting rotation into linear motion. As the electric motor 1012 causes its arm to make one full turn, the link driver 1053 reciprocates once and the link followers 1054b and 1054c move up and down accordingly.

The description of the usage mode and operation of the pharmaceutical product cassette 1050 will not be repeated. The usage mode and operation are basically same as those of the cassette 1010 according to the illustrative embodiment 2-1.

Due to the fact that the ejecting mechanism is implemented by a link mechanism instead of a cam mechanism, the alternate up-and-down movement of the first and second followers in the ejecting mechanism is implemented by the up-and-down movement caused by the pivotal movement of first link follower 1054b and the second link follower 1054c, instead of the direct up-and-down movement of the cam followers. The ejection operation in respect of the movement of pharmaceutical products is the same as that of the cassette 1010, and so is the usage of the cassette.

Like the cassette 1010, the cassette 1050 is advantageous in that the structure is simple, and pharmaceutical products can be accurately ejected only when necessary. The sliding surface has a gentle slope and, still, the motor, etc. are efficiently accommodated in a space below the sliding surface.

Illustrative Embodiment 2-5

The specific structure of the pharmaceutical product dispensing apparatus of a type provided with a row of cassettes according to the illustrative embodiment 2-5 of the second embodiment will be described with reference to the associated drawings. FIG. 12A is a front view (BB section) of the pharmaceutical product dispensing apparatus 1060; and FIG. 12B is a side view (AA section) of the pharmaceutical product dispensing apparatus 1060.

This pharmaceutical product dispensing apparatus 1060 is configured such that a large number of cassettes 1050 described above (in the figure, a total of 12 cassettes in a matrix of 4 rows and 3 columns) are stored in a cassette storage unit. The ejecting sides of the cassettes 1050 face forward, and a descent guidance channel 1031 is provided in front of the cassettes 1050. A transporting mechanism 1032 forming the collecting and dispensing mechanism in combination with the descent guidance channel 1031 is provided below the channel 1031. A dispensing outlet 1033 is formed at the end of the transportation.

In this case, some of the cassettes 1050 align the pharmaceutical products mentioned above in the illustrative embodiment 2-1 for storage, and other cassettes 1050 align other pharmaceutical products for storage.

When the cassette 1050 is directed by a controller (not shown) to eject a product in accordance with prescription data or medicine preparation instruction data derived therefrom, the cassette 1050 receiving the direction sequentially and successively ejects pharmaceutical products as described above in the illustrative embodiment 2-4. The pharmaceutical products thus ejected fall down the descent guidance channel 1031 onto the transporting mechanism 1032. The products are transported by the transporting mechanism 1032 before being brought out the apparatus via the dispensing outlet 1033.

In this way, desired pharmaceutical products are automatically dispensed, as in the above embodiments.

Illustrative Embodiment 2-6

The specific structure of the pharmaceutical product dispensing apparatus of a type partitioned by racks according to the illustrative embodiment 2-6 of the second embodiment will be described with reference to the associated drawings. FIG. 13A is a front view (DD section) of an pharmaceutical product dispensing apparatus 1070; and FIG. 13B is a side view (CC section) of the automatic pharmaceutical product dispensing apparatus 1070.

The pharmaceutical product dispensing apparatus 1070 differs from the pharmaceutical product dispensing apparatus 1060 described above in that equivalents of the plurality of cassettes 1050 arranged side by side are built into an upper rack 1042 having a gentle descending slope and a rear pod frame 1071. The upper rack 1042 is a horizontally elongated rack plate substituting on its own the entire base plates 1051 of the cassettes 1050 arranged side by side, and is the same as the rack 1042 of the illustrative embodiment 2-3. The rear pod frame 1071 is a horizontally elongated plate frame substituting the entire rear pod plates 1052 of the cassettes 1050 arranged side by side.

More specifically, a row of rollers 1015 forming the sliding surface are provided on top of the upper rack 1042. Partitions 1043, which are a substitute for the side plates 1016, are also fitted to the top of the upper rack 1042. The ejecting mechanisms 1054 are supported at the end of the upper rack 1042. The link driers 1053 are fitted underneath the upper rack 1042, and the electric motors 1012 are fitted to the rear pod frame 1071.

A plurality of sliding surfaces, each formed by a row of the rollers 1015 in the direction of slope of the upper rack 1042, are arranged in the level direction, i.e., the longitudinal direction, of the upper rack 1042. Removable partitions 1043 are provided so as to form blocks each comprising an appropriate number of sliding surfaces. The ejecting mechanism 1054 is provided in each of the blocks partitioned by the partitions 1043. Likewise, the motor 1012 and the link driver 1053 are provided in association with each of the blocks. The motor 1012 and the link driver 1053 are provided beneath the sliding surface 1015. Each of the ejecting mechanisms 1054 is provided at the end of the partition 1043 on the upper rack 1042. The motor 1012, the link driver 1053 and the mechanism 1054 in the same block are connected to each other. In each block, the motor arm of the motor 1012 and the rear end of the link driver 1053 are connected to each other via a link for converting rotation into linear motion. The front end of the link driver 1053 and the link followers 1054b and 1054c are joined so as to convert linear motion into pivotal movement with appropriate play.

In this configuration, each of the blocks partitioned by the partitions 1043 corresponds to the aforementioned cassette 1050 described above. The usage mode and operation are the same as described above, except that each rack, instead of each cassette, is subject to repair or replacement.

In this case, as in the pharmaceutical product dispensing apparatus 1040 according to the illustrative embodiment 2-3, two partitions 1043 are provided between blocks. Alternatively, only one partition 1043 may be provided between blocks if it is ensured that a portion of a pharmaceutical product, such as the top thereof, is not projected above the partition 1043 into an adjacent block. As in the foregoing embodiments, the partition 1043 and the motor 1012 may be removable instead of permanently fixed.

Illustrative Embodiment 2-7

The specific structure of the pharmaceutical product dispensing system according to the illustrative embodiment 2-7 of the second embodiment will be described with reference to the associated drawings. FIG. 14A is a front view of the whole system. FIGS. 14B and 14C show the structure of a semi-automatic pharmaceutical product storage apparatus. FIG. 14B is a front view, and FIG. 14C is a perspective view. FIGS. 15A-15F show the mechanical structure of the semi-automatic pharmaceutical product storage apparatus. FIG. 15A is a front view of the whole apparatus; FIG. 15B is a perspective view of the whole apparatus; FIG. 15C is a perspective view of a container 1220; FIG. 15D is a perspective view of container opening mechanism 1230-1233; FIGS. 15E and 15F are right side view of an essential part. FIG. 16 is a schematic block diagram of a controller.

The pharmaceutical product dispensing system (see FIG. 14A) comprises an automatic pharmaceutical product dispensing apparatus 1080, a semi-automatic pharmaceutical product storage apparatus 1100 and a semi-automatic pharmaceutical product storage apparatus 1200 arranged side by side in the stated order. The automatic pharmaceutical product dispensing apparatus 1080 aligns rows of box-shaped products (pharmaceutical products) such as box-packaged medicines for storage so that the products are sequentially (successively) ejectable. The apparatus automatically discharges the pharmaceutical products from the rows and guides the products downward for collection. The pharmaceutical product storage apparatus 1100 holds a two-dimensional array of a large number of containers accommodating various medicines (pharmaceutical products) including box-packaged medicines so that the containers can be drawn forward. The apparatus 1100 is configured to advance the containers by using container opening mechanisms provided behind the containers. The pharmaceutical product storage apparatus 1200 holds a two-dimensional array of a large number of containers accommodating various pharmaceutical products so that the containers can be drawn forward. The apparatus 1200 is configured to advance the containers by using container opening mechanisms provided behind the containers.

A transporting mechanism 1160 and a work table 1115 are provided in the pharmaceutical product storage apparatus 1100 but not in the pharmaceutical product storage apparatus 1200.

The pharmaceutical product dispensing apparatus 1080 may be any one of the pharmaceutical product dispensing apparatuses 1030, 1040, 1060 and 1070. The transporting mechanism 1032 provided on the bottom of the housing interior of the apparatus 1080 and a transporting mechanism 1160 provided in the lower half of the housing interior of the pharmaceutical product storage apparatus 1100 constitute a continuous transporting channel that runs across the pharmaceutical product dispensing apparatus 1080 and the pharmaceutical product storage apparatus 1100.

A description will now be given of the respective elements sequentially. The description of the pharmaceutical product dispensing apparatus 1080, which is the same as any one of the pharmaceutical product dispensing apparatuses 1030, 1040, 1060 and 1070, will be omitted. The structure of the semi-automatic pharmaceutical product storage apparatus 1100 will be described with reference to FIGS. 14A-14C, the structure of the semi-automatic pharmaceutical product storage apparatus 1200 will be described with reference to FIGS. 15A-15F, and the structure of a control device will be described with reference to FIG. 16.

The pharmaceutical product storage apparatus 1100 (see FIGS. 14B and 14C) is configured such that a shutter 1112 is provided in the topmost part of a housing 1111. The upper half of the housing 1111 that can be easily reached by hand is occupied by a storing unit 1114. The storing unit 1114 is partitioned into grids so as to form a multiple-tier and multiple-column array (in the figure, 10 tiers and 8 columns) of drawer frames. The interior surfaces of the drawer frames are finished to smooth surfaces with low friction. Therefore, the frames are capable of holding a two-dimensional array of containers 1220 such that the containers can be pulled or pushed forward. Each of the drawer frames is provided with the container opening mechanism 1230-1233. The mechanism 1230-1233 is placed behind the container 1220 and cannot be viewed from the front.

A series of light projecting members 1213 are provided at the top end of the front of the storing unit 1214. A detailed description of these elements will be omitted since they are also provided in the pharmaceutical product storage apparatus 1200.

The lower half of the housing 1111 of the pharmaceutical product storage apparatus 1100 is used as a work area for jobs that require operator attendance such as the job of dispensing pharmaceutical products etc. and the monitoring job. More specifically, a work table 1115 of a plate shape with a flat top is provided to extend horizontally halfway between the top and bottom of the housing 1111. Immediately above the work table 1115 and toward the rear end thereof is provided an indicator 1150 which is viewable. At the end of the work table 1115 farthest away from the pharmaceutical product dispensing apparatus 1080 is formed a chute 1116 by cutting a portion of the work table 1115. A weighing scale 1170 is provided in the chute 1116, and a transporting mechanism 1160 is built in the apparatus 1111 below the work table 1115.

The chute 1116 is sufficiently deeper than the height of the weighing scale 1170. A discharge opening 1117 is formed halfway between the work table 1115 and the weighing dish of the weighing scale 1170. At the side of the housing 1111 facing the pharmaceutical product dispensing apparatus 1080 is formed an incoming port 1118. The transporting mechanism 1160 extends diagonally upward from the incoming port 1118 toward the discharge opening 1117. Medicines dispensed by the automatic pharmaceutical product dispensing apparatus 1080 are accepted by the incoming port 1118 and transported to the discharge opening 1117 before being fed to the chute 1116. The indicator 1150 is implemented by, for example, a small liquid crystal panel capable of displaying the number of medicines to be dispensed, breaking it down into the number of medicines to be dispensed automatically and the number of medicines to be dispensed semi-automatically, or into the number of medicines to be dispensed from the apparatuses 1080, 1100 and 1200. A requirement for the weighing scale 1170 is that it provides sufficient precision and the weighing dish faces upward. In this example, an electronic weighing scale capable of transmitting a weight value is employed.

The pharmaceutical product storage apparatus 1200 (see FIGS. 15A and 15B) is configured such that a shutter 1212 is provided in the top part of a housing 1211, and a drawer 1215 and electric equipment 1216 are provided in the lower part of the housing 1211. The greater part of the housing 1211, which can be easily reached by hand, i.e., the middle part thereof, is occupied by a storing unit 1214. Like the storing unit 1114, the storing unit 1214 is partitioned into grids so as to form a multiple-tier and multiple-column array (in the figure, 17 tiers and 8 columns) of drawer frames. The interior surfaces of the drawer frames are finished to smooth surfaces with low friction. Therefore, the frames are capable of holding a two-dimensional array of containers 1220 such that the containers can be pulled or pushed forward. Each of the drawer frames is provided with the container opening mechanism 1230-1233. The mechanism 1230-1233 is placed behind the container 1220 and cannot be viewed from the front. A series of light projecting members 1213 are provided at the top end of the front of the storing unit 1214.

The container 1220 (see FIG. 15C) is a longitudinally elongated box with an open top so that the container can accommodate pharmaceutical products and can be drawn. A front plate 1221 is transparent. In the illustrated example, a side plate 1223 and a bottom plate 1224 are non-transparent. At the front end of the container 1220 (more specifically, in a space inside the container 1220 immediately behind the front plate 1221) is formed a slope 1222 by forming a bank on the bottom plate 1224 or by fitting a triangle pole member on its side to the bottom plate 1224. The slope 1222 is finished to a diffusely reflecting surface such as that of frosted glass and faces diagonally upward at an angle of inclination of about 30°-60° (in FIGS. 15E and 15F, about 45°) with respect to the horizon. Therefore, the slope serves as a visualizer for receiving the light projected vertically downward (see FIG. 15F) and directing the light forward as reflected and diffused light A.

The mechanism 1230-1233 (see FIG. 15D) is provided with a commercially available electric motor 1230 of a flat type, an eccentric cam 1232 fitted to its rotation shaft 1231, and a origin sensor 1233 such as a push switch. When the large-diameter portion of the eccentric cam 1232 is in contact with the origin sensor 1233 and is at rest (see FIG. 15E), the container 1220 can fully recede into and is accommodated in the storing unit 1214. When the rotation shaft 1231 of the motor 1230 is rotated halfway (see FIG. 15F), the large-diameter portion of the eccentric cam 1232 presses the rear end of the container 1220 so as to advance the container 1220. The amount of advance, i.e., the distance in which the container is driven forward, is 2-3 cm, which is sufficient to project the slope 1222 from the drawer frame and allow a user to grip the front plate 1221. As such, the distance is many times smaller than the depth of the container 1220, which is about 20-30 cm.

The light projecting member 1213 (see FIG. 15A) is implemented by, for example, a narrow-directivity red light-emitting diode (LED) emitting a beam of light. The member 1213 is provided for each column of drawer frames of the storing part 1214 so as to project light vertically downward. Light is projected through a space in front of those multiple containers 1220 in a column that are in a pushed-back position (see the chain double-dashed line of FIG. 15E), and the front end of the container 1220 advanced by the eccentric cam 1232 of the mechanism 1230-1233 is projected (see FIGS. 15B and 15F). Due to this arrangement and the fact that the containers 1220 are arranged as described above, the light receiving portion of the slope 1222 is illuminated by the reflected and diffused light A. The light projecting member 1213 and the motor 1230 mentioned above are operated in accordance with automatic control by the main controller 1330 described below.

The control device (see FIG. 16) comprises a group of processors comprising a main controller 1300 implemented by a programmable personal computer, a microprocessor system or the like; a large number of subcontrollers 1310, 1311 and 1312 implemented by, for example, one-chip microcomputers. The processors are in star connection or connected via LAN, with the main controller 1300 at the center. The main controller 1300 may be provided in an operation console, if any. Alternatively, the controller 1300 may be stored in the lower part of the pharmaceutical product storage apparatus 1100 or in the upper part of the pharmaceutical product dispensing apparatus 1080. In the illustrated example, the controller 1300 is stored in the electric equipment 1216 of the pharmaceutical product storage apparatus 1200 along with a power supply (not shown). The subcontroller 1310 is provided in the pharmaceutical product dispensing apparatus 1080, the subcontroller 1311 is provided in the pharmaceutical product storage apparatus 1100, and the subcontroller 1312 is provided in the pharmaceutical product storage apparatus 1200.

The main controller 1300 controls the automatic pharmaceutical product dispensing apparatus 1080 to select and dispense a medicine 1020 in accordance with pharmaceutical product dispensing information. The controller 1300 controls the semi-automatic pharmaceutical product storage apparatuses 1100 and 1200 to select one or a plurality of a large number of containers 1220 and actuate one or a plurality of mechanisms 1230-1233 corresponding to the selection. In order to obtain pharmaceutical product dispensing information designating pharmaceutical products to be dispensed, the main controller 1300 is configured to receive, from a host computer such as a prescription ordering system (prescription order entry system) indicated by broken lines, prescription data or medicine preparation instruction data derived therefrom, or to receive an instruction for dispensing from an input device (not shown).

A plurality of the motors 1230 and the light projecting members 1213 of the pharmaceutical product storage apparatus 1200 are connected to the main controller 1300 via the subcontroller 1312. A plurality of the motors 1230 and the light projecting members 1213 of the pharmaceutical product storage apparatus 1100 are connected to the main controller 1300 via the subcontroller 1311. Further, the indicator 1150, the transporting mechanism 1160 and the weighing scale 1170 are connected to the main controller 1300 via the subcontroller 1311. A plurality of the motors 1012 of the pharmaceutical product dispensing apparatus 1080 are connected to the main controller 1300 via the subcontroller 1310. Further, the transporting mechanism 1032 is connected to the main controller 1300 via the subcontroller 1310.

The mode of using the pharmaceutical product dispensing system according to the illustrative embodiment 2-7 and its operation will be described with reference to the drawings.

FIGS. 15A-15F show how the semi-automatic pharmaceutical product storage apparatus 1200 operates, where FIG. 15A is a front view, FIG. 15B is a perspective view, and FIGS. 15E and 15F are right side views of an essential part. FIGS. 15A and 15E show the containers 1220 are pushed back and recede into the storing unit 1214. FIGS. 15B and 15F show that the container 1220 in the second tier and the second column from top right is selected and automatically advanced. The illustration of FIGS. 15E and 15F applies also to the storing unit 1114 of the pharmaceutical product storage apparatus 1100 shown in FIGS. 14B and 14C. FIGS. 14B and 15E show the containers 1220 are pushed back and recede into the storing unit 1114. FIGS. 14C and 15F show that the container 1220 in the second tier and the third column from top left is selected and automatically advanced.

Prior to use, pharmaceutical products such as medicines and medical resources are accommodated in the containers 1220 of the semi-automatic pharmaceutical product storage apparatuses 1100 and 1200 according to the category. Typical examples of medicines (see patent document No. 6) include box-packaged medicines, ampoules and medicines dissolved before use. Typical examples medical resources include bone prothesis and medical operation tools.

In this pharmaceutical product dispensing system, those of pharmaceutical products not accommodated in the automatic pharmaceutical product dispensing apparatus 1080 that are used frequently are stocked according to the category in the containers 1220. Other pharmaceutical products are also stocked according to the category in the containers 1220 if space permits. If space still permits, some pharmaceutical products may be accommodated both in the apparatus 1080 and in the containers 1220, in order to avoid a wait for replenishment.

The containers 1220 accommodating these pharmaceutical products according to the category are pushed and inserted into the drawer frames of the storing units 1114 and 1214. The positions of the containers 1220 are entered manually or otherwise in the main controller 1300 and stored in a medicine master file etc. This completes preparation of the semi-automatic pharmaceutical product storage apparatuses 1100 and 1200. At this stage (see FIGS. 14B, 15A and 15E), none of the containers 1220 is illuminated since the containers 1220 are in a pushed-back position and are closed.

The automatic pharmaceutical product dispensing apparatus 1080 is also set up prior to use and automatic medicine preparation. As described above, the pharmaceutical products 1020 such as box-packaged medicines are aligned for storage. A detailed description will be omitted. The medicines 1020 frequently used are accommodated in preference to other medicines. Typically, the width of a box-packaged medicine is 10-100 mm, the length thereof is 100-200 mm, and the thickness thereof is several mm. The weight of a box-packaged medicine is typically several-100 g.

This completes the preparation of the pharmaceutical product dispensing system for use.

When prescription data or medicine preparation instruction data is delivered to the main controller 1300 via communication or manual operation, medicine codes and prescribed amount are extracted from the data to formulate pharmaceutical product dispensing information. The main controller 1300 searches the medicine master file in accordance with the pharmaceutical product dispensing information. If any of the medicines 1020 can be automatically dispensed from the pharmaceutical product dispensing apparatus 1080, the medicine is selected. If not, and if any of the pharmaceutical products can be dispensed from the pharmaceutical product storage apparatus 1100 or the apparatus 1200 in a semi-automatic fashion, the product is selected. In either case, the number of products to be dispensed is displayed on the indicator 1150.

The medicine 1020 dispensed from the automatic pharmaceutical product dispensing apparatus 1080 is automatically transferred onto the transporting mechanism 1160 of the pharmaceutical product storage apparatus 1100 via the dispensing outlet 1033 and the incoming port 1118, and then transported to the discharge opening 1117 by the transporting mechanism 1160 before being fed to the chute 1116. The product is then placed on the weighing dish of the weighing scale 1170 and weighed.

In parallel with or independent of this process, the main controller 1300 may select a pharmaceutical product in the pharmaceutical product storage apparatus 1100 or the pharmaceutical product storage apparatus 1200 for dispensing/retrieval in accordance with the pharmaceutical product dispensing information mentioned above. In this case, the container 1220 storing the pharmaceutical product to be dispensed or taken out is selected and the mechanism 1230-1233 behind the selected container is actuated. The target container 1220 is then pushed forward by the eccentric cam 1232 and opened. The light projecting member 1213 above projects a beam of light.

In this state (see FIGS. 14C, 15B and 15F), the front end of the target container 1220 is projected from the storing unit 1114 or the unit 1214 so that the light projected by the light projecting member 1213 impinges upon the slope 1222 of the container 1220. The slope 1222 directs the projected and diffused light A forward. As a result, the container 1220 is seen illuminated. In this way, the container 1220 for retrieval of a pharmaceutical product is highlighted and opened. An operator places his or her finger on the front plate 1221 of the container 1220 through the opening so as to pull out the container 1220. The operator takes out a desired pharmaceutical product, closes the container 1220 by pushing it back and indicates to the main controller 1300 that the job of dispensing is completed in order to save a job record. In response to this, the light projecting member 1213 stops projecting light.

In this way, manual dispensing of pharmaceutical products, stored in the pharmaceutical product storage apparatuses 1100 and 1200 in a closed status according to the category, can be performed easily and efficiently. Pharmaceutical products are taken out manually so that a desired number of pharmaceutical products can be taken out in accordance with the guidance provided by the indicator 1150. While the operation of taking out is manually performed, selection of a target of retrieval and operation of advancing are automatic. Thus, desired medicines are dispensed easily and efficiently. As mentioned above, the mechanism 1230-1233 is of a simple structure comprised of a combination of the motor 1230 and the eccentric cam 1232. The number of light projecting members 1213 is small in that it is equal to the number of columns of the drawer frames of the storing units 1114 and 1214 and smaller than the number of containers 1220. Thus, the semi-automatic pharmaceutical product storage apparatuses 1100 and 1200 can be fabricated at a low cost.

Pharmaceutical products dispensed from the semi-automatic pharmaceutical product storage apparatuses 1100 and 1200 are assembled on the work table 1115 by the operator. After being inspected as to medicine type and quantity, the products are slid on the work table 1115 before being dropped to the chute 1116. The products are then placed on the weighing dish of the weighing scale 1170 and weighted along with the medicine 1020. The weight is displayed in the weighing scale 1170 and is also communicated by the weighing scale 1170 to the main controller 1300 by using a signal or the like. The main controller 1300 converts the weight into the number of medicines (count) by referring to, for example, the weight per unit of medicines maintained in a medicine master file. The count is checked against the prescribed amount. When the count and the amount match, the indicator 1150 displays OK, for example. In the event of failure to match, the indicator 1150 displays NG, for example.

The operator may refer to the display to learn whether there is a match and also to the number of products dispensed per apparatus. The operator can then proceed to medicine preparation checkup by transferring the medicine 1120 and the product to the work table 1150 from the weighing scale 1170. In this way, the operator can easily follow the steps of checkup as well as medicine preparation.

Thus, with the inventive pharmaceutical product dispensing system, a large number of pharmaceutical products can be efficiently prepared and then checked at a reasonable cost.

Illustrative Embodiment 2-8

The specific structure of the semi-automatic pharmaceutical product dispensing apparatus according to the illustrative embodiment 2-8 of the second embodiment will be described with reference to the associated drawings. FIG. 17A is a perspective view of a container 1220; FIG. 17B is a front view of a name plate 1225; and FIG. 17C is a perspective view of the container 1220. Sets of medicines not packaged in a box are shown in FIG. 17C as examples of pharmaceutical products 1250.

The pharmaceutical product storage apparatus differs from that of the illustrative embodiment 2-7 in that the container 1220 is integrally formed by transparent plastic and the visualizer attached is implemented by the name plate 1225 placed on the slope 1222.

The container 1220 can be integrally molded at a low cost, using the same material for the slope 1222, the side plate 1223, the bottom plate 1224 and the front plate 1221.

The name plate 1225 is non-transparent paper or a plastic sheet and is formed with substantially the same size as the slope 1222. At least one side thereof is formed as a coarse surface reflecting and diffusing impinging light. The name and/or code of a medicine is handwritten or printed on the name plate 1225.

In this case, the visualizer is easily and inexpensively provided in the container 1220 by placing the name plate 1225 on the slope 1222 with the printed or handwritten surface facing upward.

Illustrative Embodiment 2-9

The semi-automatic pharmaceutical product storage apparatus according to the second embodiment, an essential part of which is shown in the right side view of FIGS. 18A-18C, differs from those of the illustrative embodiments 2-7 and 2-8 in that the bottom plate 1224 of the container 1220 is non-transparent and that a light receiving member 1260 is provided at the destination of projection of light from the light projecting member 1213. The main controller 1300 is configured (not shown) to determine whether the container 1220 is drawn by referring to the light reception state of the light receiving member 1260.

In this case, as the mechanism 1230-1233 projects the container 1220 for retrieval out of the storing unit 1114 or the unit 1214 (see FIG. 18A), the light projected from the light projecting member 1213 to the light receiving member 1260 is blocked by the front end of the container 1220, preventing the light receiving member 1260 from receiving the light.

When the container 1220 is drawn further forward for retrieval of the pharmaceutical product 1250 (see FIG. 18B), the light receiving member 1260 continue to fail to receive the light because the light projected from the light projecting member 1213 to the light receiving member 1260 is blocked by the bottom plate 1224 of the container 1220 unless the container 1220 is completely pulled out.

Meanwhile, when the container 1220 is pushed back upon completion of the retrieval of the pharmaceutical products 1250, causing the container 1220 to recede into the storing unit 1114 or the unit 1214 (see FIG. 18C), nothing blocks the light projected from the light projecting member 1213 to the light receiving member 1260 so that the light receiving member 1260 receives the light.

A signal indicating change in the light reception status of the light receiving member 1260 that depends on whether the container 1220 is projected is input to the main controller 1300. A time stamp is included in log data.

If the failure of the light receiving member 1260 to receive the light cannot be detected even if the motor 1230 is actuated, the main controller 1300 determines that automatic advancement of the container 1220 is not completed and issues an appropriate alarm.

If there is an input indicating the completion of a dispensing operation while resumption of reception of light by the light receiving member 1260 is not detected, the main controller 1300 determines that the dispensing operation is not completed and issues a guidance message prompting the operator to close the container 1220.

[Other Points of Note]

In the above-mentioned illustrative embodiments 2-2, 2-3, 2-5 and 2-6, the collecting and dispensing mechanism is configured to cause the pharmaceutical product 1020 ejected forward from the cassette 1010 or the cassette 1050 or a block equivalent to the cassette to fall, before horizontally transporting the product, but the mechanism is not limited to this configuration. For example, the pharmaceutical product 1020 ejected from the cassette 1010 or the cassette 1050 may be fetched by a mechanism capable of X-Y translation so that the product 1020 thus collected is transported to the position of dispensing (see, for example, patent document No. 2). Alternatively, the pharmaceutical product 1020 ejected from the cassette 1010 or the cassette 1050 may be horizontally moved before causing it to fall for collection (see, for example, patent document No. 3).

In the illustrative embodiments 2-7-2-9 described above, it is assumed that the containers 1220 have the same size and shape. Alternatively, the containers may come in different sizes or shapes. In that case, the height of the eccentric cam 1232 may be varied so as to be compatible with the height of the container 1220. The motor 1230 may not be at substantially the same height as the associated container 1220 so long as the eccentric cam 1232 is capable of pressing the rear end of the container 1220.

The light projecting member 1213 may be provided toward the bottom of, or to the left or right of the front space, instead of above thereof. The direction of projection of light by the light projecting member 1213 may be upward, horizontal or diagonal instead of vertically downward.

In the illustrative embodiments, the control device is of a two-tier structure including the main controller 1300 and the subcontrollers 1310, 1311 and 1312. Alternatively, a local controller may be provided for each of the dispensing apparatuses 1080, 1100 and 1200 to achieve a three-tier structure including the main controller 1300, the local controller and the subcontrollers 1310, 1311 and 1312.

In the illustrative embodiments, an escalator-like slope conveyor is illustrated as an example of the transporting mechanism 1160. The transporting mechanism 1160 may be like an elevator or a combination of multiple types.

In the illustrative embodiments, the work table 1115 is cut immediately above the discharge opening 1117. Alternatively, the table may be projected above the chute 1116.

The pharmaceutical product storage apparatus 1200 is a version of the pharmaceutical product storage apparatus 1100 in which the storing unit is expanded. The number of apparatuses 1200 may vary appropriately depending on the number of types of pharmaceutical products.

Third Embodiment

The third embodiment relates to a pharmaceutical product cassette for supporting pharmacy operations in hospitals and dispensaries, etc., a pharmaceutical product dispensing apparatus storing a large number of cassettes, and a pharmaceutical product dispensing system in which heterogeneous apparatuses are provided side by side. More particularly, the third embodiment relates to a pharmaceutical product cassette which aligns pharmaceutical products for storage and ejects products sequentially, starting from the at the end, a pharmaceutical product dispensing apparatus which dispenses a pharmaceutical product automatically, and a pharmaceutical product dispensing system which dispenses a pharmaceutical product automatically from a pharmaceutical product dispensing apparatus or dispenses a product semi-automatically from a pharmaceutical product storage apparatus.

The third embodiment is suitable for automatic ejection and automatic dispensing of pharmaceutical products like box-packaged medicines which do not roll easily. However, the embodiment is not only applicable to pharmaceutical products which do not roll easily but also to products which roll easily. In addition to box-packaged medicines, pharmaceutical products referred to in the specification encompass, for example, packaged injection medicines such as ampoules, vials and contrast medium; medicines such as tablets, powder, paste and eye lotion which are accommodated in a bottle or the like; and other auxiliary medicines so long as they can be aligned for storage. Pharmaceutical products subject to storage and dispensing by the semi-automatic pharmaceutical product storage apparatus may include those not suitable for aligned storage or free fall ejection.

Base Technology Related to Third Embodiment

If the items stored are not limited to pharmaceutical products, a typical example of stock repository provided with categorized stock function will be a supply table at a facility or a general-purpose locker in which a storage area is partitioned into a large number of compartments each provided with a door.

In the case of storage of pharmaceutical products, there is known a medicine storage apparatus capable of aligning medicines such as ampouled medicines for storage so that the medicines can be stored or taken out in a single action (see, for example, patent document No. 4). The apparatus is designed to display guidance by LED's etc. to guide a user to the location of cassette for storage or retrieval. Pharmaceutical products are manually picked up and retrieved.

There is also known a medicine rack designed to display guidance to guide a user to the location of retrieval, by illuminating a bottle that stores powder medicine (see, for example, patent document No. 5).

There is also known a pharmaceutical product storage apparatus in which doors and drawers can be so wide open or completely drawn forward that no such location guidance display is necessary (see, for example, patent document No. 6). In this apparatus, the opening operation is automated in addition to the selection of a pharmaceutical product stocked according to the category. As such, the apparatus is favorably used in that the location of a desired pharmaceutical product is immediately known and the product is brought to a retrievable state concurrently.

A medicine dispensing apparatus, capable of ejecting pharmaceutical products automatically by providing a semicylindrical movable lid at the front end of a cassette and by axially rotating the lid, is also available (see, for example, patent document No. 2), addressing the need for automatic dispensing as well as storage. A dispensing and transporting mechanism, which retrieves a pharmaceutical product stored in the apparatus from a pharmaceutical product outlet of a cassette and conveys the product to a predetermined position, is built in the apparatus.

There is also developed a medicine dispensing apparatus provided with a medicine transporting apparatus which horizontally moves the medicine ejected from a cassette, a descent guidance member which causes the medicine to fall and collects the medicine, and a carrier transporting apparatus which transports a carrier to a position for introducing the collected medicine into the carrier (see, for example patent document No. 3).

Such a cassette and dispensing apparatus allow alignment and storage of various kinds of medicines and pharmaceutical products, and automatic ejection and collection of desired ones for dispensing.

Problem to be Solved by Third Embodiment

In the case of pharmaceutical products in a container, like box-packaged medicines, which have a flat shape and which do not easily roll, however, alignment and storage of the products is possible, but, in order to slide the products on a gentle slope under their own weight in a stable manner, frictional force must be reduced by, for example, arranging rollers on the sliding surface.

Further, in the case of products such as axially asymmetrical, extremely low-profile boxes, it is difficult to apply the related art to the provision for sequential ejection from the front end of a cassette. More specifically, it is difficult to apply the method of ejecting a pharmaceutical product by axially rotating a semi-cylindrical movable lid.

A semi-cylindrical movable lid has an advantage in sequential ejection of pharmaceutical products aligned for storage in that parallel switching between halt/advancement of a pharmaceutical product at the head of a queue and advancement/halt of subsequent products is implemented by a single active member. If the method utilizing axial rotation and pivotal movement cannot be employed, there has to be provided an additional active member which actuates next and subsequent products so as to cause them to advance in an ordinary state and halts them when actuated, in addition to an active member which actuates a product at the head so as to halts it in an ordinary state and cause it to advance when actuated.

However, considering long-term stable operation and for ease of repair and replacement, it is preferable that the active members of the mechanism for ejecting products be integrated. Integration of active members lends itself to cost reduction and compact implementation.

Accordingly, a technical challenge in a pharmaceutical product cassette and an automatic pharmaceutical product dispensing apparatus is to modify the structure of an ejecting mechanism such that linear motion of integrated active members achieves parallel switching between halt/advancement of a pharmaceutical product at the head of a queue and advancement/halt of subsequent products, by forming a sliding surface by rollers to stabilize advancement of pharmaceutical products aligned for storage, and by additionally incorporating the form and advantage of that provision in the ejecting mechanism.

With regard to a semi-automatic pharmaceutical product storage apparatus, the convenience—convenience provided by categorized stock of a large number of pharmaceutical products, and capabilities for automatic target selection and opening operation in spite of its manual retrieval arrangement—has been appreciated. Demands have arisen, therefore, for extension of applications of the apparatus. For example, there have arisen demands for handling a large number of pharmaceutical products including less frequently used products as well as frequently used products.

However, the pharmaceutical product storage apparatus currently in use uses a special mechanism comprising a combination of a permanent magnet and a magnet coil in order to open the drawer to the extent that the drawer thus opened is immediately known. Therefore, it is difficult to reduce the cost of the opening mechanism.

Increasing the number of containers by arranging a larger number of small drawers in a two-dimensional array would result in a commensurate increase in the number of opening mechanisms, leading to a high price of the apparatus. Even if the unit price of the container is reduced as a result of size reduction, the cost of the mechanism is not reduced so much given that the distance in which the container is driven forward in the direction of drawing, i.e., the driving distance, remains unchanged.

This means that reducing the driving distance of the opening mechanism is a shortcut for reducing the cost. By reducing the distance, the opening mechanism can be built by, for example, an inexpensive, mass-produced electric motor, cam, etc.

A down side of reducing the driving distance of the opening mechanism is that the container would not be sufficiently noticeable as the target container is automatically opened, i.e., as the container accommodating the target pharmaceutical product is advanced automatically. This creates a desire for using guidance display to guide a user to the location of retrieval. Increase in cost due to provision for guidance display would then result in the advantage of reduced cost of the opening mechanism being lost.

Attempts to reduce the cost of guidance display for guiding a user to the location of retrieval may be possible by commonly using a light-emitting member in one location and in locations below, above, to the right or to the left thereof, so that the number of light-emitting members required is smaller than the number of containers (see, for example, FIG. 11 of patent document No. 4). Such an approach, however, does no ensure that each container is illuminated.

If the same number of light-emitting members as the containers are provided and arranged so as to be respectively associated with the containers (see, for example, FIG. 5 of patent document No. 4 or patent document No. 5), excellent visibility is ensured since each container is illuminated. However, the approach presents a problem with cost reduction.

Accordingly, a technical challenge is to modify the pharmaceutical product storage apparatus for the purpose of reducing the cost thereof. This can be achieved by ensuring that the driving distance of the opening mechanism is reduced, the light-emitting members are fewer than the containers, and the containers are independently illuminated despite the small number of light-emitting members, by exploiting the fact that automatic advancement of containers is maintained even if the driving distance is reduced.

In large hospitals and dispensaries, a medicine preparation system is built by, for example, providing various medicine preparation machines side by side, manually collecting desired medicines and connecting transporting mechanisms together.

Meanwhile, the variety of medicines is enormous. The cost that should be borne would be extraordinary if the whole variety of pharmaceutical products is accommodated in an automatic pharmaceutical product dispensing apparatus. For this reason, numerous non-accommodated pharmaceutical products not accommodated in an automatic apparatus are usually stored in a manually-operated medicine rack, etc, while frequently-used pharmaceutical products are accommodated in the automatic apparatus as described in patent document No. 3. The same is true if frequently-used pharmaceutical products are accommodated in a semi-automatic pharmaceutical product storage apparatus as described in patent document No. 6.

In this background, a first technical challenge in a pharmaceutical product dispensing system is to allow an automatic pharmaceutical product dispensing apparatus and a semi-automatic pharmaceutical product storage apparatus to share the task of accommodation so that as many pharmaceutical products as possible can be accommodated in a medicine preparation machine within a limited budget. Another aspect of the challenge is to reduce the cost of the apparatuses.

A second technical challenge in a pharmaceutical product dispensing system is to coordinate the automatic pharmaceutical product dispensing apparatus and the semi-automatic pharmaceutical product storage apparatus sharing the task of accommodation and secure a convenient work place so that the job of discharging pharmaceutical products from the apparatuses and the job of monitoring can be performed conveniently.

A summary of the third embodiment will now be given.

The first pharmaceutical product cassette and the first pharmaceutical product dispensing apparatus according to the third embodiment comprises sliding surfaces each having a gentle slope on which pharmaceutical products are placed and aligned for storage and sequential ejection (successive ejection), ejecting mechanisms each of which is provided in the neighborhood of the descent end of the sliding surface and each of which ejects the pharmaceutical products sliding down the gentle slope one by one from the end thereof, wherein each of the surfaces and each of the mechanisms are removable from each other.

More specifically, the sliding surface is formed by arranging rollers in first rows of rollers in the direction of slope, and the ejecting mechanism comprises a fitting part removably fitted to the front end of the first rows of rollers; second rows of rollers in which fewer rollers than those forming the sliding surface are arranged in rows; a stopper which is planted in the fitting part and which is projected above an extension of the sliding surface; and an elevating mechanism which is fitted to the fitting part, and which, in an ordinary state, locates the second rows of rollers on the extension of the sliding surface and, in an actuated state, elevates the second rows of rollers above the stopper.

Together, these components make up a pharmaceutical product cassette. By arranging a large number of such cassettes, and combining the cassettes with a collecting and dispensing mechanism, a pharmaceutical product dispensing apparatus is constituted. Alternatively, assemblies may not be turned into cassettes and may be arranged on a rack with partitions. A combination of such an arrangement and a collecting and dispensing mechanism also constitutes a pharmaceutical product dispensing apparatus.

A first pharmaceutical product dispensing system according to the third embodiment comprises a pharmaceutical product dispensing apparatus which aligns rows of pharmaceutical products for storage so that the products are sequentially (successively) ejectable, and which automatically discharges the products from the rows and guides the products downward for collection; and a pharmaceutical product storage apparatus which holds a two-dimensional array of a large number of containers accommodating pharmaceutical products so that the containers can be drawn forward, and which is configured to advance the containers by using container opening mechanisms provided behind the containers, the dispensing apparatus and the storage apparatus being provided side by side, wherein the pharmaceutical product dispensing apparatus is configured to maintain the products in alignment on the sliding surface formed by a large number of rollers (first rows of rollers), and to advance the products on the sliding surface while maintaining alignment thereof, the apparatus being further configured to sequentially eject the products, according to alternate up-and-down movement of a planted and secured stopper and rows of fewer rollers (second rows of rollers), and the pharmaceutical product storage apparatus is provided with a light projecting member for projecting light passing through a space in front of at least some of the containers in a pushed-back state, wherein a visualizer for directing the projected light forward is formed in or attached to the front end of each of the containers.

A second pharmaceutical product dispensing system according to the third embodiment comprises a pharmaceutical product dispensing apparatus and a pharmaceutical product storage apparatus arranged side by side, the pharmaceutical product dispensing apparatus aligning rows of pharmaceutical products for storage so that the products are sequentially (successively) ejectable, and automatically discharging the products from the rows and guiding the products downward for collection, the pharmaceutical product storage apparatus holding a two-dimensional array of a large number of containers accommodating pharmaceutical products so that the containers can be drawn forward, and the pharmaceutical product storage apparatus being configured to advance the containers by using container opening mechanisms provided behind the containers, wherein a work table is attached to the pharmaceutical storage apparatus, a chute is formed by cutting a portion of the work table, a weighing scale is provided in the chute, the system being further provided with a transporting mechanism for feeding a medicine ejected by the pharmaceutical product dispensing apparatus to the chute.

In the first pharmaceutical product cassette and dispensing apparatus, the ejecting member, for ejecting pharmaceutical products one by one in the neighborhood of the descent end of the sliding surface formed by the relatively numerous rollers of the first rows of rollers, comprises the fitting part, the second row of rollers, the stopper and the elevating mechanism. In an ordinary state, i.e., when the ejecting mechanism is not operated, the fewer rollers of the second rows of rollers of the ejecting mechanism are located on an extension of the relatively numerous rollers of the first rows of rollers. Accordingly, as the pharmaceutical products are aligned for storage on the sliding surface, the product at the head of a queue slides onto the fewer rollers of the ejecting mechanism. In the ordinary state, the stopper planted in the fitting part is projected above the envelope of the fewer rollers in the lowered state. Therefore, when resting on the fewer rollers of the second rows of rollers of the ejecting mechanism, the pharmaceutical product at the head of a queue is prevented by the stopper from advancing and is maintained in that state.

When the ejecting mechanism is actuated, the elevating mechanism is operated, causing the second rows of rollers to be elevated above the stopper. Accordingly, the pharmaceutical product at the head is no longer supported by the stopper and slides down the fewer rollers of the second rows of rollers until it is ejected. All this while, the next pharmaceutical product is prevented by the rear end of the second rows of rollers from advancing and remains on the sliding surface formed by the relatively numerous rollers of the first rows of rollers, without advancing, or after advancing only slightly closing in on each other and then coming to rest. When the elevating mechanism is operated in a reverse direction, causing the second rows of rollers to be lowered and causing the stopper to be projected again, the ordinary state is resumed. Then, the rear end of the second rows of rollers no longer supports the next pharmaceutical product. The pharmaceutical product, now at the head of the queue, leaves the sliding surface formed by the relatively numerous rollers of the first rows of rollers, rests on the fewer rollers of the second rows of rollers of the ejecting mechanism and remains there.

By configuring the apparatus to maintain the pharmaceutical products in alignment on the sliding surface formed by the relatively numerous rollers of the first rows of rollers, and to advance the products on the sliding surface while maintaining alignment thereof, and by ensuring that the products are sequentially and successively ejected according to alternate up-and-down movement of a planted and secured stopper and the fewer rollers of the second rows of rollers, active members of the ejecting mechanism are integrated into the second rows of rollers and simplified accordingly. Even with such an elevating mechanism, pharmaceutical products can be accurately ejected only when necessary. By configuring the elevating mechanism to be removable as a unit, ease of repair and replacement of an ejecting mechanism, with active members and an elevating mechanism, is further improved. Thus, according to the invention, the sliding surface having a gentle slope is formed by rollers so that pharmaceutical products aligned for storage can advance in a stable manner. Linear motion of the integrally formed active members achieves parallel switching between halt/advancement of a pharmaceutical product at the head of a queue and advancement/halt of subsequent products, so that stability and ease of operation are improved. Ultimately, an inexpensive and small-sized pharmaceutical product cassette and pharmaceutical product dispensing apparatus can be implemented.

In the first pharmaceutical product dispensing system described above, the automatic pharmaceutical product dispensing apparatus and the semi-automatic pharmaceutical product storage apparatus arranged side by side share the task of accommodating pharmaceutical products. By configuring the pharmaceutical product dispensing apparatus to maintain the pharmaceutical products in alignment on the sliding surface formed by the relatively numerous rollers of the first rows of rollers, and to advance the products on the sliding surface while maintaining alignment thereof, and by ensuring that the products are sequentially and successively ejected according to alternate up-and-down movement of a planted and secured stopper and the fewer rollers of the second rows of rollers, active members of the ejecting mechanism are integrated into the second rows of rollers and simplified accordingly. Further, there is no need to provide a weighing member or a biasing member on an individual basis, and, accordingly, the ejecting mechanism is simplified and the cost is eventually reduced.

An advantage with the semi-automatic pharmaceutical product storage apparatus is that, cost reduction is bolstered while maintaining convenience, by exploiting the automatic advancement of the containers to illuminate the containers by the light projecting members, which are fewer in number than the containers.

Further, the first pharmaceutical product dispensing system accomplishes the first technical challenge of the pharmaceutical product dispensing system as well as the technical challenge of the pharmaceutical product dispensing apparatus and the technical challenge of the pharmaceutical product dispensing apparatus.

In the second pharmaceutical product dispensing system, the automatic pharmaceutical product dispensing apparatus and the semi-automatic pharmaceutical product storage apparatus arranged side by side share the task of accommodating pharmaceutical products. Moreover, pharmaceutical products dispensed automatically from the pharmaceutical product dispensing apparatus are transferred by the transporting mechanism to the chute also in an automatic fashion before being placed on the weighing scale. Pharmaceutical products dispensed from the pharmaceutical product storage apparatus in a semi-automatic fashion are manually assembled on the worktable. After being inspected, the products are transferred to the chute by sliding on the work table, before being placed on the weighing scale.

Thus, inspection by weighing is performed easily and efficiently. If medicine preparation checkup by visual inspection is desired, the entire pharmaceutical products dispensed are returned to the work table for checkup.

Thus, according to the second pharmaceutical product dispensing system, the automatic pharmaceutical product dispensing apparatus and the semi-automatic pharmaceutical product storage apparatus sharing the task of accommodating pharmaceutical products are coordinated. A workplace for dispensing and inspecting pharmaceutical products is secured, and a weighing scale is provided exactly where the convenience of work is maximized. Accordingly, the second technical challenge mentioned above of the pharmaceutical product dispensing system is accomplished.

A first semi-automatic pharmaceutical product storage apparatus in the pharmaceutical product dispensing system according to the third embodiment may be of the following specific structure. The apparatus comprises a large number of containers which accommodate pharmaceutical products, a storing unit which holds the containers in a two-dimensional array so that the containers are drawable in a forward direction, and a large number of container opening mechanisms, each of the mechanisms being provided behind the associated container and advancing the associated container, wherein the mechanism is of a type with reduced driving distance, and a light projecting member (light-emitting member) for projecting light passing through a space in front of at least some of the containers in a pushed-back state is provided, and a visualizer for directing the projected light forward is formed in or attached to the front end of each of the containers.

The phrase "with reduced driving distance" means that the distance in which the opening mechanism advances the container is shorter than the depth (i.e., the longitudinal size) of the container. At the longest, the driving distance is less than half of the depth. Normally, the distance is as long as the longitudinal length of the part of the container identified as being the front end.

In the first semi-automatic pharmaceutical product storage apparatus, as the container selected for retrieval of a pharmaceutical product is automatically advanced by the container opening mechanism, the front end of the container is projected out of the storing unit. The light projected by the light projecting member impinges upon the front end so that the light is directed forward by the visualizer. Thus, the container selected for retrieval is illuminated. The same is true of the other containers selected for retrieval. It is ensured that each one of the containers is illuminated. The containers placed to face the same line of projected light share one light projecting member and, so, a plurality of them cannot be illuminated at the same time. As long as applications requiring simultaneous illumination are avoided, no inconvenience is presented if the number of light projecting members is smaller than the number of containers.

The visualizer for improving visibility by changing the direction of light is implemented at a lower cost than the light projecting member, by introducing a known light guiding member (see patent document No. 5), an appropriate reflective member or a diffusing member, or by treating the surface to form a reflective surface or a diffusing surface.

Thus, according to the invention, the cost of the semi-automatic pharmaceutical product storage apparatus is reduced while maintaining convenience, by reducing the driving distance by the container opening mechanism and ensuring at the same time that the containers are illuminated individually by the light projecting members fewer in number.

A second semi-automatic pharmaceutical product storage apparatus is a modification to the first pharmaceutical product storage apparatus mentioned above, wherein the container opening mechanism is provided with an eccentric cam fitted to a motor and the rotation shaft thereof.

Container opening mechanisms with reduced driving distance can be implemented by using mass-produced products available on the market for satisfactory reduction in the cost.

A third semi-automatic pharmaceutical product storage apparatus is a modification to the first or second pharmaceutical product storage apparatus mentioned above, wherein a front plate of the container is transparent, a slope is formed immediately behind the front plate, and the visualizer is a name plate placed on the slope.

In this case, the visualizer is implemented by placing the name plate on the slope inside the container. A plate body capable of reflecting and diffusing light at its surface is employed as the name plate, which also serves as the visualizer. Since ordinary white paper serves the purpose, the name plate can be implemented conveniently and inexpensively. If inexpensive, high-intensity light emitting devices are available, simultaneous illumination of multiple containers aligned to share the projected light will be realized by modifying the apparatus such that the reflectance of the visualizer is lowered, and that part of the light is transmitted therethrough and travels straight ahead.

A fourth semi-automatic pharmaceutical product storage apparatus is a modification to any one of the first through third pharmaceutical product storage apparatuses, wherein a bottom plate of the container is transparent, and a light receiving member is provided at the destination of projection of light from the light projecting member so that the pulled-out or pushed-back state of the container is determined by referring to light reception state.

In the fourth semi-automatic pharmaceutical product storage apparatus, the projected light is blocked if the container is projected from the storing unit but is not blocked if the container recedes into the storing unit. Since the light reception state varies depending on whether the container is projected or not, it is possible to automatically determine whether the container is automatically advanced or manually pushed back, by referring to the light reception state of the light receiving member. Like the light projecting members, the light receiving members are shared by multiple containers. Therefore, the number of light receiving members may be smaller than the containers.

Specific embodiments of the pharmaceutical product cassette and the dispensing apparatus according to the third embodiment will be described using illustrative embodiments 3-1 through 3-8.

Figure 23A:
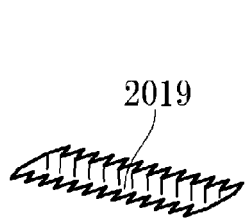
FIGS. 23A-23F show the structure whereby a stopper is planted in the ejecting mechanism according to an illustrative embodiment 3-2 of the third embodiment.
Figure 23B:
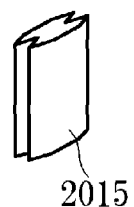
Figure 23C:
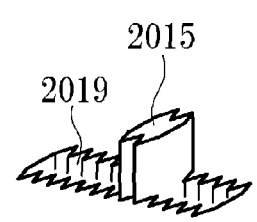
Figure 23D:
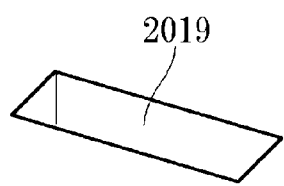
Figure 23E:
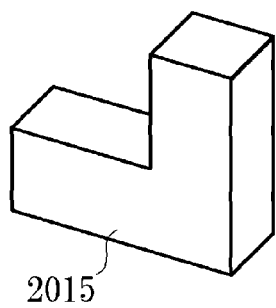
Figure 23F:
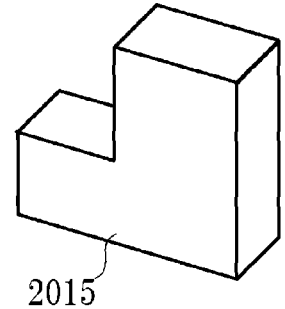
Figure 24:
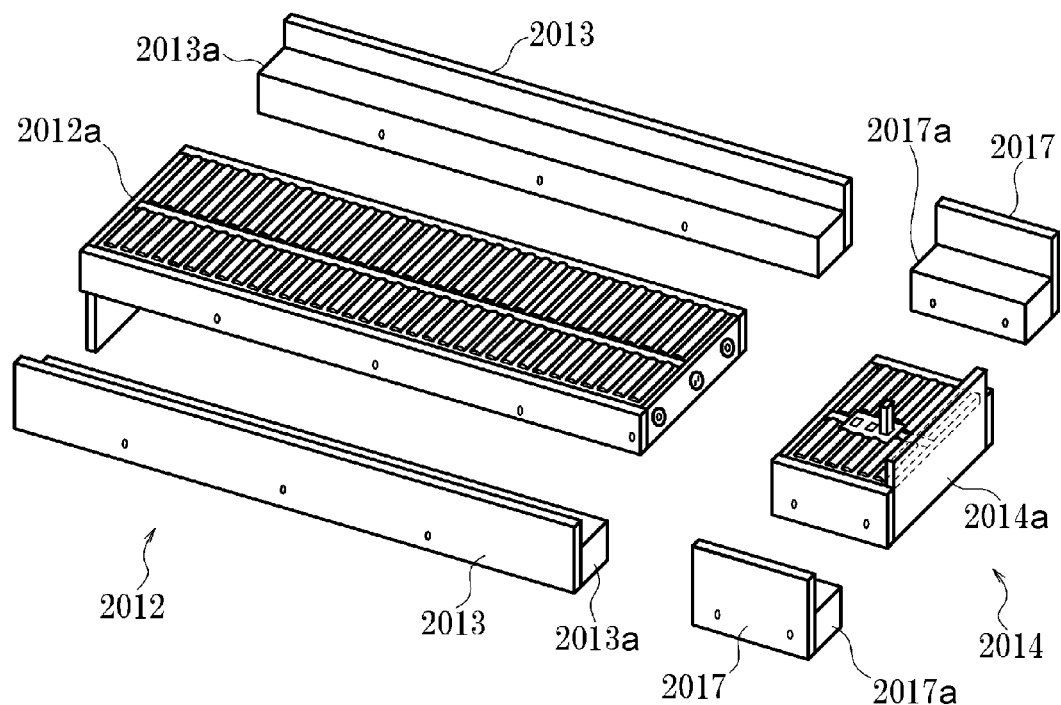
FIG. 24 is an expanded perspective view of a pharmaceutical product cassette according to an illustrative embodiment 3-3 of the third embodiment.

The illustrative embodiment 3-1 shown in FIGS. 19A-22D is an embodiment of the first pharmaceutical product cassette mentioned above. The illustrative embodiment 3-2 shown in FIGS. 23A-23F and the illustrative embodiment 3-3 shown in FIG. 24 are variations of the illustrative embodiment 3-1. The illustrative embodiment 3-4 shown in FIGS. 25A-25B is an embodiment of the third pharmaceutical product dispensing apparatus of a type provided with a row of cassettes. The illustrative embodiment 3-5 shown in FIGS. 26A-27C is an embodiment of the pharmaceutical product dispensing apparatus of a type partitioned by racks.

Figure 32A:
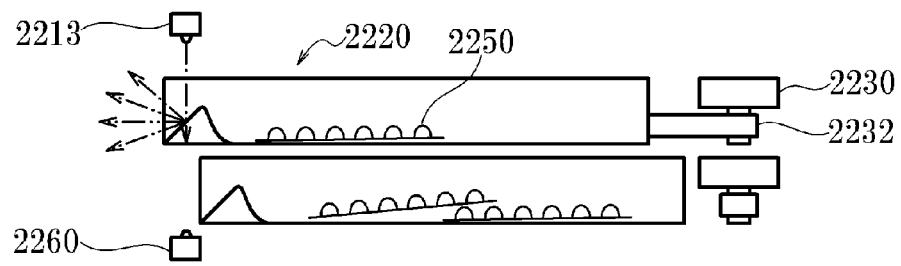
FIGS. 32A-32C show the structure of a semi-automatic pharmaceutical product storage apparatus according to an illustrative embodiment 3-8 of the second embodiment.
Figure 32B:
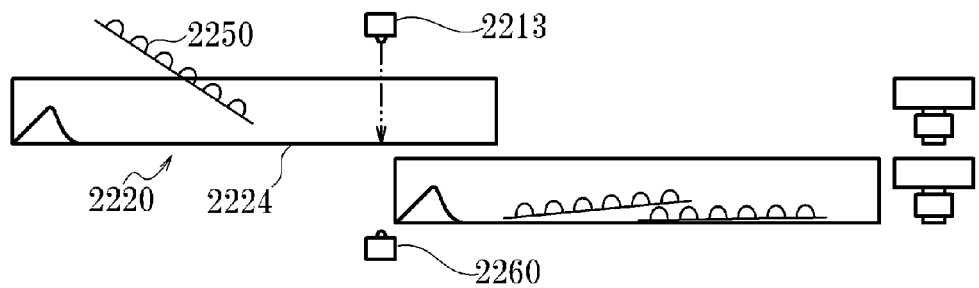
Figure 32C:
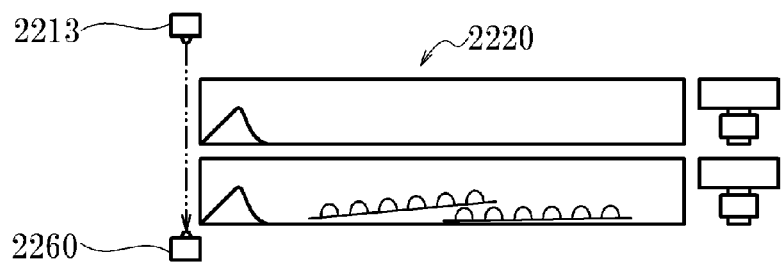

The illustrative embodiments 3-6-3-6 relate to a pharmaceutical product dispensing system. The illustrative embodiment 3-6 shown in FIGS. 28A-30 is an embodiment of the second and third pharmaceutical product dispensing systems and the first and second pharmaceutical product storage apparatuses mentioned above. The illustrative embodiment 3-7 shown in FIGS. 31A-31C is an embodiment of the third pharmaceutical product storage apparatus mentioned above. The illustrative embodiment 3-8 shown in FIGS. 32A-32C is an embodiment of the fourth pharmaceutical product storage apparatus mentioned above.

In the illustration, the details of support members such as frames, fasteners such as bolts, connectors such as hinges, detailed electric and electronic circuits such as motor drivers are omitted for brevity, highlighting those elements necessary to explain the invention and related elements. In the figures, portions indicated by shading indicate cross sections, and dotted portions indicate the surface of a member instead of a section.

Illustrative Embodiment 3-1

Figure 20A:
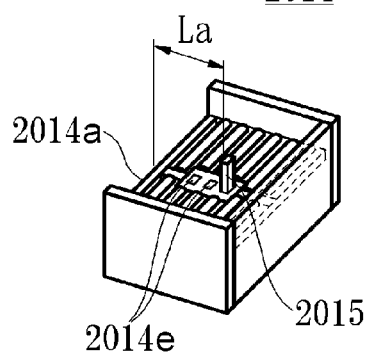
FIGS. 20A-20C show stoppers planted in the ejecting mechanism.
Figure 20B:
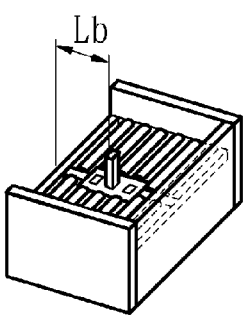
Figure 20C:
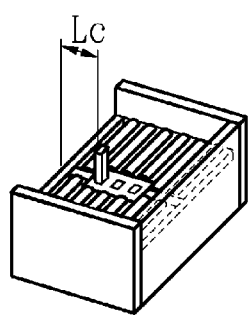
Figure 21A:
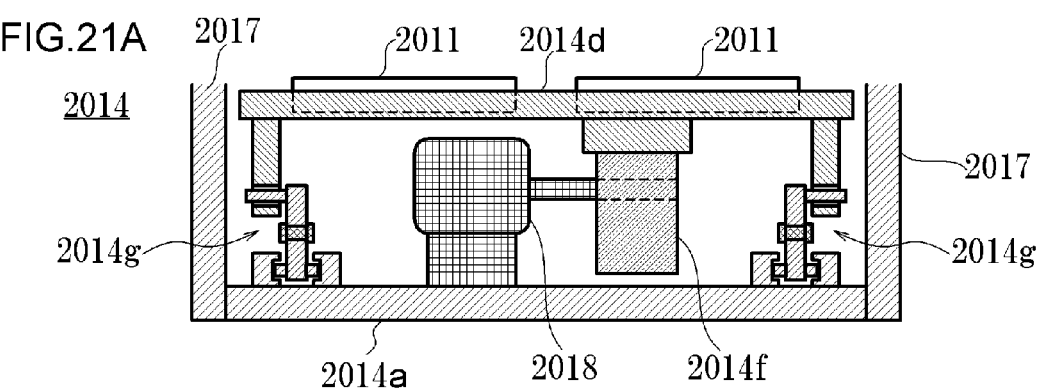
FIGS. 21A-21C show the structure of an elevating mechanism in the ejecting mechanism.
Figure 21B:
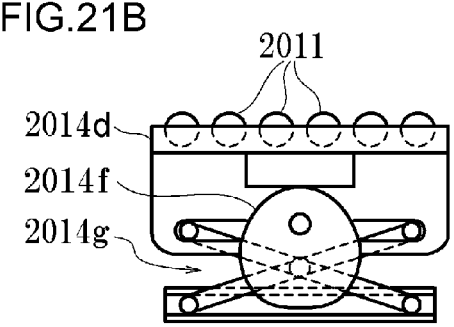
Figure 21C:
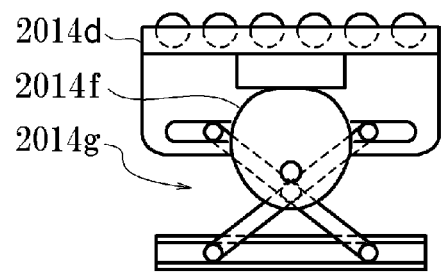

The specific structure of the pharmaceutical product cassette according to the illustrative embodiment 3-1 of the third embodiment will be described with reference to the associated drawings. FIGS. 19A-19E show the structure of a pharmaceutical product cassette 2010. FIG. 19A is a perspective view showing the appearance of a cassette main part 2012 (first rows of rollers 2012e, etc.); FIG. 19B is a perspective view showing the appearance of an ejecting mechanism 2014 (second rows of rollers 2014d, etc.); FIGS. 19C and 19D are perspective views showing the appearance of the entire cassette 2010; and FIG. 19E is a perspective view showing box-like pharmaceutical products 2020 aligned for storage in the cassette 2010. FIGS. 20A-20C show stoppers 2015 planted in the ejecting mechanism 2014. FIGS. 20A-20C are perspective views of the ejecting mechanism 2014. FIGS. 21A-21C show the structure of an elevating mechanism 2014f, 2014g in the ejecting mechanism 2014. FIG. 21A is a sectional front view of the ejecting mechanism 2014; FIGS. 21B and 21C are side view of the elevating mechanism 2014f, 2014g.

The pharmaceutical product cassette 2010 (see FIGS. 19A-19E) comprises a cassette main part 2012 which holds an arrangement of a large number of rollers 2011 in a fixed position (see FIG. 19A), and an ejecting mechanism 2014 which holds an arrangement of a smaller number of rollers 2011 so as to allow up-and-down movement thereof (see FIG. 19B). By connecting the part and the mechanism in a series (FIGS. 19C and 19D), pharmaceutical products 2020 can be aligned for storage on a gently sloping sliding surface formed by rows of rollers and can be sequentially ejected by the ejecting mechanism 2014 in the neighborhood of the descent end of the sliding surface (see FIG. 19E).

The cassette main part 2012 (see FIG. 19A) comprises first rows of rollers 2012a in which a large number of rollers 2011 are arranged in the direction of slope (in the illustration, sideways) to extend, for example, 10-100 cm, and two side plates 2013 provided on both sides of the rows and responsible for alignment of pharmaceutical products accommodated. A rear pod 2012d extending downward is fitted to the rear end of the first rows of rollers 2012a so that the rows 2012a, i.e., the rows of relatively numerous rollers 2011, are slightly tilted (e.g., at an angle of several degrees) in the longitudinal direction. The upper envelope of the group of rollers provided in the direction of slope forms a sliding surface. In the illustrated example, two rows of rollers are provided. Alternatively, a single row or three or more rows may be provided.

The sliding surface 2011 is flanked by the side plates 2013 on both sides so as to define a space for alignment and storage of pharmaceutical products 2020 such as box-packaged medicines in combination with the first rows of rollers 2012a (see FIG. 19E). The lower end of the sliding surface 2011, sandwiched by the side plates 2013, in the longitudinal direction (the direction of slope) (in FIG. 19A, toward the right) represents the neighborhood of a descent end at which the accommodated pharmaceutical products fall. Engaging parts 2012b, which also serve as positioning holes, are provided at the front end of the first rows of rollers 2012a located in the neighborhood of the descent end so that the ejecting mechanism 2014 can be attached or removed as desired. A connector 2012c (e.g., a receptacle) is also provided so that connection for feeding power to a motor 2018 described later is established in association with the attachment of the ejecting mechanism 2014.

The ejecting mechanism 2014 is provided with a fitting part 2014a, the second rows of rollers 2014d, a stopper 2015, a sensor 2016 and side plates 2017 (see FIGS. 19B and 20A-20C). The elevating mechanism 2014f, 2014g and the motor 2018 are also built in the mechanism 2014 (see FIGS. 21A-21C).

A fitting part 2014a is a frame body formed by joining a bottom plate and side plates. Engaging parts 2014b, which also serve as positioning pins, are provided in the part 2014a so that the mechanism is removably attached to the front end of the first row of rollers 2012a. A connector 2014c such as a plug is also provided so that connection for feeding power to the motor is established in association with the attachment.

The second rows of rollers 2014d (see FIG. 19B) is configured as rows of rollers 2011 fewer than the rollers of the first row 2012a and extend, for example, several cm. When the ejecting mechanism 2014 is fitted to the cassette main part 2012, the rows 2014d operate to extend the sliding surface 2011, presenting the same degree of slope. The second rows of rollers 2014d are supported by the elevating mechanism 2014f, 2014g described later and allowed to move up and down (see FIGS. 19C and 19D). In the illustrated example, two rows of rollers are provided. Alternatively, a single row or three or more rows may be provided.

At the center of the second rows of rollers 2014d is formed a row of several (e.g., three) loose insertion holes 2014e aligned in the front-rear direction (the direction of product alignment, direction of fall, direction of slope or direction of ejection) (see FIGS. 19A-20C). The inside dimension of the loose insertion hole 2014e is larger than the outside dimension of the stopper 2015 so that the elongated stopper 2015 in an upright position can be loosely inserted into the loose insertion hole 2014e. Below the loose insertion hole 2014e, a hole or a notch for holding the stopper 2015 is formed in the fitting part 2014a, and, more specifically, in the bottom plate or an extension of the part 2014a. By fitting the lower end of the stopper 2015 to the hole or the notch, the stopper 2015 is planted and secured in the fitting part 2014a. In an ordinary state in which the second rows of rollers 2014d are lowered, the top end of the stopper 2015 is projected above the loose insertion hole 2014e and, eventually, above the extension of the sliding surface formed by the fewer rollers 2011 (see FIG. 19C). The stopper 2015 remains still even when the second rows of rollers 2014d move up and down.

As many stopper holders (not shown) as there are loose insertion holes 2014e are formed in the fitting part 2014a so as to be located below the respective holes 2014e. Depending on in which loose insertion hole 2014e the stopper 2015 is planted, the distance La, Lb, Lc, between the stopper 2015 and the rear end of the fitting part 2014a and, eventually, the front end of the cassette main part 2012, varies. By adjusting the distance to be slightly smaller than the length of the pharmaceutical products 2020 in the longitudinal direction (i.e., the direction of product alignment, direction of fall, direction of slope or direction of ejection), the same ejecting mechanism is suitably used for products 2020 of various sizes. For example, when the stopper 2015 is planted toward the front end (see FIG. 20A), the stopper 2015 is used in that position if the distance La is smaller than the length of the product 2020. If the distance La is larger than the length of the product 2020, the stopper 2015 is planted in the adjacent loose insertion hole 2014e (see FIG. 20B). If the distance Lb is smaller than the length of the product 2020, the stopper is used in that position. If the distance Lb is larger than the length of the product 2020, the stopper 2015 is planted in one of the insertion holes 2014e toward the rear end so that the distance Lc is smaller than the length of the product 2020 (see FIG. 20C).

The elevating mechanism 2014f, 2014g (see FIGS. 21A-21C) comprises an eccentric cam 2014f fitted to the motor output shaft of the electric motor 2018, and a pair of X-shaped links 2014g. The mechanism is fitted inside the fitting part 2014a so as to elevate and lower the second rows of rollers 2014d. More specifically, the cam 2014f substantially at the center pushes the second rows of rollers 2014d upward, the links 2014g housed by the side plates 2017 in a distributed manner restricts the movement of the second rows of rollers 2014d to up-and-down linear motion. In response to each instruction for ejection from a controller (not shown), the electric motor 2018 causes the output shaft to make one full turn, before stopping its operation. In an ordinary state in which the motor 2018 is not operated, the cam 2014f of the elevating mechanism 2014f, 2014g driven by the motor is displaced downward, causing the second rows of rollers 2014d to be located on the extension of the sliding surface of the first rows of rollers 2012a (see FIGS. 21A, 21B and 19C). In an actuated state, in which the motor 2018 is operated, the mechanism elevates the second rows of rollers 2014d above the stopper 2015 (see FIGS. 21C and 19D).

The mode of using the pharmaceutical product cassette 2010 according to the illustrative embodiment 3-1 and its operation will be described with reference to the drawings. FIGS. 22A-22D are all perspective views of the cassette 2010 and show the time sequence of operation of ejection from the cassette 2010.

Figure 22A:
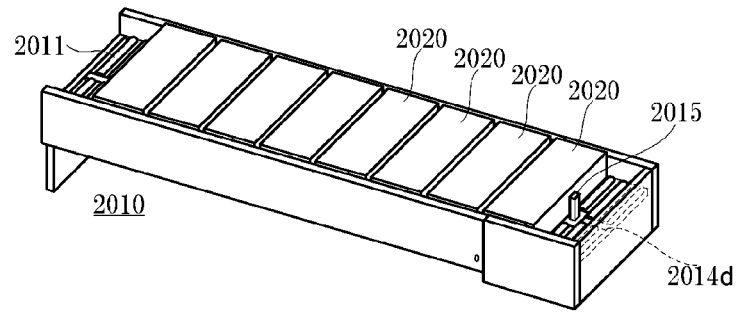
FIGS. 22A-22D show the time sequence of operation of ejection from the pharmaceutical product cassette.
Figure 22B:
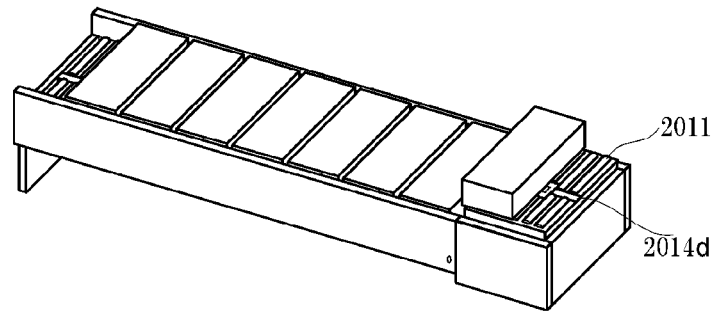
Figure 22C:
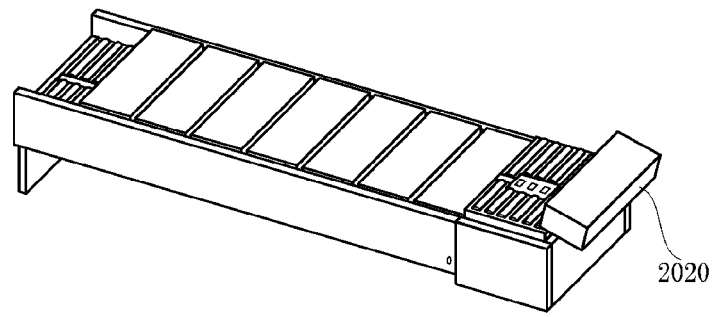
Figure 22D:
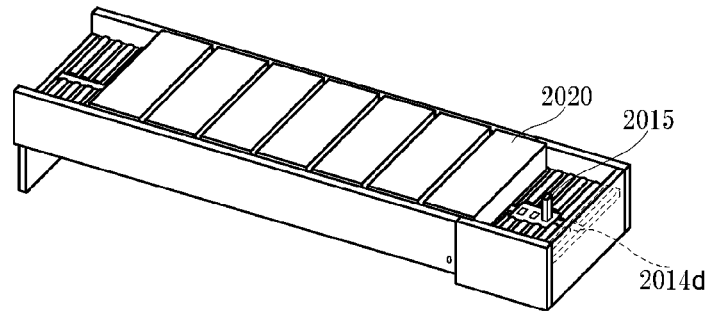

By adjusting the position of planting the stopper 2015 to conform to the shape of the pharmaceutical product 2020 suitable for aligned storage and free fall ejection, such as box-packaged medicines, and by placing the pharmaceutical products 2020 on the sliding surface 2011 one after another in a lying position, the pharmaceutical products 2020 are aligned in a row on the sliding surface in the direction of slope (see FIG. 22A). In an ordinary state, relatively numerous rollers 2011 in the first rows of rollers 2012a and fewer rollers 2011 in the second rows of rollers 2014d are contiguous with each other, forming a gentle slope. The stopper 2015 is projected above the second rows of rollers 2014d. Therefore, the pharmaceutical product 2020 at the head of a queue of products which slide down the sliding surface rests upon the fewer rollers 2011 of the second rows of rollers 2014d and remains there by coming into contact with the stopper 2015. The next and subsequent pharmaceutical products 2020 move closer to the product 2020 at the head of the queue on the sliding surface formed by the relatively numerous rollers 2011 of the first rows of rollers 2012a, so as to form a series, with the result that the products are aligned for storage in the cassette 2010.

In this state, the sensor 2016 of the ejecting mechanism 2014 senses whether the pharmaceutical product 2020 at the head of a queue is located above. When an instruction for ejection is issued upon detection of the product, the motor 2018 is operated so that the cam 2014f fitted to the motor output shaft is rotated. Then, the second rows of rollers 2014d are elevated until the stopper 2015 is hidden in the loose insertion hole 2014e (see FIG. 22B). The pharmaceutical product 2020 at the head, which is no longer supported, properly falls from the fewer rollers 2011 of the second rows of rollers 2014d (see FIG. 22C). The pharmaceutical product 2020 on the first rows of rollers 2012a is also urged to slide, but the next pharmaceutical product comes into contact with the rear end of the first rows of rollers 2014d and is prevented from advancing, since the second rows of rollers 2014d are elevated above the extension of the first rows of rollers 2012a.

In this way, the pharmaceutical products 2020 are sequentially and successively ejected from the cassette 2010. By the time the product 2020 at the head has completely fallen and is ejected outside the cassette, the cam 2014f has completed one full turn, and the second rows of rollers 2014d are lowered so that the ordinary state is resumed. The pharmaceutical product 2020, which is now at the head of the queue, leaves the sliding surface formed by the relatively numerous rollers 2011 of the first rows of rollers 2012a and rests on the fewer rollers 2011 of the second rows of rollers 2014d (see FIG. 22D). The next and subsequent pharmaceutical products 2020 slide on the sliding surface and are displaced by one position each. The pharmaceutical products 2020 remain aligned for storage, although the number thereof is reduced by one. Thus, sequential and successive ejection of the pharmaceutical products 2020 can be repeated.

Illustrative Embodiment 3-2

Two more examples of the structure whereby the stopper 2015 is planted in the ejecting mechanism 2014 of the pharmaceutical product cassette 2010 according to the illustrative embodiment 3-2 of the third embodiment will be described with reference to the associated drawings. FIGS. 23A-23C show a first variation of the planting structure. FIG. 23A is a perspective view of a planting hole 2019; FIG. 23B is a perspective view of a stopper 2015; FIG. 23C is a perspective view showing how the stopper is planted. FIG. 23D-23F show a second variation of the planting structure. FIG. 23D is a perspective view of a planting hole 2019; FIGS. 23E and 23F are perspective views of a stopper 2015.

The planting hole 2019 is formed in the fitting part 2014a so as to be located below the loose insertion holes 2014e of the second rows of rollers 2014d. The hole 2019 is one size smaller than the loose insertion holes 2014e so as to secure the lower end of the stopper 2015 inserted therein.

In the case of the first variation (see FIGS. 23A-23C), the planting hole 2019 is an elongated hole instead of discrete holes. Two opposite edges of the four edges of the planting hole 2019 have a sawtooth shape (see FIG. 23A). By using the stopper 2015 having an end that matches the shape of a part of the sawtooth shape (see FIG. 23B), the stopper 2015 can be planted at selected positions defined by the fine pitches of the sawtooth pattern (see FIG. 23C).

In the case of the second variation (see FIGS. 23D-23E), the planting hole 2019 is an elongated rectangular hole (see FIG. 23D). An L-shaped member, the lower half of which (insertion part) is tightly engaged with the planting hole 2019, is used to implement the stopper 2015 planted in the hole 2019 (see FIGS. 23E and 23F). The upper half of the stopper 2015 projecting above the planting hole 2019 and the loose insertion hole 2014e may be heavily carved and thinned to adapt to the longitudinal length of the pharmaceutical product 2020 (see FIG. 23E) or is configured to be thick by controlling the amount of carving (see FIG. 23F).

In this case, the position of planting the stopper 2015 is fixed, but the position at which the stopper 2015 stops the pharmaceutical product 2020 at the head can be arbitrarily set.

Illustrative Embodiment 3-3

The pharmaceutical product cassette according to the illustrative embodiment 3-3 shown in an expanded perspective view of FIG. 24 differs from that of the illustrative embodiments 3-1 and 3-2 in that a spacer 2013a is interposed between the first rows of rollers 2012a and the side plate 2013 of the cassette main part 2012. Also, a spacer 2017a is interposed between the fitting part 2014a and the side plate 2017 of the ejecting mechanism 2014.

In this case, the spacers 2013a and 2017a are ensured to have the same thickness so that commensurately wide pharmaceutical products 2020 can be aligned for storage and sequentially ejected.

The spacers 2013a and 2017a as illustrated have a regular thickness and are secured by screws, etc. Alternatively, the spacers may be removable and is locked and unlocked by operating a lever. The additional width may be varied by, for example, controlling the amount of advancing screws or the position of fixing nuts.

Illustrative Embodiment 3-4

The specific structure of the pharmaceutical dispensing apparatus of a type provided with a row of cassettes according to the illustrative embodiment 3-4 of the third embodiment will be described with reference to the associated drawings. FIG. 25A is a front view (BB section) of a pharmaceutical product dispensing apparatus 2030; and FIG. 25B is a side view (AA section) of the pharmaceutical product dispensing apparatus 2030.

This pharmaceutical product dispensing apparatus 2030 is configured such that a large number of cassettes 2010 described above (in the figure, a total of 12 cassettes in a matrix of 4 rows and 3 columns) are stored in a cassette storage unit. The ejecting sides of the cassettes 2010 face forward, and a descent guidance channel 2031 is provided in front of the cassettes 2010. A transporting mechanism 1032 forming the collecting and dispensing mechanism in combination with the descent guidance channel 2031 is provided below the channel 2031. A dispensing outlet 2033 is formed at the end of the transportation.

In this case, some of the cassettes 2010 align the pharmaceutical products 2020 mentioned above for storage, and other cassettes 2010 align other pharmaceutical products for storage.

When the cassette 2010 is directed by a controller (not shown) to eject a product in accordance with prescription data or medicine preparation instruction data derived therefrom, the cassette 2010 receiving the direction sequentially and successively ejects pharmaceutical products such as the pharmaceutical products 2020 as described above. The pharmaceutical products thus ejected fall down the descent guidance channel 2031 onto the transporting mechanism 2032. The products are transported by the transporting mechanism 2032 before being brought out the apparatus via the dispensing outlet 2033.

In this way, desired pharmaceutical products are automatically dispensed.

Illustrative Embodiment 3-5

Figure 27A:
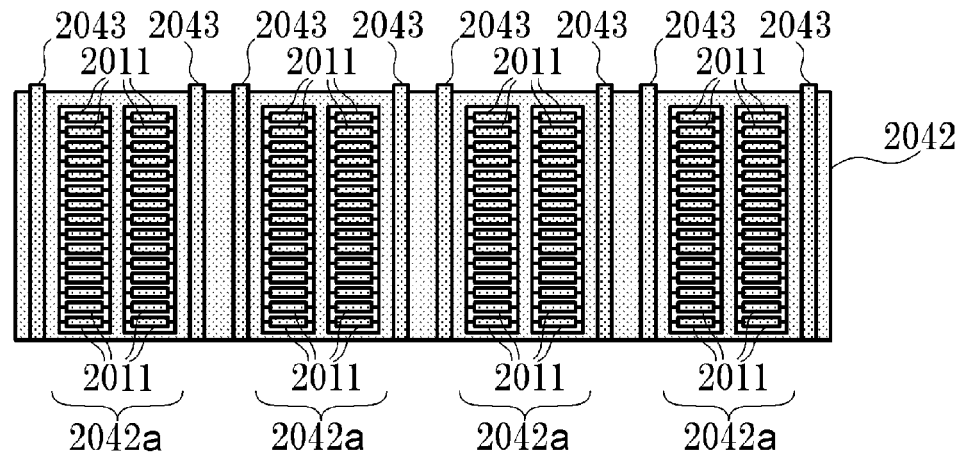
FIGS. 27A-27C show the structure of racks.
Figure 27B:
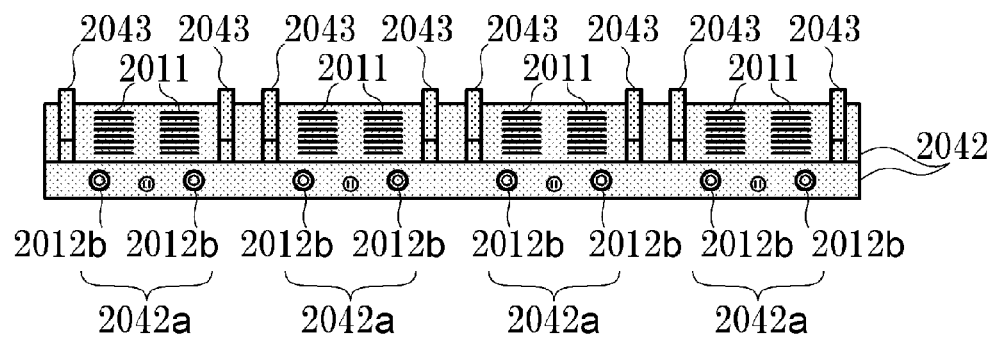
Figure 27C:
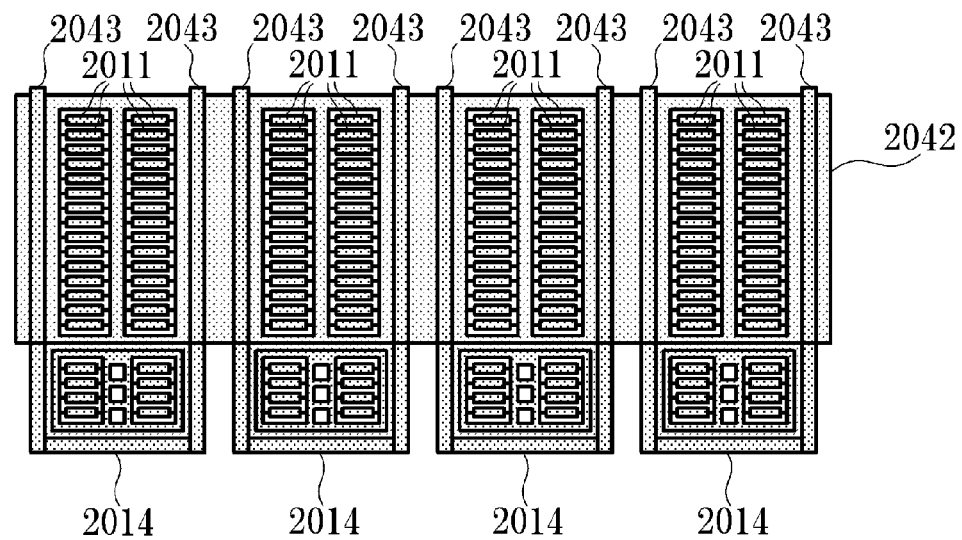

The specific structure of the pharmaceutical product dispensing apparatus of a type partitioned by racks according to the illustrative embodiment 3-5 of the third embodiment will be described with reference to the associated drawings. FIG. 26A is a front view (DD section) of a pharmaceutical product dispensing apparatus 2040; and FIG. 26B is a side view (CC section) of the pharmaceutical product dispensing apparatus 2040. FIGS. 27A-27C show the structure of racks. FIG. 27A is a top view of a tilting rack 2042; FIG. 27B is a front view of the tilting rack 2042; FIG. 27C is front view showing how an ejecting mechanism 2014 (second rows of rollers 2014d, etc.) is fitted to the tilting rack 2042 (first rows of rollers 2042a, etc.).

The pharmaceutical product dispensing apparatus 2040 differs from the pharmaceutical product dispensing apparatus 2030 described above in that equivalents of the plurality of cassettes 2100 arranged side by side are built into a tilting rack 2042 having a gentle descending slope.

More specifically, a row of rollers 2011 forming the sliding surface are provided side by side in the tilting rack 2042. Partitions 2043, which are a substitute for the side plates 2013, are also fitted to the tilting rack 2042. The ejecting members 2014 are fitted to the front end of the tilting rack 2042.

A plurality of (in FIGS. 27A-27C, eight rows of) sliding surfaces, each formed by arranging the rollers 2011 in the direction of slope of tilting rack 2042, are arranged in the level direction, i.e., the longitudinal direction, of the tilting rack 2042. Removable partitions 2043 are provided so as to form blocks each comprising an appropriate number of (in FIGS. 27A-27C, two rows of) sliding surfaces. Each block represents a first row of rollers 2042a formed by a row of a large number of rollers 2011 (in FIGS. 27A-27C, there are four blocks). As in the first rows rollers 2012a, the front end of the first rows of rollers 2042a is provided with an engaging part 2012b and a connector 2012c. The engaging part 2012b is used to fit the ejecting member 2014 to each of the blocks (in FIGS. 27A-27C, there are four blocks) partitioned by the partitions 2043, i.e., for each block of the first rows of rollers 2042a.

In this configuration, each of the blocks partitioned by the partitions 2043 corresponds to the aforementioned cassette 2010 described above. The usage mode and operation are the same as described above, except that each rack, instead of each cassette, is subject to repair or replacement in the case of the first rows of rollers 2042a. Since the elevating mechanism, including the second rows of rollers 2014d, is removable, the mechanism can be individually repaired or replaced so that favorable operability is maintained. In the illustrated example, two partitions 2043 are provided between blocks. Alternatively, only one partition 2043 may be provided between blocks if it is ensured that a portion of a pharmaceutical product, such as the pharmaceutical product 2020, is not projected above the partition 2043 into the adjacent block (such is the case with the box-packaged medicines mentioned above). The partition 2043 may be removable instead of permanently fixed. In this case, the partition may be selectively provided at intervals defined by the sliding surfaces.

Illustrative Embodiment 3-6

Figure 28A:
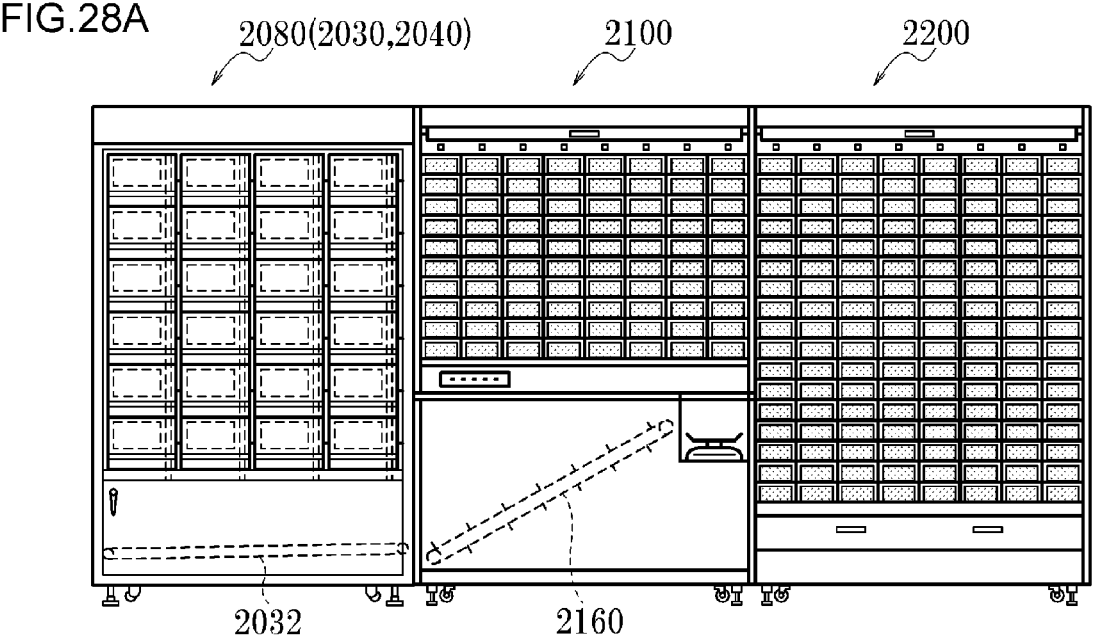
FIGS. 28A-28C show the structure of a pharmaceutical product dispensing system according to an illustrative embodiment 3-6 of the third embodiment.
Figure 28B:
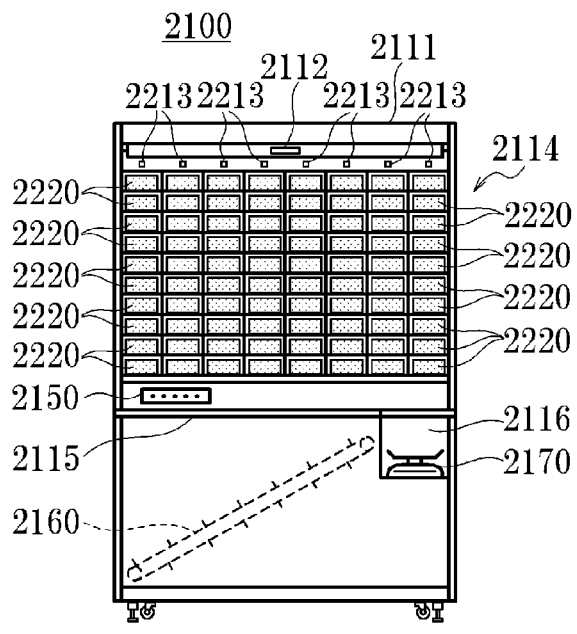
Figure 28C:
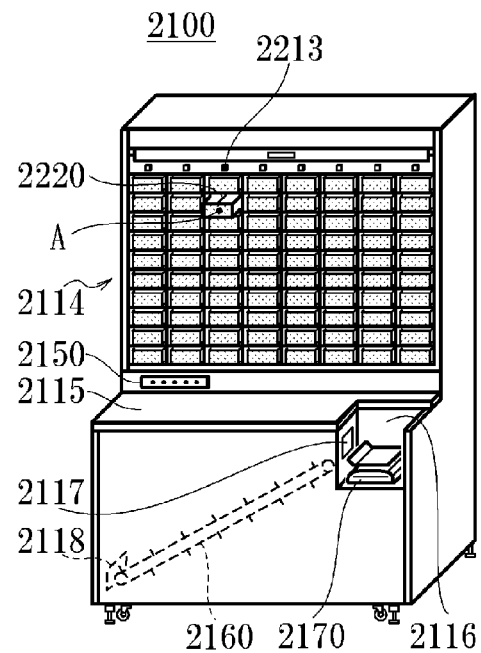
Figure 30:
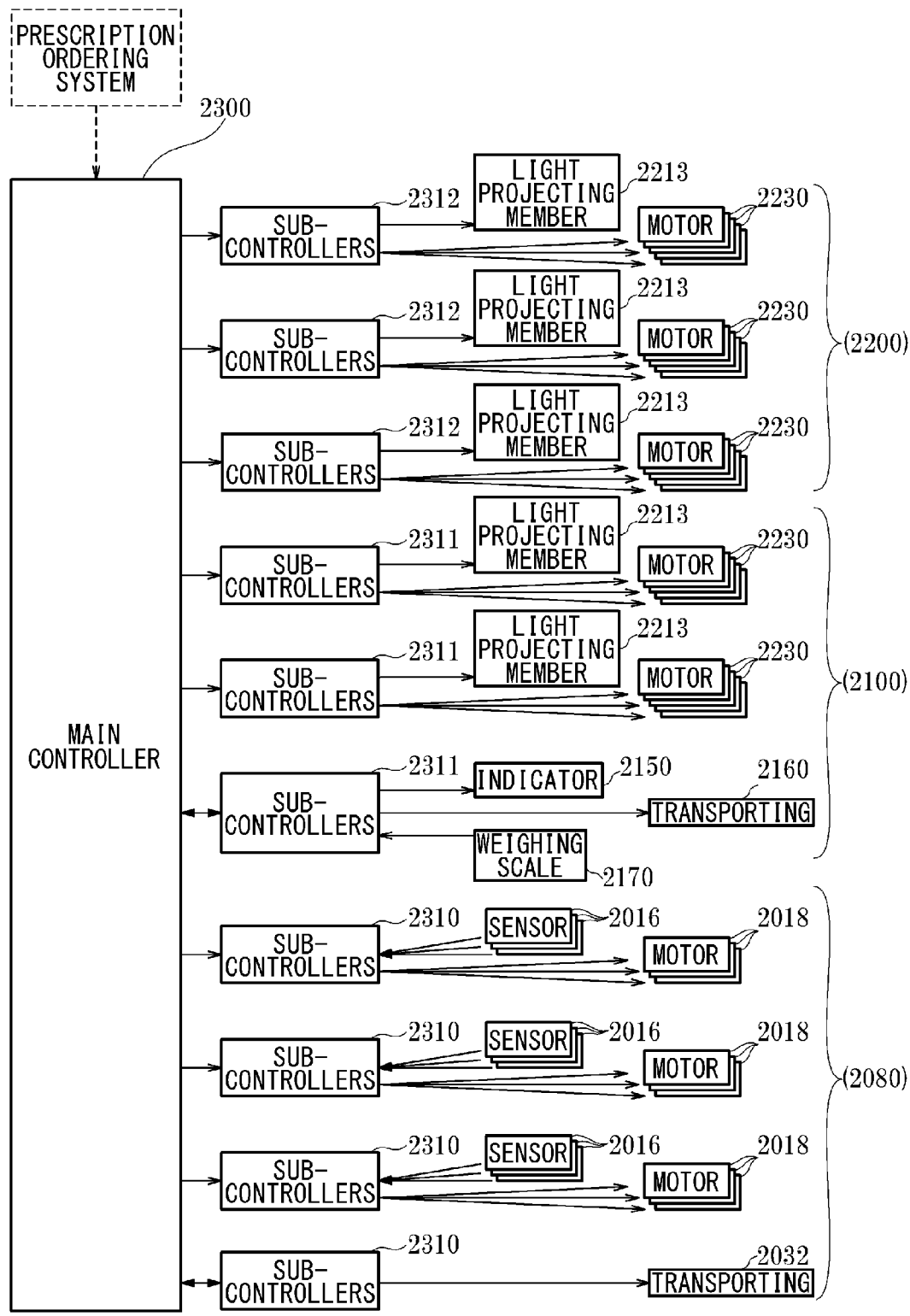
FIG. 30 is a schematic block diagram of a controller.

The specific structure of the pharmaceutical product dispensing system according to the illustrative embodiment 3-6 of the third embodiment will be described with reference to the associated drawings. FIG. 28A is a front view of the entire system. FIGS. 28B and 28C show the structure of a semi-automatic pharmaceutical product storage apparatus 2100. FIG. 28B is a front view, and FIG. 28C is a perspective view. FIGS. 29A-29F show the mechanical structure of a semi-automatic pharmaceutical product storage apparatus 2200. FIG. 29A is a front view of the entire apparatus; FIG. 29B is a perspective view of the entire apparatus; FIG. 29C is a perspective view of a container 2220; FIG. 29D is a perspective view of a container opening mechanism 2230-2233; and FIGS. 29E and 29F are right side views of an essential part. FIG. 30 is a schematic block diagram of a controller.

The pharmaceutical product dispensing system comprising a pharmaceutical product dispensing apparatus 2080, a semi-automatic pharmaceutical product storage apparatus 2100 and a semi-automatic pharmaceutical product storage apparatus 2200 arranged side by side in the stated order, the pharmaceutical product dispensing apparatus 2080 aligning rows of box-shaped medicines (pharmaceutical products) such as box-packaged medicines for storage so that the products are sequentially (successively) ejectable, and automatically discharging the products from the rows and guiding the products downward for collection, the pharmaceutical product storage apparatus 2100 holding a two-dimensional array of a large number of containers accommodating various medicines (pharmaceutical products) including box-shaped medicines so that the containers can be drawn forward, and the pharmaceutical product storage apparatus 2100 being configured to advance the containers by using container opening mechanisms provided behind the containers, and the pharmaceutical product storage apparatus 2200 holding a two-dimensional array of a large number of containers accommodating various pharmaceutical products so that the containers can be drawn forward, and the pharmaceutical product storage apparatus 2200 being configured to advance the containers by using container opening mechanisms provided behind the containers, A transporting mechanism 2160 and a work table 2115 are provided in the pharmaceutical product storage apparatus 2100 but not in the pharmaceutical product storage apparatus 2200.

The pharmaceutical product dispensing apparatus 2080 may be any one of the pharmaceutical product dispensing apparatuses 2030 and 2040. The transporting mechanism 2032 provided on the bottom of the housing interior of the apparatus 2080 and a transporting mechanism 2160 provided in the lower half of the housing interior of the pharmaceutical product storage apparatus 2100 constitute a continuous transporting channel that runs across the pharmaceutical product dispensing apparatus 2080 and the pharmaceutical product storage apparatus 2100.

A description will now be given of the respective elements sequentially. The description of the pharmaceutical product dispensing apparatus 2080, which is the same as any one of the pharmaceutical product dispensing apparatuses 2030 and 2040, will be omitted. The structure of the semi-automatic pharmaceutical product storage apparatus 2100 will be described with reference to FIGS. 28A-28C, the structure of the semi-automatic pharmaceutical product storage apparatus 2200 will be described with reference to FIGS. 29A-29F, and the structure of a control device will be described with reference to FIG. 30.

The pharmaceutical product storage apparatus 2100 (see FIGS. 28B and 28C) is configured such that a shutter 2112 is provided in the topmost part of a housing 2111. The upper half of the housing 2111 that can be easily reached by hand is occupied by a storing unit 2114. The storing unit 2114 is partitioned into grids so as to form a multiple-tier and multiple-column array (in the figure, 10 tiers and 8 columns) of drawer frames. The interior surfaces of the drawer frames are finished to smooth surfaces with low friction. Therefore, the frames are capable of holding a two-dimensional array of containers 2220 such that the containers can be pulled or pushed forward. Each of the drawer frames is provided with the container opening mechanism 2230-2233. The mechanism 2230-2233 is placed behind the container 2220 and cannot be viewed from the front. A series of light projecting members 2213 are provided at the top end of the front of the storing unit 2214. A detailed description of these elements will be omitted since they are also provided in the pharmaceutical product storage apparatus 2200.

The lower half of the housing 2111 of the pharmaceutical product storage apparatus 2100 is used as a work area for jobs that require operator attendance such as the job of dispensing pharmaceutical products etc. and the monitoring job. More specifically, a work table 2115 of a plate shape with a flat top is provided to extend horizontally halfway between the top and bottom of the housing 2111. Immediately above the work table 2115 and toward the rear end thereof is provided an indicator 2150 which is viewable. At the end of the work table 2115 farthest away from the pharmaceutical product dispensing apparatus 2080 is formed a chute 2116 by cutting a portion of the work table 2115. A weighing scale 2170 is provided in the chute 2116, and a transporting mechanism 2160 is built in the apparatus 2111 below the work table 2115.

The chute 2116 is sufficiently deeper than the height of the weighing scale 2170. A discharge opening 2117 is formed halfway between the work table 2115 and the weighing dish of the weighing scale 2170. At the side of the housing 2111 facing the pharmaceutical product dispensing apparatus 2080 is formed an incoming port 2118. The transporting mechanism 2160 extends diagonally upward from the incoming port 2118 toward the discharge opening 2117. Medicines dispensed by the automatic pharmaceutical product dispensing apparatus 2080 are accepted by the incoming port 2118 and transported to the discharge opening 2117 before being fed to the chute 2116. The indicator 2150 is implemented by, for example, a small liquid crystal panel capable of displaying the number of medicines to be dispensed, breaking it down into the number of medicines to be dispensed automatically and the number of medicines to be dispensed semi-automatically, or into the number of medicines to be dispensed from the apparatuses 2080, 2100 and 2200. A requirement for the weighing scale 2170 is that it provides sufficient precision and the weighing dish faces upward. In this example, an electronic weighing scale capable of transmitting a weight value is employed.

The pharmaceutical product storage apparatus 2200 (see FIGS. 29A and 29B) is configured such that a shutter 2212 is provided in the top part of a housing 2211, and a drawer 2215 and electric equipment 2216 are provided in the lower part of the housing 2211. The greater part of the housing 2211 that can be easily reached by hand, i.e., the middle part thereof, is occupied by a storing unit 2214.

Like the storing unit 2114, the storing unit 2214 is partitioned into grids so as to form a multiple-tier and multiple-column array (in the figure, 17 tiers and 8 columns) of drawer frames. The interior surfaces of the drawer frames are finished to smooth surfaces with low friction. Therefore, the frames are capable of holding a two-dimensional array of containers 2220 such that the containers can be pulled or pushed forward. Each of the drawer frames is provided with the container opening mechanism 2230-2233. The mechanism 2230-2233 is placed behind the container 2220 and cannot be viewed from the front. A series of light projecting members 2213 are provided at the top end of the front of the storing unit 2214.

The container 2220 (see FIG. 29C) is a longitudinally elongated box with an open top so that the container can accommodate pharmaceutical products and can be drawn. A front plate 2221 is transparent. In the illustrated example, a side plate 2223 and a bottom plate 2224 are non-transparent. At the front end of the container 2220 (more specifically, in a space inside the container 2220 immediately behind the front plate 2221) is formed a slope 2222 by forming a bank on the bottom plate 2224 or by fitting a triangle pole member on its side to the bottom plate 2224.

The slope 2222 is finished to a diffusely reflecting surface such as that of frosted glass and faces diagonally upward at an angle of inclination of about 30°-60° (in FIGS. 29E and 29F, about 45°) with respect to the horizon. Therefore, the slope serves as a visualizer for receiving the light projected vertically downward (see FIG. 29F) and directing the light forward as reflected and diffused light A.

The mechanism 2230-2233 (see FIG. 29D) is provided with a commercially available electric motor 2230 of a flat type, an eccentric cam 2232 fitted to its rotation shaft 2231, and a origin sensor 2233 such as a push switch. When the large-diameter portion of the eccentric cam 2232 is in contact with the origin sensor 2233 and is at rest (see FIG. 29E), the container 2220 can fully recede into and is accommodated in the storing unit 2214. When the rotation shaft 2231 of the motor 2230 is rotated halfway (see FIG. 29F), the large-diameter portion of the eccentric cam 2232 presses the rear end of the container 2220 so as to advance the container 2220. The amount of advance, i.e., the distance in which the container is driven forward, is 2-3 cm, which is sufficient to project the slope 2222 from the drawer frame and allow a user to grip the front plate 2221. As such, the distance is many times smaller than the depth of the container 2220, which is about 20-30 cm.

The light projecting member 2213 (see FIG. 29A) is implemented by, for example, a narrow-directivity red light-emitting diode (LED) emitting a beam of light. The member 2213 is provided for each column of drawer frames of the storing part 2214 so as to project light vertically downward. Light is projected through a space in front of those multiple containers 2220 in a column that are in a pushed-back position (see the chain double-dashed line of FIG. 29E), and the front end of the container 2220 advanced by the eccentric cam 2232 of the mechanism 2230-2233 is projected (see FIGS. 29B and 29F). Due to this arrangement and the fact that the containers 2220 are arranged as described above, the light receiving portion of the slope 2222 is illuminated by the reflected and diffused light A. The light projecting member 2213 and the motor 2230 mentioned above are operated in accordance with automatic control by the main controller 2300 described below.

The control device (see FIG. 30) comprises a group of processors comprising a main controller 2300 implemented by a programmable personal computer, a microprocessor system or the like; a large number of subcontrollers 2310, 2311 and 2312 implemented by, for example, one-chip microcomputers. The processors are in star connection or connected via LAN, with the main controller 2300 at the center. The main controller 2300 may be provided in an operation console, if any. Alternatively, the controller 2300 may be stored in the lower part of the pharmaceutical product storage apparatus 2100 or in the upper part of the pharmaceutical product dispensing apparatus 2080. In the illustrated example, the controller 2300 is stored in the electric equipment 2216 of the pharmaceutical product storage apparatus 2200 along with a power supply (not shown). The subcontroller 2310 is provided in the pharmaceutical product dispensing apparatus 2080, the subcontroller 2311 is provided in the pharmaceutical product storage apparatus 2100, and the subcontroller 2312 is provided in the pharmaceutical product storage apparatus 2200.

The main controller 2300 controls the automatic pharmaceutical product dispensing apparatus 2080 to select and dispense a medicine 2020 in accordance with pharmaceutical product dispensing information. The controller 2300 controls the semi-automatic pharmaceutical product storage apparatuses 2100 and 2200 to select one or a plurality of a large number of containers 2220 and actuate one or a plurality of mechanisms 2230-2233 corresponding to the selection. In order to obtain pharmaceutical product dispensing information designating pharmaceutical products to be dispensed, the main controller 2300 is configured to receive, from a host computer such as a prescription ordering system (prescription order entry system) indicated by broken lines, prescription data or medicine preparation instruction data derived therefrom, or to receive an instruction for dispensing from an input device (not shown).

A plurality of the motors 2230 and the light projecting members 2213 of the pharmaceutical product storage apparatus 2200 are connected to the main controller 2300 via the subcontroller 2312. A plurality of the motors 2230 and the light projecting members 2213 of the pharmaceutical product storage apparatus 2100 are connected to the main controller 2300 via the subcontroller 2311. Further, the indicator 2150, the transporting mechanism 2160 and the weighing scale 2170 are connected to the main controller 2300 via the subcontroller 2311. A plurality of the motors 2018 of the pharmaceutical product dispensing apparatus 2080 are connected to the main controller 2300 via the subcontroller 2310. Further, the transporting mechanism 2032 is connected to the main controller 2300 via the subcontroller 2310.

The mode of using the pharmaceutical product dispensing system according to the illustrative embodiment 3-6 and its operation will be described with reference to the drawings.

FIGS. 29A-29F show the operation of the semi-automatic pharmaceutical product storage apparatus 2200. FIG. 29A is a front view; FIG. 29B is a perspective view; and FIGS. 29E and 29F are right side views of an essential part. FIGS. 29A and 29E show the containers 2220 are pushed back and recede into the storing unit 2214. FIGS. 29B and 29F show that the container 2220 in the second tier and the second column from top right is selected and automatically advanced.

The illustration of FIGS. 29E and 29F applies also to the storing unit 2114 of the pharmaceutical product storage apparatus 2100 shown in FIGS. 28B and 28C. FIGS. 28B and 29E show the containers 2220 are pushed back and recede into the storing unit 2114. FIGS. 28C and 29F show that the container 2220 in the second tier and the third column from top left is selected and automatically advanced.

Prior to use, pharmaceutical products such as medicines and medical resources are accommodated in the containers 2220 of the semi-automatic pharmaceutical product storage apparatuses 2100 and 2200 according to the category. Typical examples of medicines (see patent document No. 6) include box-packaged medicines, ampoules and medicines dissolved before use. Typical examples medical resources include bone prothesis and medical operation tools.

In this pharmaceutical product dispensing system, those of pharmaceutical products not accommodated in the automatic pharmaceutical product dispensing apparatus 2080 that are used frequently are stocked according to the category in the containers 2220. Other pharmaceutical products are also stocked according to the category in the containers 2220 if space permits. If space still permits, some pharmaceutical products may be accommodated both in the apparatus 2080 and in the containers 2220, in order to avoid a wait for replenishment.

The containers 2220 accommodating these pharmaceutical products according to the category are pushed and inserted into the drawer frames of the storing units 2114 and 2214. The positions of the containers 2220 are entered manually or otherwise in the main controller 2300 and stored in a medicine master file etc. This completes preparation of the semi-automatic pharmaceutical product storage apparatuses 2100 and 2200. At this stage (see FIGS. 28B, 29A and 29E), none of the containers 2220 is not illuminated since the containers 1220 are in a pushed-back position and are closed.

The automatic pharmaceutical product dispensing apparatus 2080 is also set up prior to use and automatic medicine preparation. As described above, the pharmaceutical products 2020 such as box-packaged medicines are aligned for storage. A detailed description will be omitted. The medicines 2020 frequently used are accommodated in preference to other medicines. Typically, the width of a box-packaged medicine is 10-100 mm, the length thereof is 100-200 mm, and the thickness thereof is several mm. The weight of a box-packaged medicine is typically several-100 g.

This completes the preparation of the pharmaceutical product dispensing system for use.

When prescription data or medicine preparation instruction data is delivered to the main controller 2300 via communication or manual operation, medicine codes and prescribed amount are extracted from the data to formulate pharmaceutical product dispensing information. The main controller 2300 searches the medicine master file in accordance with the pharmaceutical product dispensing information. If any of the medicines 2020 can be automatically dispensed from the pharmaceutical product dispensing apparatus 2080, the medicine is selected. If not, and if any of the pharmaceutical products can be dispensed from the pharmaceutical product storage apparatus 2100 or the apparatus 2200 in a semi-automatic fashion, the product is selected. In either case, the number of products to be dispensed is displayed on the indicator 2150.

The medicine 2020 dispensed from the automatic pharmaceutical product dispensing apparatus 2080 is automatically transferred onto the transporting mechanism 2160 of the pharmaceutical product storage apparatus 2100 via the dispensing outlet 2033 and the incoming port 2118, and then transported to the discharge opening 2117 by the transporting mechanism 2160 before being fed to the chute 2116. The product is then placed on the weighing dish of the weighing scale 2170 and weighed.

In parallel with or independent of this process, the main controller 2300 may select a pharmaceutical product in the pharmaceutical product storage apparatus 2100 or the pharmaceutical product storage apparatus 2200 for dispensing/retrieval in accordance with the pharmaceutical product dispensing information mentioned above.

In this case, the container 2220 storing the pharmaceutical product to be dispensed or taken out is selected and the mechanism 2230-2233 behind the selected container is activated. The target container 2220 is then pushed forward by the eccentric cam 2232 and opened. The light projecting member 2213 above projects a beam of light.

In this state (see FIGS. 28C, 29B and 29F), the front end of the target container 2220 is projected from the storing unit 2114 or the unit 2214 so that the light projected by the light projecting member 2213 impinges upon the slope 2222 of the container 2220. The slope 2222 directs the projected and diffused light A forward. As a result, the container 2220 is seen illuminated. In this way, the container 2220 for retrieval of a pharmaceutical product is highlighted and opened. An operator places his or her finger on the front plate 2221 of the container 2220 through the opening so as to pull out the container 2220. The operator takes out a desired pharmaceutical product, closes the container 2220 by pushing it back and indicates to the main controller 2300 that the job of dispensing is completed in order to save a job record. In response to this, the light projecting member 2213 stops projecting light.

In this way, manual dispensing of pharmaceutical products, stored in the pharmaceutical product storage apparatuses 2100 and 2200 in a closed status according to the category, can be performed easily and efficiently. Pharmaceutical products are taken out manually so that a desired number of pharmaceutical products can be taken out in accordance with the guidance provided by the indicator 2150. While the operation of taking out is manually performed, selection of a target of retrieval and operation of advancing are automatic. Thus, desired medicines are dispensed easily and efficiently. As mentioned above, the mechanism 2230-2233 is of a simple structure comprised of a combination of the motor 2230 and the eccentric cam 2232. The number of light projecting members 2213 is small in that it is equal to the number of columns of the drawer frames of the storing units 2114 and 2214 and smaller than the number of containers 2220. Thus, the semi-automatic pharmaceutical product storage apparatuses 2100 and 2200 can be fabricated at a low cost.

Pharmaceutical products dispensed from the semi-automatic pharmaceutical product storage apparatuses 2100 and 2200 are assembled on the work table 2115 by the operator. After being inspected as to medicine type and quantity, the products are slid on the work table 2115 before being dropped to the chute 2116. The products are then placed on the weighing dish of the weighing scale 2170 and weighted along with the medicine 2020. The weight is displayed in the weighing scale 2170 and is also communicated by the weighing scale 2170 to the main controller 2300 by using a signal or the like. The main controller 2300 converts the weight into the number of medicines (count) by referring to, for example, the weight per unit of medicines maintained in a medicine master file. The count is checked against the prescribed amount. When the count and the amount match, the indicator 2150 displays OK, for example. In the event of failure to match, the indicator 2150 displays NG, for example.

The operator may refer to the display to learn whether there is a match and also to the number of products dispensed per apparatus. The operator can then proceed to medicine preparation checkup by transferring the medicine 2120 and the product to the work table 2150 from the weighing scale 2170. In this way, the operator can easily follow the steps of checkup as well as medicine preparation.

Thus, with the inventive pharmaceutical product dispensing system, a large number of pharmaceutical products can be efficiently prepared and then checked at a reasonable cost.

Illustrative Embodiment 3-7

The specific structure of the semi-automatic pharmaceutical product dispensing apparatus according to the illustrative embodiment 3-7 of the third embodiment will be described with reference to the associated drawings. FIG. 31A is a perspective view of a container 2220; FIG. 31B is a front view of a name plate 2225; and FIG. 31C is a perspective view of the container 2220. Sets of medicines not packaged in a box are shown in FIG. 31C as examples of pharmaceutical products 2250.

The pharmaceutical product storage apparatus differs from that of the illustrative embodiment 3-6 in that the container 2220 is integrally formed of transparent plastic and the visualizer attached is implemented by the name plate 2225 placed on the slope 2222.

The container 2220 can be integrally molded at a low cost, using the same material for the slope 2222, the side plate 2223, the bottom plate 2224 and the front plate 2221.

The name plate 2225 is non-transparent paper or a plastic sheet and is formed with substantially the same size as the slope 2222. At least one side thereof is formed as a coarse surface reflecting and diffusing impinging light. The name and/or code of a medicine is handwritten or printed on the name plate 1225.

In this case, the visualizer is easily and inexpensively provided in the container 2220 by placing the name plate 2225 on the slope 2222 with the printed or handwritten surface facing upward.

Illustrative Embodiment 3-8

The semi-automatic pharmaceutical product storage apparatus according to the third embodiment, an essential part of which is shown in the right side view of FIGS. 32A-32C, differs from those of the illustrative embodiments 3-6 and 3-7 in that the bottom plate 2224 of the container 2220 is non-transparent and that a light receiving member 2260 is provided at the destination of projection of light from the light projecting member 2213. The main controller 2300 is configured (not shown) to determine whether the container 2220 is drawn by referring to the light reception state of the light receiving member 2260.

In this case, as the mechanism 2230-2233 projects the container 2220 for retrieval out of the storing unit 2114 or the unit 2214 (see FIG. 32A), the light projected from the light projecting member 2213 to the light receiving member 2260 is blocked by the front end of the container 2220, preventing the light receiving member 2260 from receiving the light.

When the container 2220 is drawn further forward for retrieval of the pharmaceutical product 2250 (see FIG. 32B), the light receiving member 2260 continue to fail to receive the light because the light projected from the light projecting member 2213 to the light receiving member 2260 is blocked by the bottom plate 2224 of the container 2220 unless the container 2220 is completely pulled out.

Meanwhile, when the container 2220 is pushed back upon completion of the retrieval of the pharmaceutical products 2250, causing the container 2220 to recede into the storing unit 2114 or the unit 2214 (see FIG. 32C), nothing blocks the light projected from the light projecting member 2213 to the light receiving member 2260 so that the light receiving member 2260 receives the light.

A signal indicating change in the light reception status of the light receiving member 2260 that depends on whether the container 2220 is projected is input to the main controller 2300. A time stamp is included in log data.

If the failure of the light receiving member 2260 to receive the light cannot be detected even if the motor 2230 is actuated, the main controller 2300 determines that automatic advancement of the container 2220 is not completed and issues an appropriate alarm.

If there is an input indicating the completion of a dispensing operation while resumption of reception of light by the light receiving member 2260 is not detected, the main controller 2300 determines that the dispensing operation is not completed and issues a guidance message prompting the operator to close the container 2220.

[Other Points of Note]

In the above-mentioned illustrative embodiments 3-4 and 3-5, the collecting and dispensing mechanism is configured to cause the pharmaceutical product 2020 ejected forward from the cassette 2010 or a block equivalent to the cassette, before horizontally transporting the product, but the mechanism is not limited to this configuration. For example, the pharmaceutical product 2020 ejected from the cassette 2010 may be fetched by a mechanism capable of X-Y translation so that the product 2020 thus collected is transported to the position of dispensing (see, for example, patent document No. 2). Alternatively, the pharmaceutical product 2020 ejected from the cassette 2010 may be horizontally moved before causing it to fall for collection (see, for example, patent document No. 3).

In the illustrative embodiments 3-6-3-8 described above, it is assumed that the containers 2220 have the same size and shape. Alternatively, the containers may come in different sizes or shapes. In that case, the height of the eccentric cam 2232 may be varied so as to be compatible with the height of the container 2220. The motor 2230 may not be at substantially the same height as the associated container 2220 so long as the eccentric cam 2232 is capable of pressing the rear end of the container 2220.

The light projecting member 2213 may be provided toward the bottom of, or to the left or right of the front space, instead of above thereof. The direction of projection of light by the light projecting member 2213 may be upward, horizontal or diagonal instead of vertically downward.

In the illustrative embodiments, the control device is of a two-tier structure including the main controller 2300 and the subcontrollers 2310, 2311 and 2312. Alternatively, a local controller may be provided for each of the dispensing apparatuses 2080, 2100 and 2200 to achieve a three-tier structure including the main controller 2300, the local controller and the subcontrollers 2310, 2311 and 2312.

In the illustrative embodiments, an escalator-like slope conveyor is illustrated as an example of the transporting mechanism 2160. The transporting mechanism 2160 may be like an elevator or a combination of multiple types.

In the illustrative embodiments, the work table 2115 is cut immediately above the discharge opening 2117. Alternatively, the table may be projected above the chute 2116.

The pharmaceutical product storage apparatus 2200 is a version of the pharmaceutical product storage apparatus 2100 in which the storing unit is expanded. The number of apparatuses 2200 may vary appropriately depending on the number of types of pharmaceutical products.

Described above is a description based on the preferred embodiments. While the preferred embodiments of the present invention have been described using specific terms, such description is for illustrative purposes only, and it is to be understood that changes and variations may be made without departing from the spirit or scope of the appended claims.

INDUSTRIAL APPLICABILITY

Thus, the present invention is applicable to the job of dispensing pharmaceutical products.

The invention claimed is:
1. A pharmaceutical product dispensing system comprising:
a pharmaceutical product dispensing apparatus which aligns rows of pharmaceutical products for storage so that the products are sequentially ejectable, and which automatically discharges the products from the rows and guides the products downward for collection; and a pharmaceutical product storage apparatus which holds a two-dimensional array of a large number of containers accommodating pharmaceutical products so that the containers can be drawn forward, and which is configured to advance the containers by using container opening mechanisms provided behind the containers, the dispensing apparatus and the storage apparatus being provided side by side, wherein the pharmaceutical product dispensing apparatus comprises a first transporting mechanism to transport a pharmaceutical product, wherein a work table is attached to the pharmaceutical storage apparatus, a chute is formed by cutting a portion of the work table, and a weighing scale is provided in the chute, the storage apparatus being further provided with a second transporting mechanism for feeding a product ejected by the pharmaceutical product dispensing apparatus to the chute, wherein the first transporting mechanism of the dispensing apparatus and the second transporting mechanism of the storage apparatus constitute a continuous transporting channel that runs across the pharmaceutical product dispensing apparatus and the pharmaceutical product storage apparatus.

2. The pharmaceutical product dispensing system according to claim 1, wherein the pharmaceutical product dispensing apparatus is configured to maintain the products in alignment on a sliding surface formed by a large number of rollers, and to advance the products on the sliding surface while maintaining alignment thereof, the apparatus being further configured to sequentially eject the products, according to alternate up-and-down movement of rows of fewer rollers with respect to a planted and secured stopper.

3. The pharmaceutical product dispensing system according to claim 1, wherein the pharmaceutical product dispensing apparatus is configured to maintain the products in alignment on the sliding surface formed by a row of rollers, and to advance the products on the sliding surface while maintaining alignment thereof, the apparatus being further configured to sequentially eject the products, according to alternate up-and-down movement of first and second followers of a cam mechanism or a link mechanism.

4. An apparatus, comprising:

a pharmaceutical product cassette which aligns pharmaceutical products on a sliding surface having a gentle slope for storage and sequential ejection, and ejecting mechanisms provided in a neighborhood of a descent end of the sliding surface, wherein the sliding surface is formed by arranging rollers in first rows of rollers in the direction of slope, where the ejection mechanisms sequentially eject the products, and each of the ejecting mechanisms comprises:

a fitting part fitted to the front end of the first rows of rollers;

a second row of rollers in which fewer rollers than those forming the sliding surface are arranged in rows;

a stopper which is planted in the fitting part and which is projected above an extension of the sliding surface; and an elevating mechanism which is fitted to the fitting part, and which, in an ordinary state, locates the second row of rollers on the extension of the sliding surface and, in an actuated state, elevates the second row of rollers above the stopper, and a plurality of loose insertion holes are formed in the second row of rollers so that a distance between the stopper and the rear end of the fitting part is adjustable by selectively planting the stopper in the holes.

5. The apparatus according to claim 4, wherein the fitting part of the ejecting mechanism is removable.

6. A pharmaceutical product dispensing system comprising:

a pharmaceutical product dispensing apparatus which provides automatic dispensing in accordance with prescription data or medicine preparation instruction data derived therefrom; and a pharmaceutical product storage apparatus which holds a two-dimensional array of a large number of containers accommodating pharmaceutical products so that the containers can be drawn forward, and which provides semi-automatic dispensing in accordance with the data, wherein the pharmaceutical product dispensing apparatus comprises a first transporting mechanism to transport a pharmaceutical product, wherein a work table is attached to the pharmaceutical storage apparatus, a chute is formed by cutting a portion of the work table, and a weighing scale is provided in the chute, the storage apparatus being further provided with a second transporting mechanism for feeding a product ejected by the pharmaceutical product dispensing apparatus to the chute, wherein the first transporting mechanism of the dispensing apparatus and the second transporting mechanism of the storage apparatus constitute a continuous transporting channel that runs across the pharmaceutical product dispensing apparatus and the pharmaceutical produce storage apparatus.

7. A pharmaceutical product dispensing system comprising:

a pharmaceutical product dispensing apparatus which provides automatic dispensing in accordance with prescription data or medicine preparation instruction data derived therefrom; and a pharmaceutical product storage apparatus which holds a two-dimensional array of a large number of containers accommodating pharmaceutical products so that the containers can be drawn forward, and which provides semi-automatic dispensing in accordance with the data, wherein the pharmaceutical product storage apparatus is provided with a light projecting member for projecting light passing through a space in front of at least some of the containers in a pushed-back state, and a visualizer configured to direct the projected light forward is formed in or attached to the front end of each of the containers; and wherein the pharmaceutical product dispensing apparatus comprises a first transporting mechanism to transport a pharmaceutical product, wherein a work table is attached to the pharmaceutical storage apparatus, a chute is formed by cutting a portion of the work table, and a weighing scale is provided in the chute, the storage apparatus being further provided with a second transporting mechanism for feeding a product ejected by the pharmaceutical product dispensing apparatus to the chute, wherein the first transporting mechanism of the dispensing apparatus and the second transporting mechanism of the storage apparatus constitute a continuous transporting channel that runs across the pharmaceutical product dispensing apparatus and the pharmaceutical produce storage apparatus.

8. A pharmaceutical product storage apparatus which holds a two-dimensional array of a large number of containers accommodating pharmaceutical products so that the containers can be drawn forward, and which is configured to open the containers by using container opening mechanisms provided behind the containers, wherein each of the container opening mechanisms is of a type with reduced driving distance that comprises a motor and an eccentric cam fitted to a rotation shaft of the motor, and is configured such that a large-diameter portion of the eccentric cam presses a rear end of a container so as to open a corresponding one of the containers, the pharmaceutical product storage apparatus is provided with a light projecting member emitting a beam of light with a narrow-directivity for projecting light passing through a space in front of at least some of the containers in a pushed-back state, the light projecting member provided for each column of the containers, and a visualizer comprising a slope configured to direct the projected light towards an operator is formed in or attached to the front end of each of the containers, the reduced driving distance is set such that, in a state where one of the container opening mechanisms opens a corresponding container, the beam of light from the light projecting member impinges upon the slope of a corresponding visualizer.

9. The pharmaceutical product dispensing system according to claim 8, wherein the reduced driving distance set such that a distance by which an opening mechanism advances the corresponding one of the containers is shorter than a depth of the corresponding container.

* * * * *